(12) United States Patent
Cox et al.

(10) Patent No.: US 10,138,049 B2
(45) Date of Patent: *Nov. 27, 2018

(54) FLEXIBLE CONTAINERS HAVING FLEXIBLE VALVES

(71) Applicant: The Procter & Gamble Company, Cincinnati, OH (US)

(72) Inventors: Donald Cox, Hamilton, OH (US); Ken McGuire, Montgomery, OH (US); Scott Stanley, Mason, OH (US); Lee Arent, Fairfield, OH (US); Andrew Rapach, Fairfield, OH (US); Jun You, West Chester, OH (US); Marc Bourgeois, Liberty Towhship, OH (US); Joseph Lester, Liberty Township, OH (US); Kory Gunnerson, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/606,405

(22) Filed: May 26, 2017

(65) Prior Publication Data

US 2017/0259984 A1    Sep. 14, 2017

Related U.S. Application Data

(63) Continuation of application No. 14/534,203, filed on Nov. 6, 2014.

(Continued)

(51) Int. Cl.
*B65D 47/20* (2006.01)
*B65D 83/00* (2006.01)
(Continued)

(52) U.S. Cl.
CPC ......... *B65D 83/0094* (2013.01); *B65D 47/06* (2013.01); *B65D 47/20* (2013.01);
(Continued)

(58) Field of Classification Search
CPC ...... B65D 47/06; B65D 47/20; B65D 75/008; B65D 83/0094
(Continued)

(56) References Cited

U.S. PATENT DOCUMENTS 1,342,769 A * 6/1920 Selz ................... B65D 5/18
215/12.2
2,432,288 A   12/1947 Abraham
(Continued)

FOREIGN PATENT DOCUMENTS

CN    1389378 A    1/2003
CN    1406826      4/2003
(Continued)

OTHER PUBLICATIONS

"The Rigidified Standing Pouch—A Concept for Flexible Packaging", Phillip John Campbell, A Thesis Written in Partial Fulfillment of the Requirements for the Degree of Master of Industrial Design, North Carolina State University School Of Design Raleigh, 1993, pp. 1-35.

(Continued)

*Primary Examiner* — Patrick M Buechner
*Assistant Examiner* — Michael J Melaragno
(74) *Attorney, Agent, or Firm* — David M Weirich

(57) ABSTRACT

Non-durable self-supporting flexible containers having product volumes and structural support volumes are provided with a valve mechanism to facilitate dispensing fluid product from the product support volume. One or more tension-inducing elements may be used to provide the valves with the ability to permit dispensing of fluid product from (Continued)

the product volume upon application of greater than a minimum threshold but less than a maximum threshold of squeeze force to an exterior of the flexible container. The valve may also be re-closable to prevent fluid product from being dispensed subsequent to use. The flexible container may further be provided with a product sensory experience sampling mechanism to provide for consumer interaction with one or more characteristics of the fluid product contained in the product volume without compromising the integrity of the product volume.

9 Claims, 34 Drawing Sheets

Related U.S. Application Data

(60) Provisional application No. 61/900,508, filed on Nov. 6, 2013.

(51) Int. Cl.

| *B65D 47/06* | (2006.01) |
|---|---|
| *F16K 37/00* | (2006.01) |
| *F16K 15/14* | (2006.01) |
| *B65D 75/00* | (2006.01) |
| *B65D 75/20* | (2006.01) |
| *B65D 75/52* | (2006.01) |
| *B65D 75/54* | (2006.01) |
| *B65D 75/56* | (2006.01) |
| *B65D 75/58* | (2006.01) |
| *B65D 77/22* | (2006.01) |
| *B65D 81/03* | (2006.01) |

(52) U.S. Cl.
CPC ........... *B65D 75/008* (2013.01); *B65D 75/20* (2013.01); *B65D 75/525* (2013.01); *B65D 75/54* (2013.01); *B65D 75/566* (2013.01); *B65D 75/5866* (2013.01); *B65D 75/5877* (2013.01); *B65D 75/5883* (2013.01); *B65D 77/225* (2013.01); *B65D 81/03* (2013.01); *F16K 15/144* (2013.01); *F16K 37/0058* (2013.01); *B65D 2205/02* (2013.01)

(58) Field of Classification Search
USPC ................ 222/107, 130, 131, 173, 212, 571
See application file for complete search history.

(56) References Cited

U.S. PATENT DOCUMENTS

| | | | | |
|---|---|---|---|---|
| 2,751,953 A * | 6/1956 | Grimm | ................. | B65D 37/00 114/74 R |
| 2,758,755 A * | 8/1956 | Schafler | ............. | B65D 47/2031 222/212 |
| 2,870,954 A | 1/1959 | Kulesza | | |
| 2,904,225 A * | 9/1959 | Earles, Jr. | .............. | B65D 35/28 222/183 |
| 3,009,498 A * | 11/1961 | Fohr | .................... | B65D 31/145 116/DIG. 9 |
| 3,030,952 A | 4/1962 | Elder | | |
| 3,120,336 A * | 2/1964 | Whatley, Jr. | ........... | B65D 33/16 383/210 |
| 3,161,326 A | 12/1964 | Parr | | |
| 3,184,121 A * | 5/1965 | Volckening | ........ | B65D 75/5811 206/277 |
| 3,220,609 A | 11/1965 | Russell | | |
| 3,223,289 A | 12/1965 | Bernard | | |
| 3,229,813 A | 1/1966 | Crowe, Jr. | | |
| 3,349,972 A * | 10/1967 | Whiteford | ......... | B65D 47/2031 222/212 |
| 3,381,887 A | 5/1968 | Lowry | | |
| 3,401,837 A | 9/1968 | Wiedeman | | |
| 3,419,137 A * | 12/1968 | Walck, III | ......... | B65D 75/5855 206/364 |
| 3,432,087 A | 3/1969 | Costello | | |
| 3,458,087 A | 7/1969 | Cox, Jr. | | |
| 3,460,740 A * | 8/1969 | Hagen | .................... | B65D 81/03 206/523 |
| 3,468,471 A | 9/1969 | Linder | | |
| 3,581,944 A | 6/1971 | Jeppesen | | |
| 3,604,595 A | 9/1971 | Wiedeman | | |
| 3,635,376 A * | 1/1972 | Hellstrom | .............. | B65D 75/30 206/469 |
| 3,742,994 A * | 7/1973 | Pensak | .................... | B65D 31/04 383/121 |
| 3,862,684 A * | 1/1975 | Schmitt | .................. | B65B 3/003 206/277 |
| 4,000,846 A | 1/1977 | Gilbert | | |
| 4,017,008 A * | 4/1977 | Raitport | ................ | B05B 11/048 222/94 |
| 4,044,867 A * | 8/1977 | Fisher | .................... | A45C 7/004 190/107 |
| 4,133,457 A * | 1/1979 | Klassen | ............. | B65D 47/2031 137/849 |
| 4,134,535 A | 1/1979 | Barthels | | |
| 4,163,509 A * | 8/1979 | Amneus | ................. | B65D 75/30 137/846 |
| 4,206,870 A | 6/1980 | DeVries | | |
| 4,240,556 A * | 12/1980 | Field | ...................... | B65D 81/03 206/522 |
| 4,278,198 A * | 7/1981 | Norton | ...................... | A61J 1/10 383/119 |
| 4,282,986 A * | 8/1981 | af Ekenstam | ......... | A61M 5/282 222/1 |
| 4,328,912 A * | 5/1982 | Haggar | ................. | A61F 9/0008 222/212 |
| 4,377,192 A | 3/1983 | Gautier | | |
| 4,384,603 A | 5/1983 | Tyrer | | |
| 4,447,974 A * | 5/1984 | Vicino | ...................... | G09F 1/08 40/212 |
| 4,470,153 A | 9/1984 | Kenan | | |
| 4,550,441 A | 10/1985 | Keppel | | |
| 4,592,493 A * | 6/1986 | Smith | ................. | B65D 47/2031 222/212 |
| 4,595,629 A | 6/1986 | Mays | | |
| 4,603,433 A | 7/1986 | Gautier et al. | | |
| 4,613,643 A | 9/1986 | Nakamura | | |
| 4,615,922 A | 10/1986 | Newsome | | |
| 4,672,684 A | 6/1987 | Barnes | | |
| 4,673,109 A | 6/1987 | Cassia | | |
| 4,717,046 A | 1/1988 | Brogli | | |
| 4,759,472 A * | 7/1988 | Strenger | ............ | B65D 75/5822 222/541.4 |
| 4,787,536 A * | 11/1988 | Widerstrom | ........... | B65D 1/095 206/532 |
| 4,792,060 A | 12/1988 | Brogli | | |
| 4,861,632 A | 8/1989 | Caggiano | | |
| 4,872,558 A * | 10/1989 | Pharo | .................... | B65D 81/03 206/522 |
| 4,898,280 A | 2/1990 | Runge | | |
| 4,898,306 A | 2/1990 | Pardes | | |
| 4,917,267 A * | 4/1990 | Laverdure | ............ | B65D 1/0238 222/107 |
| 4,918,904 A * | 4/1990 | Pharo | .................... | B65D 81/03 493/931 |
| 4,921,137 A * | 5/1990 | Heijenga | ............ | B65D 75/5811 206/469 |
| 4,928,852 A * | 5/1990 | Guiffray | ................. | B65D 75/32 222/107 |
| 4,930,667 A | 6/1990 | Holzner, Sr. | | |
| 4,932,562 A | 6/1990 | Christine | | |
| 4,949,530 A | 8/1990 | Pharo | | |
| 4,988,016 A * | 1/1991 | Hawkins | .............. | B65D 75/30 222/107 |
| 5,012,956 A * | 5/1991 | Stoody | .................. | B65D 83/0055 222/206 |

(56) References Cited

U.S. PATENT DOCUMENTS

| | | | |
|---|---|---|---|
| 5,018,646 A * | 5/1991 | Billman | B65D 75/5822 222/107 |
| 5,059,036 A | 10/1991 | Richison | |
| 5,072,855 A * | 12/1991 | Herzig | B65D 47/2037 222/212 |
| 5,131,760 A * | 7/1992 | Farmer | B65D 75/30 206/484 |
| 5,137,154 A * | 8/1992 | Cohen | B65D 33/00 206/522 |
| 5,254,073 A | 10/1993 | Richison | |
| 5,261,899 A | 11/1993 | Visscher | |
| 5,272,856 A * | 12/1993 | Pharo | B65D 81/052 53/403 |
| 5,307,955 A | 5/1994 | Viegas | |
| 5,326,176 A | 7/1994 | Domke | |
| 5,332,121 A * | 7/1994 | Schmidt | B29C 45/1646 222/105 |
| 5,348,155 A | 9/1994 | Ishiwa | |
| 5,399,022 A | 3/1995 | Sheets | |
| 5,409,144 A * | 4/1995 | Brown | B65D 47/2031 220/203.17 |
| 5,411,178 A * | 5/1995 | Roders | A47K 5/1215 222/105 |
| 5,427,830 A | 6/1995 | Pharo | |
| 5,447,235 A | 9/1995 | Pharo | |
| 5,467,897 A | 11/1995 | Williams | |
| 5,472,123 A * | 12/1995 | Jangaard | B65D 1/023 222/212 |
| 5,529,224 A * | 6/1996 | Chan | B65D 75/58 222/107 |
| 5,553,942 A | 9/1996 | Domke | |
| 5,582,330 A * | 12/1996 | Iba | A61F 9/0008 222/212 |
| 5,620,096 A * | 4/1997 | Pozzo | B65D 81/052 206/450 |
| 5,678,736 A * | 10/1997 | Hansen | A61J 1/067 222/209 |
| 5,692,833 A * | 12/1997 | DeLuca | A45C 3/00 206/446 |
| 5,819,991 A | 10/1998 | Kohn | |
| 5,839,609 A * | 11/1998 | Zakensberg | B65D 75/32 206/484 |
| 5,871,790 A | 2/1999 | Monier | |
| 5,921,167 A | 7/1999 | Giesy | |
| 5,935,659 A | 8/1999 | Cane et al. | |
| 5,960,975 A | 10/1999 | Lennartsson | |
| 5,990,271 A | 11/1999 | Noda | |
| 5,996,800 A | 12/1999 | Pratt | |
| RE36,548 E | 2/2000 | Noda | |
| 6,065,642 A | 5/2000 | Brown | |
| 6,073,812 A | 6/2000 | Wade | |
| 6,120,817 A | 9/2000 | Archibald | |
| 6,164,825 A | 12/2000 | Larkin et al. | |
| 6,170,985 B1 | 1/2001 | Shabram, Jr. | |
| 6,244,466 B1 | 6/2001 | Naslund | |
| 6,247,603 B1 | 6/2001 | Farrell | |
| 6,251,489 B1 | 6/2001 | Weiss | |
| 6,279,783 B1 * | 8/2001 | Brown | B65D 47/2031 220/203.19 |
| 6,423,356 B2 | 7/2002 | Richison | |
| 6,460,781 B1 * | 10/2002 | Garcia | A45D 37/00 222/107 |
| 6,520,332 B1 * | 2/2003 | Barmore | B65D 71/10 206/497 |
| 6,536,631 B1 * | 3/2003 | Nickels | B65D 47/2018 222/212 |
| 6,629,777 B2 * | 10/2003 | Tanaka | B65D 33/02 206/522 |
| 6,653,523 B1 | 11/2003 | McCormack | |
| 6,662,827 B1 | 12/2003 | Clougherty | |
| 6,670,007 B1 | 12/2003 | Safian | |
| 6,679,439 B2 * | 1/2004 | Duqueroie | B05B 11/048 222/92 |
| 6,761,288 B2 | 7/2004 | Garcia | |
| 6,814,991 B2 | 11/2004 | Hiyoshi | |
| 6,827,105 B1 | 12/2004 | Marble | |
| 6,827,492 B2 | 12/2004 | Cook | |
| 6,932,509 B2 | 8/2005 | Shah | |
| 6,983,845 B2 | 1/2006 | Shah | |
| 7,004,322 B1 * | 2/2006 | Bartoli | B65D 75/5811 206/484 |
| 7,007,823 B2 | 3/2006 | Jackson | |
| 7,163,101 B2 * | 1/2007 | Harper | B65D 75/54 206/210 |
| 7,207,717 B2 * | 4/2007 | Steele | B65D 33/01 383/10 |
| 7,331,715 B2 | 2/2008 | Miller | |
| 7,438,473 B2 | 10/2008 | Borchardt | |
| 7,487,894 B2 * | 2/2009 | Zahn | A61J 1/067 222/107 |
| 7,524,531 B2 | 4/2009 | Axtell, III | |
| 7,527,840 B2 | 5/2009 | Zeik | |
| 7,585,528 B2 * | 9/2009 | Ferri | B65D 75/52 206/522 |
| 7,703,619 B2 * | 4/2010 | Van Puijenbroek | B65D 17/165 220/266 |
| 7,819,582 B2 | 10/2010 | Rosen | |
| 7,874,731 B2 | 1/2011 | Turvey | |
| 7,887,238 B2 | 2/2011 | Turvey | |
| 7,922,045 B2 | 4/2011 | Ianna et al. | |
| 8,061,563 B1 * | 11/2011 | Rosen | B65D 75/5805 206/484 |
| 8,181,428 B2 | 5/2012 | Gustafsson | |
| 8,336,790 B2 * | 12/2012 | Kolins | A61L 9/042 222/206 |
| 8,337,190 B2 | 12/2012 | Curro | |
| 8,381,948 B1 * | 2/2013 | Jian | B65D 75/008 222/107 |
| 8,419,279 B2 | 4/2013 | Borchardt | |
| 8,540,094 B2 | 9/2013 | Riedl | |
| 8,661,772 B2 | 3/2014 | Yasuhira | |
| 8,662,751 B2 | 3/2014 | Forss | |
| 9,016,521 B2 | 4/2015 | Foster | |
| 9,174,765 B2 | 11/2015 | Sinclair | |
| 9,187,226 B2 | 11/2015 | Lee | |
| 9,211,538 B2 * | 12/2015 | Weber | B01L 3/502738 |
| 9,327,867 B2 * | 5/2016 | Stanley | B65D 75/008 |
| 9,469,088 B2 | 10/2016 | Stanley et al. | |
| 9,499,322 B2 * | 11/2016 | Araki | B65D 75/008 |
| 9,586,744 B2 | 3/2017 | Arent et al. | |
| 9,623,622 B2 * | 4/2017 | Baines | B31D 5/0073 |
| 9,688,459 B2 * | 6/2017 | Stanley | B65D 75/5883 |
| 9,694,965 B2 * | 7/2017 | Cox | B65D 75/008 |
| 9,731,889 B2 * | 8/2017 | Stanley | B65D 75/008 |
| 9,802,719 B2 * | 10/2017 | Stanley | B65B 3/02 |
| 9,850,046 B2 * | 12/2017 | Stanley | B65D 47/32 |
| 2001/0012530 A1 | 8/2001 | Hiyoshi | |
| 2002/0175175 A1 * | 11/2002 | Oshinsky | A47F 7/286 221/1 |
| 2002/0182390 A1 | 12/2002 | Migliorini | |
| 2002/0187326 A1 | 12/2002 | Kong | |
| 2003/0015549 A1 | 1/2003 | Yoshida | |
| 2003/0094394 A1 | 5/2003 | Anderson et al. | |
| 2003/0096068 A1 * | 5/2003 | Peper | B32B 21/08 428/34.1 |
| 2003/0136798 A1 | 7/2003 | Wilford | |
| 2003/0192909 A1 | 10/2003 | Maskell | |
| 2004/0000503 A1 | 1/2004 | Shah | |
| 2004/0035865 A1 * | 2/2004 | Rosen | B65D 33/02 220/4.01 |
| 2004/0037961 A1 | 2/2004 | Oieleman | |
| 2004/0238397 A1 | 12/2004 | Yu | |
| 2004/0264816 A1 | 12/2004 | Carter | |
| 2005/0006404 A1 * | 1/2005 | Harper | B65D 75/30 222/107 |
| 2005/0025560 A1 * | 2/2005 | Liberatore | B05C 17/00506 401/266 |
| 2005/0126941 A1 | 6/2005 | Ferri | |
| 2005/0255200 A1 | 11/2005 | Takahagi | |

(56) References Cited

U.S. PATENT DOCUMENTS

| | | | |
|---|---|---|---|
| 2005/0263426 A1* | 12/2005 | Ho | B65D 81/02 206/522 |
| 2005/0281493 A1 | 12/2005 | Heinemeier | |
| 2006/0030472 A1 | 2/2006 | Hartman | |
| 2006/0050999 A1 | 3/2006 | Blythe | |
| 2006/0072858 A1* | 4/2006 | Kurosawa | B29C 65/18 383/44 |
| 2006/0073291 A1 | 4/2006 | Wu | |
| 2006/0076058 A1 | 4/2006 | Rypstra | |
| 2006/0225787 A1 | 10/2006 | Newrones | |
| 2006/0228057 A1 | 10/2006 | Newrones | |
| 2006/0257056 A1 | 11/2006 | Miyake | |
| 2007/0003170 A1* | 1/2007 | Yoshida | B65D 81/075 383/3 |
| 2007/0023453 A1* | 2/2007 | Simkins | A47K 5/1201 222/183 |
| 2007/0023462 A1 | 2/2007 | Pugne | |
| 2007/0041669 A1* | 2/2007 | Rosen | B65D 75/008 383/104 |
| 2007/0068118 A1* | 3/2007 | Forss | B65D 75/563 53/403 |
| 2007/0071855 A1 | 3/2007 | Kanzaki | |
| 2007/0087096 A1 | 4/2007 | Mir | |
| 2007/0095862 A1 | 5/2007 | Swiss et al. | |
| 2007/0110856 A1 | 5/2007 | Kanzaki | |
| 2007/0228073 A1* | 10/2007 | Mazzarino | B65D 75/5811 222/107 |
| 2007/0231622 A1 | 10/2007 | Kozu | |
| 2008/0008986 A1* | 1/2008 | Gillespie | A47F 7/286 434/367 |
| 2008/0035519 A1* | 2/2008 | Swartz | B65D 31/145 206/522 |
| 2008/0149666 A1* | 6/2008 | LaFlamme | B65D 35/40 222/105 |
| 2008/0173665 A1* | 7/2008 | Oshinski | B65H 3/063 221/259 |
| 2008/0193055 A1* | 8/2008 | Chen | B65D 81/03 383/3 |
| 2008/0272146 A1 | 11/2008 | Kaczmarek | |
| 2008/0283483 A1 | 11/2008 | Kim | |
| 2008/0308572 A1* | 12/2008 | Gillespie | A47F 1/04 221/92 |
| 2009/0104324 A1* | 4/2009 | Bradley | B65D 81/3881 426/418 |
| 2009/0152282 A1 | 6/2009 | Lee | |
| 2009/0200336 A1* | 8/2009 | Koh | B65D 1/32 222/173 |
| 2009/0232424 A1 | 9/2009 | Bierschenk | |
| 2010/0061664 A1* | 3/2010 | Gustafsson | B65D 75/008 383/105 |
| 2010/0065582 A1* | 3/2010 | Nelson | B65B 61/02 222/107 |
| 2010/0264161 A1 | 10/2010 | Woodruff | |
| 2010/0308062 A1 | 12/2010 | Helou | |
| 2011/0006072 A1* | 1/2011 | Short | A45D 40/0087 220/737 |
| 2011/0103714 A1 | 5/2011 | Steele | |
| 2011/0103716 A1 | 5/2011 | Reilly | |
| 2011/0103718 A1 | 5/2011 | Bosman | |
| 2011/0120899 A1 | 5/2011 | Sorensen | |
| 2011/0139649 A1* | 6/2011 | Marcinkowski | B65D 25/20 206/354 |
| 2011/0155732 A1* | 6/2011 | Sprunger | A23F 5/46 220/212 |
| 2011/0163114 A1* | 7/2011 | Webb | A61J 1/1443 222/1 |
| 2011/0192121 A1 | 8/2011 | Kannankeril | |
| 2011/0192868 A1 | 8/2011 | Kardos | |
| 2011/0200379 A1 | 8/2011 | de Gery | |
| 2011/0290798 A1* | 12/2011 | Corbett | B65D 11/04 220/62.12 |
| 2012/0085782 A1* | 4/2012 | Futori | A47G 23/0258 222/105 |
| 2012/0097634 A1* | 4/2012 | Riedl | B29B 11/06 215/379 |
| 2012/0205381 A1 | 8/2012 | Madai | |
| 2012/0241455 A1* | 9/2012 | Scholvinck | B65D 77/2036 220/268 |
| 2013/0032316 A1 | 2/2013 | Ohiman | |
| 2013/0056082 A1 | 3/2013 | Nunez | |
| 2013/0180521 A1 | 7/2013 | Baschnagel | |
| 2013/0292287 A1* | 11/2013 | Stanley | B65D 85/00 206/459.5 |
| 2013/0292353 A1 | 11/2013 | Stanley et al. | |
| 2013/0292395 A1 | 11/2013 | Stanley et al. | |
| 2013/0292413 A1 | 11/2013 | Stanley et al. | |
| 2013/0292415 A1 | 11/2013 | Stanley et al. | |
| 2013/0294711 A1 | 11/2013 | Stanley et al. | |
| 2013/0337244 A1 | 12/2013 | Stanley et al. | |
| 2014/0033654 A1 | 2/2014 | Stanley et al. | |
| 2014/0033655 A1 | 2/2014 | Stanley et al. | |
| 2014/0138408 A1 | 5/2014 | Loya | |
| 2014/0187666 A1 | 7/2014 | Aizenberg | |
| 2014/0231453 A1 | 8/2014 | James | |
| 2014/0250834 A1 | 9/2014 | Yoshikane et al. | |
| 2014/0370160 A1* | 12/2014 | Martin | B32B 7/12 426/110 |
| 2015/0033671 A1 | 2/2015 | Stanley et al. | |
| 2015/0034662 A1 | 2/2015 | Stanley et al. | |
| 2015/0034670 A1 | 2/2015 | Stanley et al. | |
| 2015/0036950 A1 | 2/2015 | Stanley et al. | |
| 2015/0121810 A1 | 5/2015 | Bourgeois et al. | |
| 2015/0122373 A1 | 5/2015 | Bourgeois et al. | |
| 2015/0122840 A1 | 5/2015 | Cox et al. | |
| 2015/0122841 A1 | 5/2015 | McGuire et al. | |
| 2015/0122842 A1 | 5/2015 | Berg et al. | |
| 2015/0122846 A1 | 5/2015 | Stanley et al. | |
| 2015/0125099 A1 | 5/2015 | Ishihara et al. | |
| 2015/0125574 A1 | 5/2015 | Arent et al. | |
| 2015/0126349 A1 | 5/2015 | Ishihara et al. | |
| 2016/0176578 A1 | 6/2016 | Stanley et al. | |
| 2016/0176582 A1 | 6/2016 | McGuire et al. | |
| 2016/0176583 A1 | 6/2016 | Ishihara et al. | |
| 2016/0176584 A1 | 6/2016 | Ishihara et al. | |
| 2016/0176597 A1 | 6/2016 | Ishihara et al. | |
| 2016/0221727 A1 | 8/2016 | Stanley et al. | |
| 2016/0297569 A1 | 10/2016 | Berg et al. | |
| 2016/0297589 A1 | 10/2016 | You et al. | |
| 2016/0297590 A1 | 10/2016 | You et al. | |
| 2016/0297591 A1 | 10/2016 | You et al. | |
| 2016/0325518 A1 | 11/2016 | Ishihara et al. | |
| 2016/0362228 A1 | 12/2016 | McGuire et al. | |
| 2017/0001782 A1 | 1/2017 | Arent et al. | |
| 2017/0305609 A1 | 10/2017 | McGuire et al. | |
| 2017/0305627 A1 | 10/2017 | Arent et al. | |
| 2018/0079574 A1 | 3/2018 | Ishihara et al. | |

FOREIGN PATENT DOCUMENTS

| | | |
|---|---|---|
| CN | 1640777 | 7/2005 |
| CN | 2815919 U | 9/2006 |
| DE | 202004009084 | 12/2004 |
| DE | 202005016704 | 3/2006 |
| DE | 102005002301 | 7/2006 |
| EP | 0172711 | 2/1986 |
| EP | 2574567 | 3/2013 |
| GB | 2458222 | 3/2009 |
| JP | S63-502421 | 9/1988 |
| JP | H10-7159 | 1/1998 |
| JP | H107159 | 1/1998 |
| JP | H11-193039 | 7/1999 |
| JP | 2000109103 | 4/2000 |
| JP | U3089141 | 10/2002 |
| JP | 2003291993 | 10/2003 |
| JP | 2005343492 | 12/2005 |
| JP | 200644714 | 2/2006 |
| JP | 2006027697 | 2/2006 |
| JP | 2006240651 | 9/2006 |
| JP | 2009184690 | 8/2009 |
| JP | 4639677 | 2/2011 |
| JP | 2012025394 | 2/2012 |

(56) References Cited

FOREIGN PATENT DOCUMENTS

| | | |
|---|---|---|
| RU | 2038815 | 7/1995 |
| TW | 200936461 | 9/2009 |
| WO | WO1996001775 | 1/1996 |
| WO | WO2005063589 | 7/2005 |
| WO | WO2008064508 | 6/2008 |
| WO | WO2012073004 | 6/2012 |
| WO | WO2013124201 | 8/2013 |

OTHER PUBLICATIONS

All Office Actions, dated May 22, 2015, Dec. 9, 2015, U.S. Appl. No. 14/334,784, filed Jul. 18, 2014.
International Search Report and Written Opinion, PCT/US2014/064280, dated Mar. 10, 2015, 10 pgs.

* cited by examiner

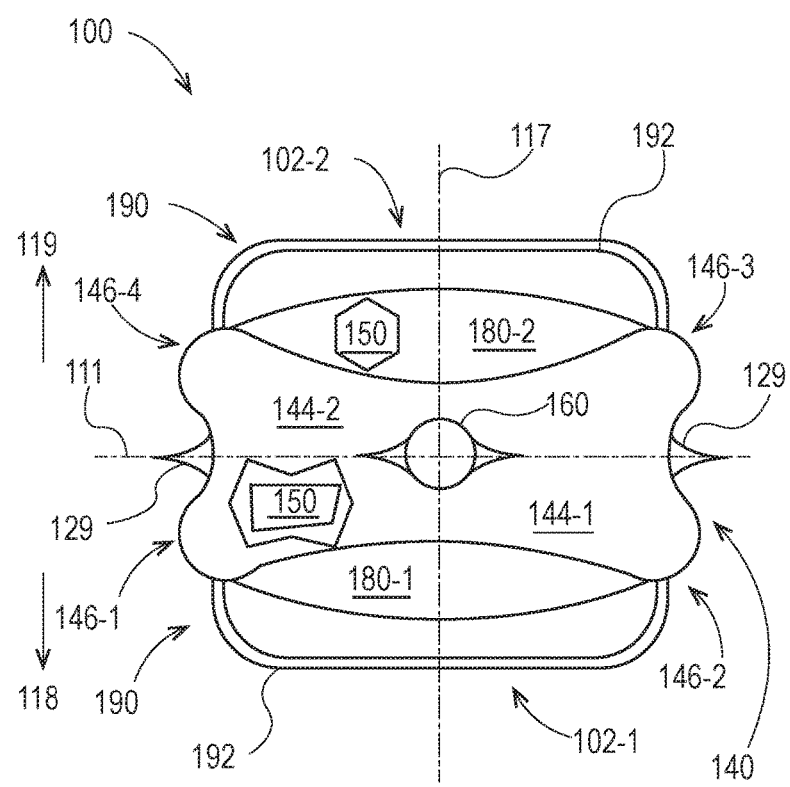
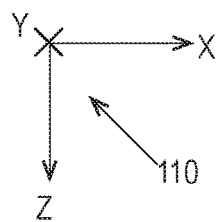
Fig. 1C

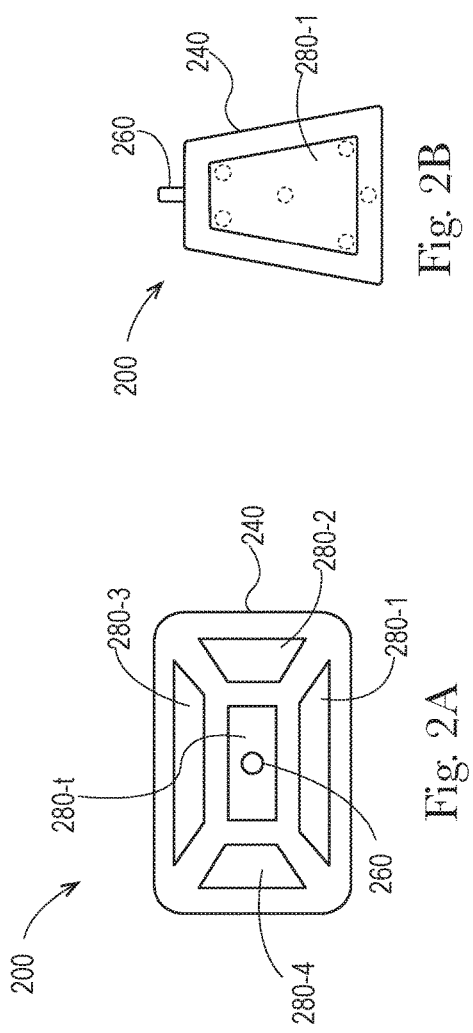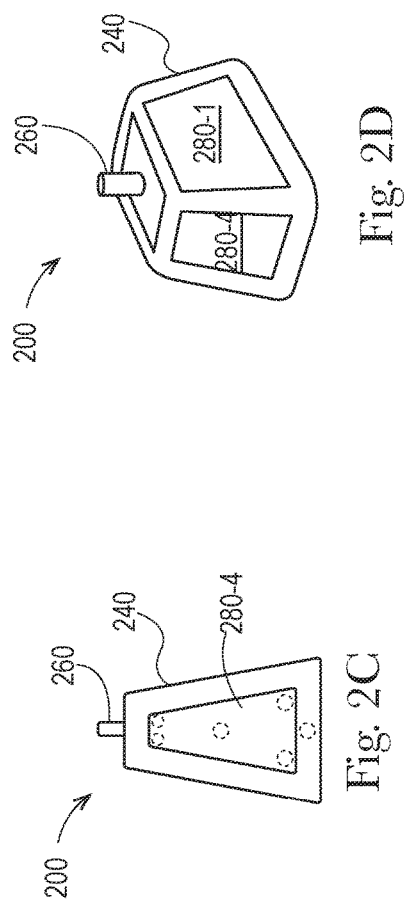

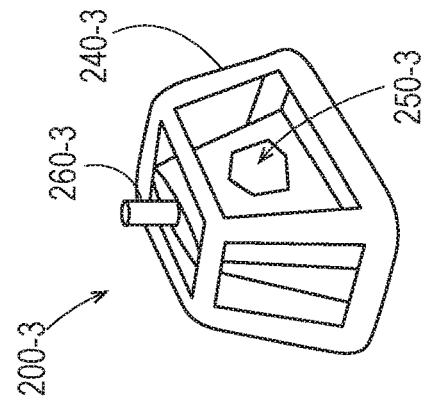
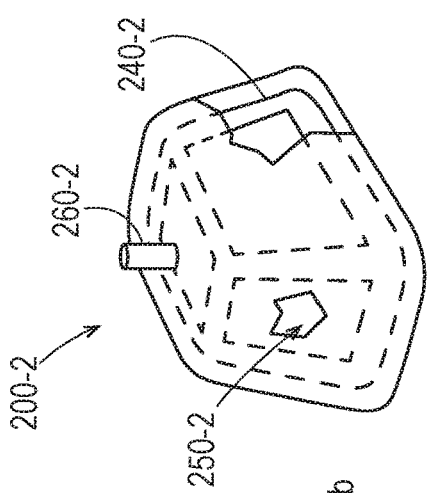
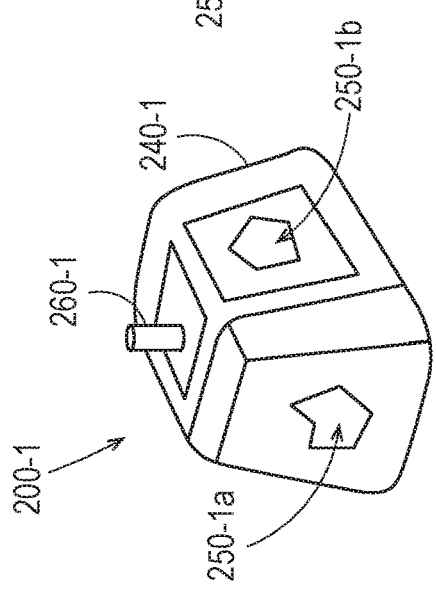
Fig. 2G
Fig. 2F
Fig. 2E

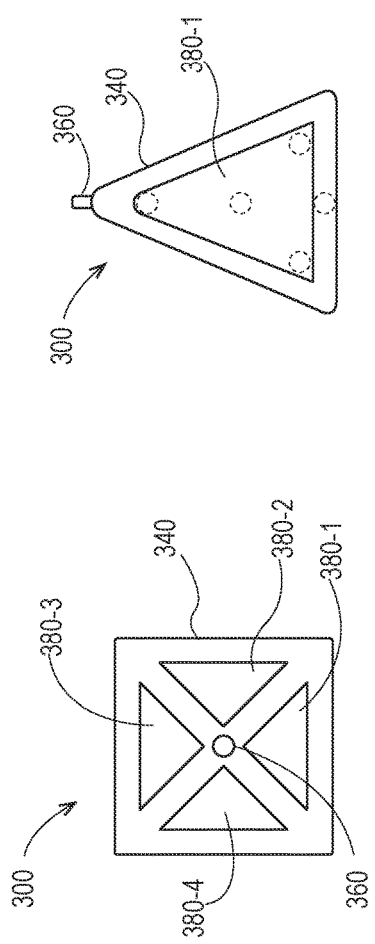
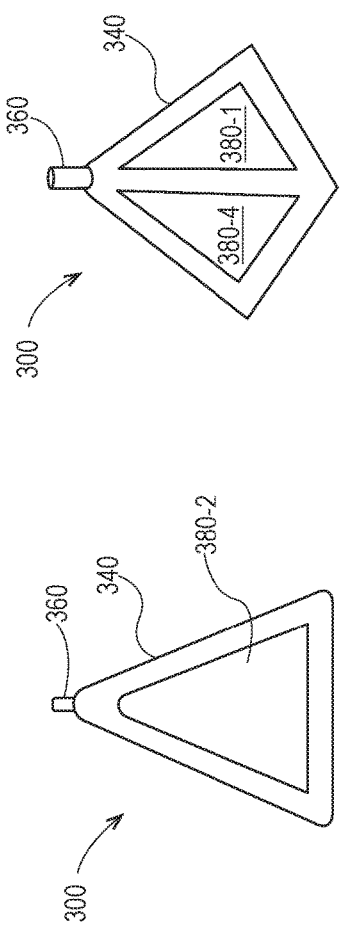
Fig. 3A
Fig. 3B
Fig. 3C
Fig. 3D

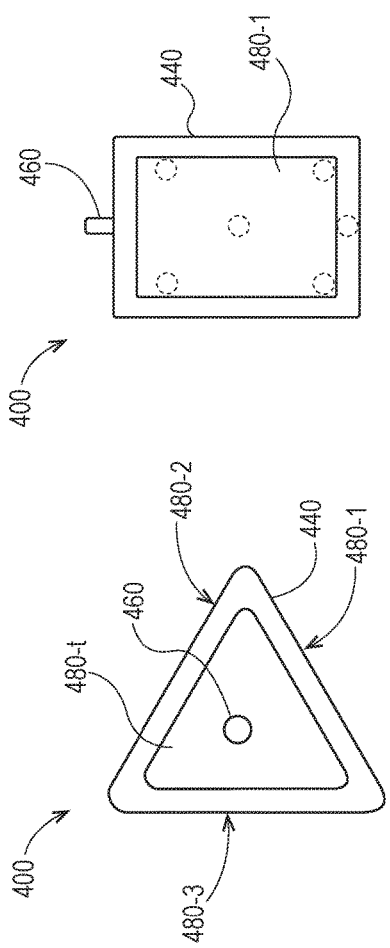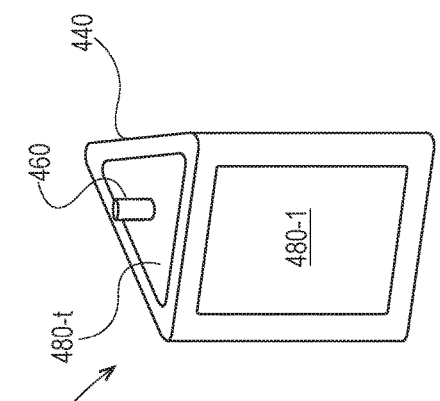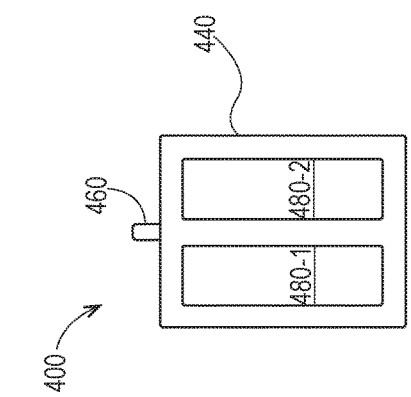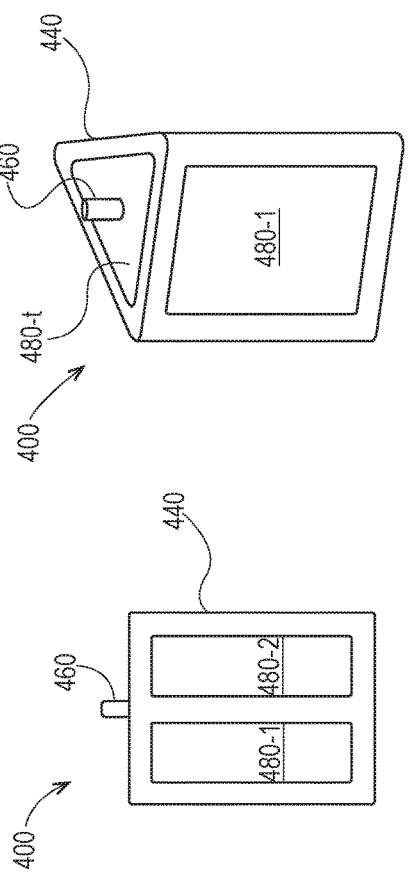

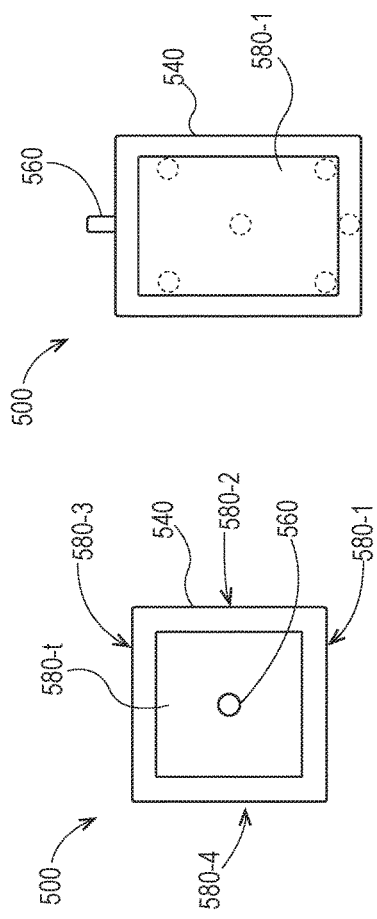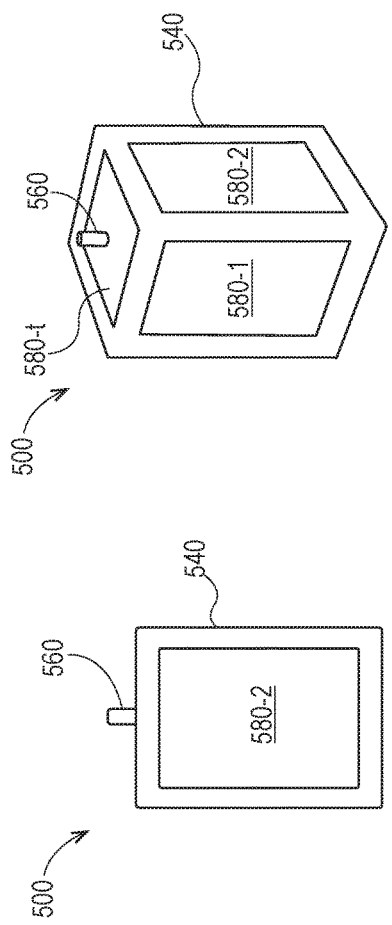

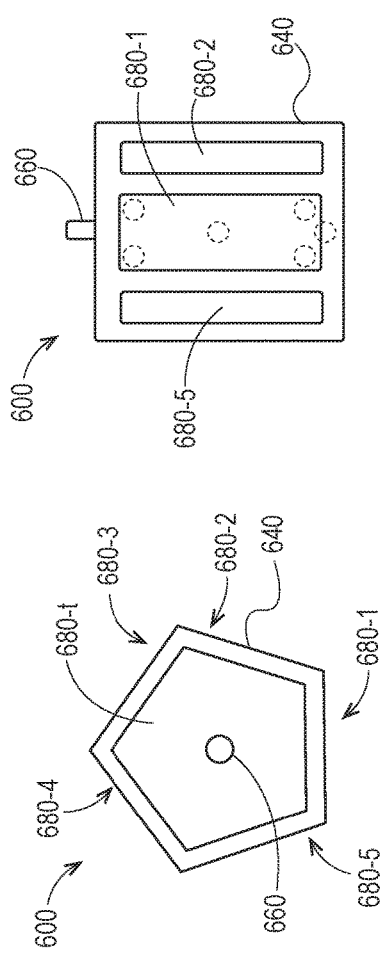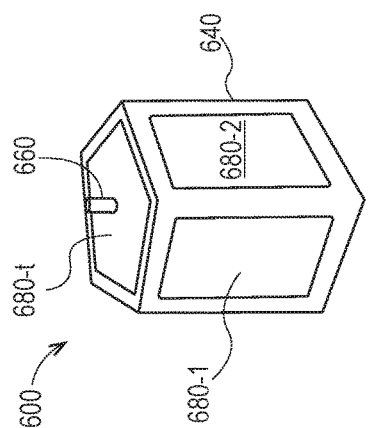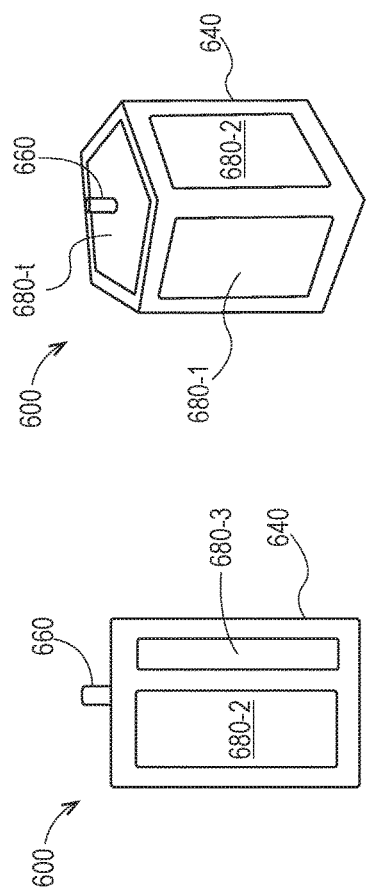

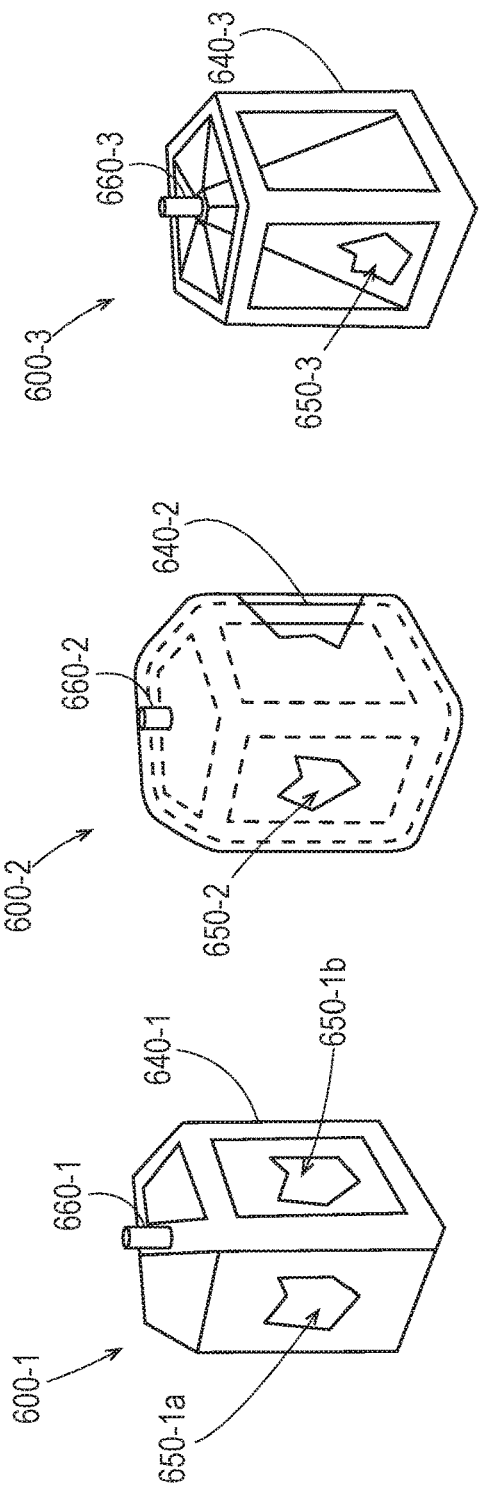

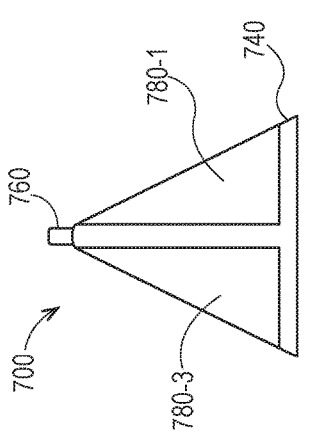
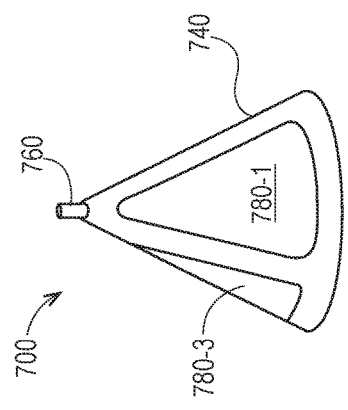
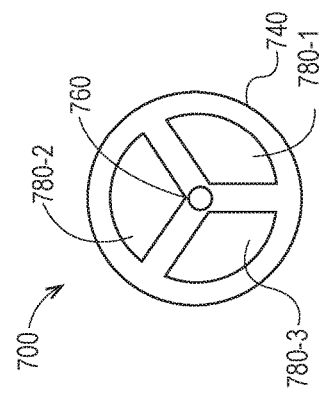
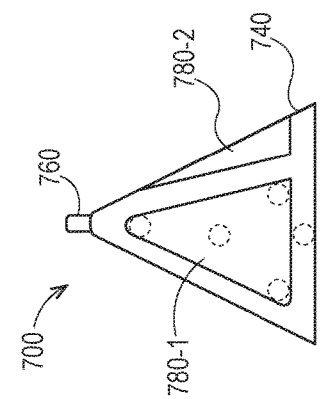

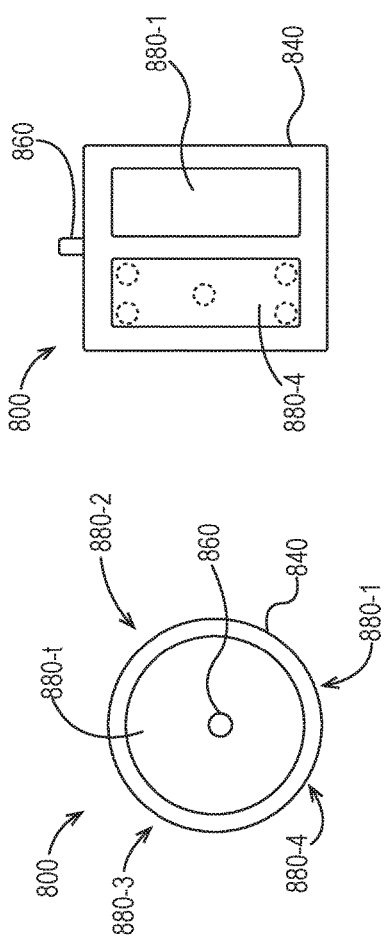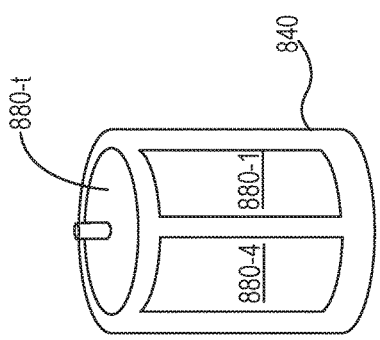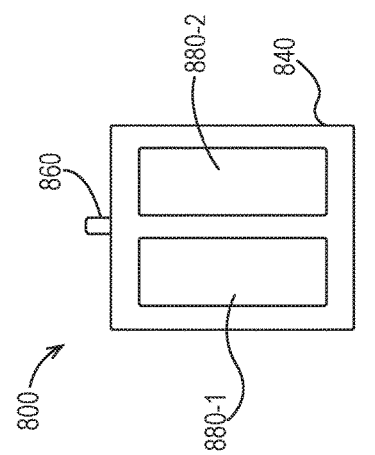

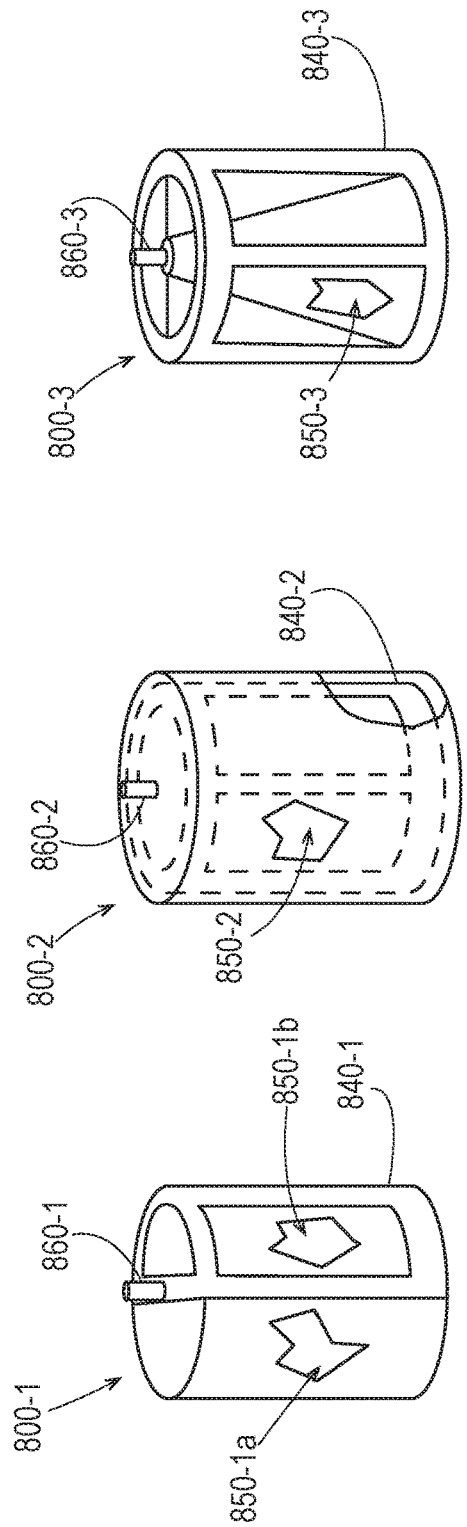

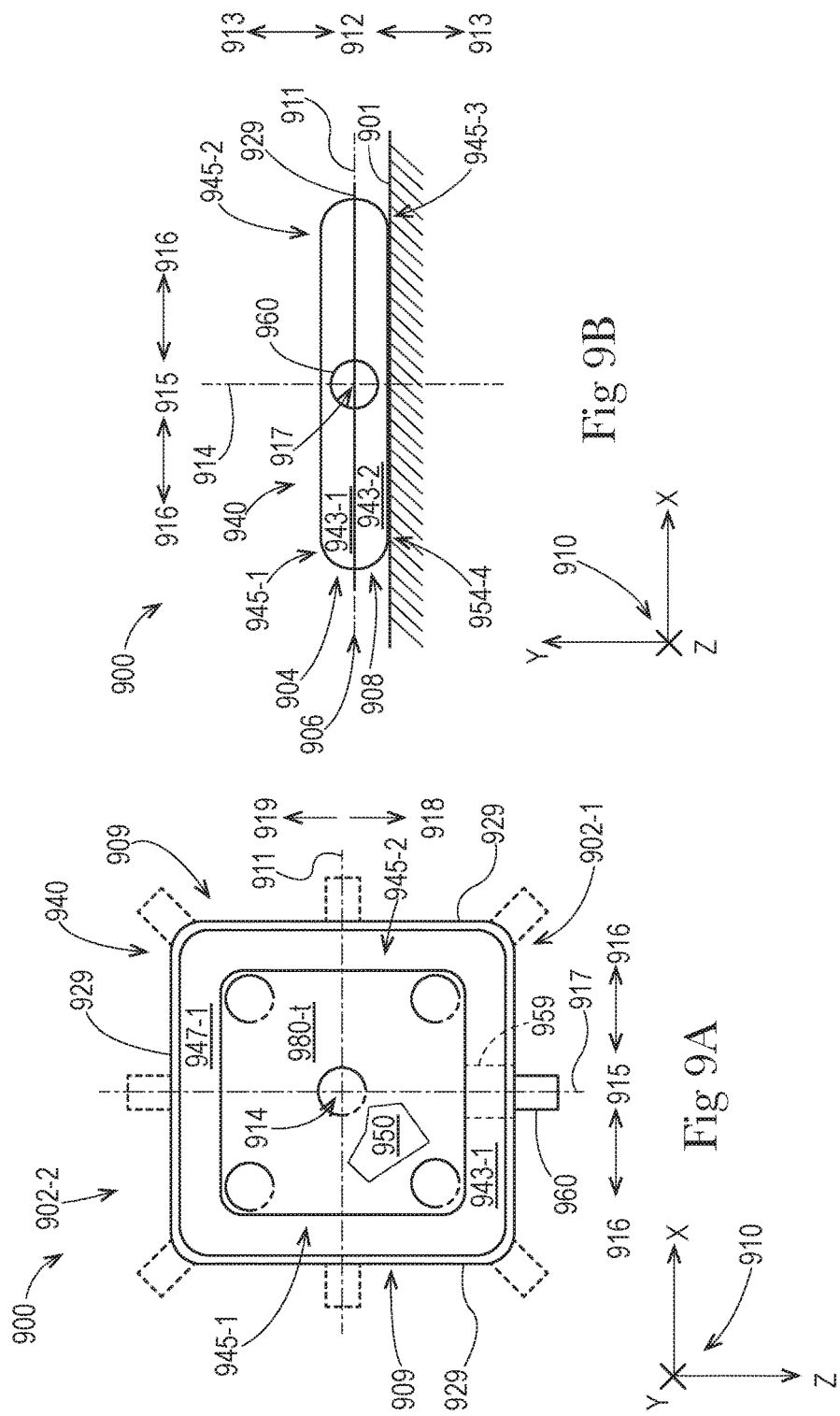

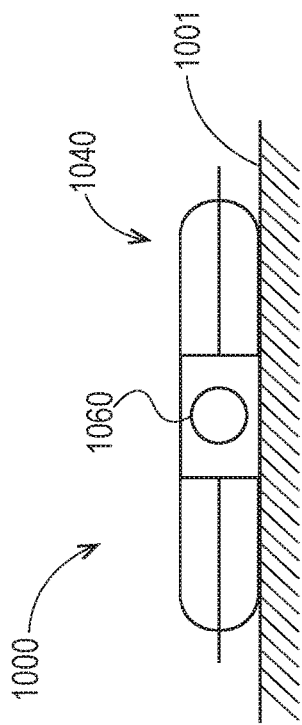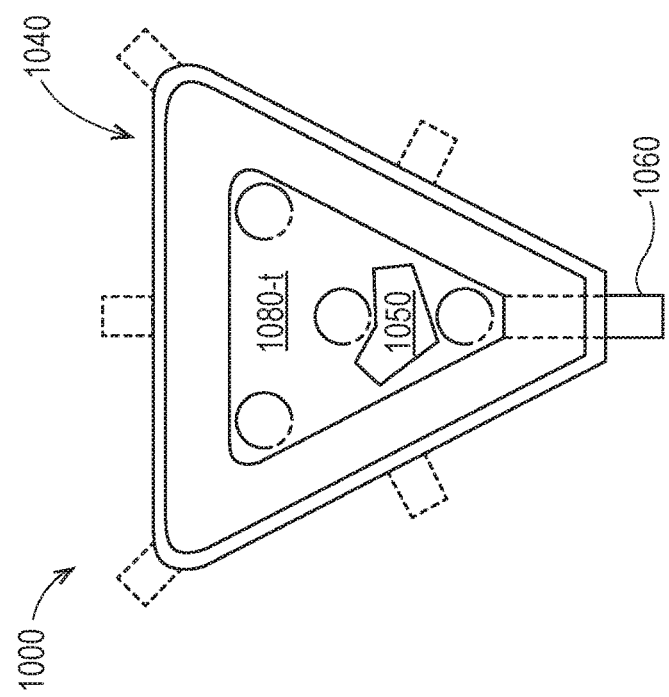

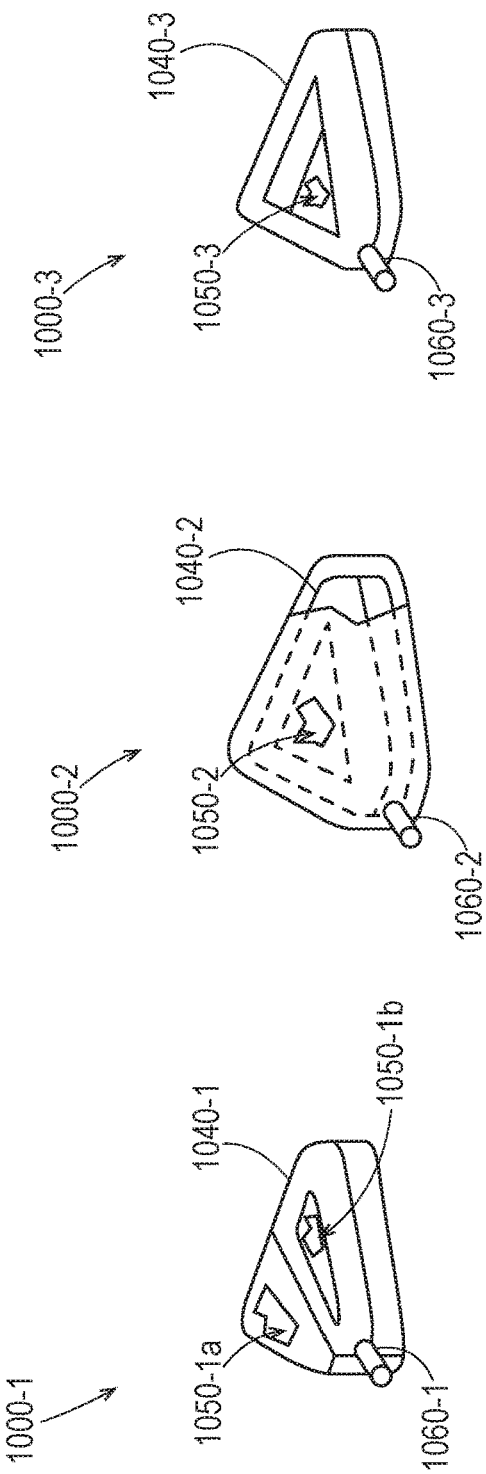

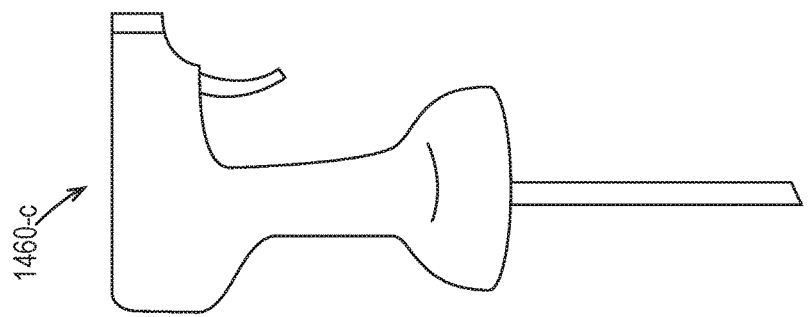
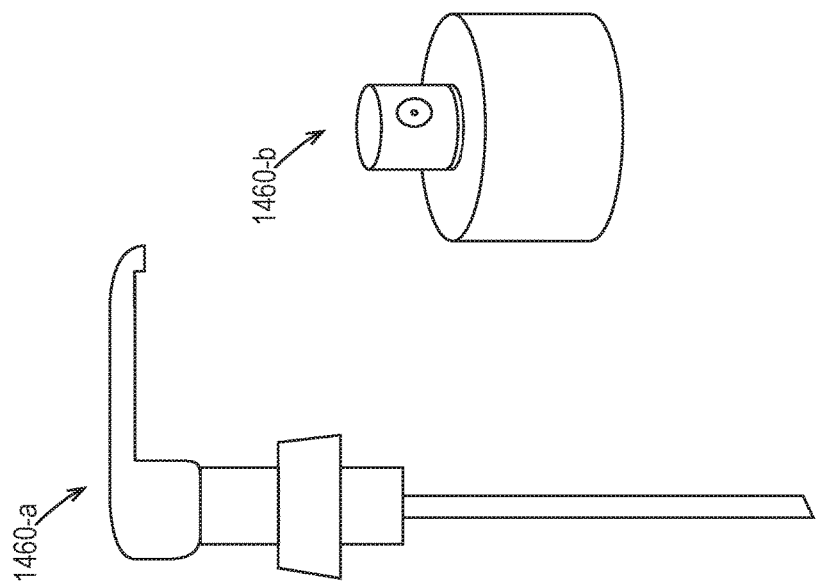

US 10,138,049 B2

FLEXIBLE CONTAINERS HAVING FLEXIBLE VALVES

FIELD

The present disclosure relates in general to containers, and in particular, to containers made from flexible material having flexible valves.

BACKGROUND

Fluent products include liquid products and/or pourable solid products. In various embodiments, a container can be used to receive, contain, and dispense one or more fluent products. And, in various embodiments, a container can be used to receive, contain, and/or dispense individual articles or separately packaged portions of a product. A container can include one or more product volumes. A product volume can be configured to be filled with one or more fluent products. A container receives a fluent product when its product volume is filled. Once filled to a desired volume, a container can be configured to contain the fluent product in its product volume, until the fluent product is dispensed. A container contains a fluent product by providing a barrier around the fluent product. The barrier prevents the fluent product from escaping the product volume. The barrier can also protect the fluent product from the environment outside of the container. A filled product volume is typically closed off by a cap or a seal. A container can be configured to dispense one or more fluent products contained in its product volume(s). Once dispensed, an end user can consume, apply, or otherwise use the fluent product(s), as appropriate. In various embodiments, a container may be configured to be refilled and reused or a container may be configured to be disposed of after a single fill or even after a single use. A container should be configured with sufficient structural integrity, such that it can receive, contain, and dispense its fluent product(s), as intended, without failure.

A container for fluent product(s) can be handled, displayed for sale, and put into use. A container can be handled in many different ways as it is made, filled, decorated, packaged, shipped, and unpacked. A container can experience a wide range of external forces and environmental conditions as it is handled by machines and people, moved by equipment and vehicles, and contacted by other containers and various packaging materials. A container for fluent product(s) should be configured with sufficient structural integrity, such that it can be handled in any of these ways, or in any other way known in the art, as intended, without failure.

A container can also be displayed for sale in many different ways as it is offered for purchase. A container can be offered for sale as an individual article of commerce or packaged with one or more other containers or products, which together form an article of commerce. A container can be offered for sale as a primary package with or without a secondary package. A container can be decorated to display characters, graphics, branding, and/or other visual elements when the container is displayed for sale. A container can be configured to be displayed for sale while laying down or standing up on a store shelf, while presented in a merchandising display, while hanging on a display hanger, or while loaded into a display rack or a vending machine. A container for fluent product(s) should be configured with a structure that allows it to be displayed in any of these ways, or in any other way known in the art, as intended, without failure.

A container can also be put into use in many different ways, by its end user. A container can be configured to be held and/or gripped by an end user, so a container should be appropriately sized and shaped for human hands; and for this purpose, a container can include useful structural features such as a handle and/or a gripping surface. A container can be stored while laying down or standing up on a support surface, while hanging on or from a projection such as a hook or a clip, or while supported by a product holder, or (for refillable or rechargeable containers) positioned in a refilling or recharging station. A container can be configured to dispense fluent product(s) while in any of these storage positions or while being held by the user. A container can be configured to dispense fluent product(s) through the use of gravity, and/or pressure, and/or a dispensing mechanism, such as a pump, or a straw, or through the use of other kinds of dispensers known in the art. Some containers can be configured to be filled and/or refilled by a seller (e.g. a merchant or retailer) or by an end user. A container for fluent product(s) should be configured with a structure that allows it to be put to use in any of these ways, or in any other way known in the art, as intended, without failure. A container can also be configured to be disposed of by the end user, as waste and/or recyclable material, in various ways.

One conventional type of container for fluent products is a rigid container made from solid material(s). Examples of conventional rigid containers include molded plastic bottles, glass jars, metal cans, cardboard boxes, etc. These conventional rigid containers are well-known and generally useful; however their designs do present several notable difficulties.

First, some conventional rigid containers for fluent products can be expensive to make. Some rigid containers are made by a process shaping one or more solid materials. Other rigid containers are made with a phase change process, where container materials are heated (to soften/melt), then shaped, then cooled (to harden/solidify). Both kinds of making are energy intensive processes, which can require complex equipment.

Second, some conventional rigid containers for fluent products can require significant amounts of material. Rigid containers that are designed to stand up on a support surface require solid walls that are thick enough to support the containers when they are filled. This can require significant amounts of material, which adds to the cost of the containers and can contribute to difficulties with their disposal.

Third, some conventional rigid containers for fluent products can be difficult to decorate. The sizes, shapes, (e.g. curved surfaces) and/or materials of some rigid containers, make it difficult to print directly on their outside surfaces. Labeling requires additional materials and processing, and limits the size and shape of the decoration. Overwrapping provides larger decoration areas, but also requires additional materials and processing, often at significant expense.

Fourth, some conventional rigid containers for fluent products can be prone to certain kinds of damage. If a rigid container is pushed against a rough surface, then the container can become scuffed, which may obscure printing on the container. If a rigid container is pressed against a hard object, then the container can become dented, which may look unsightly. And if a rigid container is dropped, then the container can rupture, which may cause its fluent product to be lost.

Fifth, some fluent products in conventional rigid containers can be difficult to dispense. When an end user squeezes a rigid container to dispense its fluent product, the end user must overcome the resistance of the rigid sides, to deform the container. Some users may lack the hand strength to easily overcome that resistance; these users may dispense less than their desired amount of fluent product. Other users may need to apply so much of their hand strength, that they cannot easily control how much they deform the container; these users may dispense more than their desired amount of fluent product.

SUMMARY

The present disclosure describes various embodiments of containers made from flexible material. Because these containers are made from flexible material, these containers can be less expensive to make, can use less material, and can be easier to decorate, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to print and/or decorate, because they are made from flexible materials, and flexible materials can be printed and/or decorated as conformable webs, before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands. Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed and put into use, as intended, without failure.

In particular, the present disclosure describes various embodiments of containers made from flexible material having a flexible valve that is closed below a critical squeeze force on the container or a critical pressure buildup inside the container. Manipulation of the container to reduce the product volume beyond a critical squeeze force results in achieving a critical pressure buildup to enable dispensing of a product. The fluent product in the various embodiments may be easier to dispense because the valves in the various embodiments may have a squeeze-to-open configuration that allows a user to single-handedly pick up the container, dispense fluent product, and set the container back down, unlike conventional rigid containers that may necessitate the use of two hands to open and close a lid or other sealing mechanism.

BRIEF DESCRIPTION OF THE DRAWINGS

FIG. 1C illustrates a top view of the stand up flexible container of FIG. 1A.
FIG. 2A illustrates a top view of a stand up flexible container having a structural support frame that has an overall shape like a frustum.
FIG. 2B illustrates a front view of the container of FIG. 2A.
FIG. 2C illustrates a side view of the container of FIG. 2A.
FIG. 2D illustrates an isometric view of the container of FIG. 2A.
FIG. 2E illustrates a perspective view of an alternative embodiment of the stand up flexible container of FIG. 2A, including an asymmetric structural support frame.
FIG. 2F illustrates a perspective view of an alternative embodiment of the stand up flexible container of FIG. 1A, including an internal structural support frame.
FIG. 2G illustrates a perspective view of an alternative embodiment of the stand up flexible container of FIG. 2A, including an external structural support frame.
FIG. 3A illustrates a top view of a stand up flexible container having a structural support frame that has an overall shape like a pyramid.
FIG. 3B illustrates a front view of the container of FIG. 3A.
FIG. 3C illustrates a side view of the container of FIG. 3A.
FIG. 3D illustrates an isometric view of the container of FIG. 3A.
FIG. 4A illustrates a top view of a stand up flexible container having a structural support frame that has an overall shape like a trigonal prism.
FIG. 4B illustrates a front view of the container of FIG. 4A.
FIG. 4C illustrates a side view of the container of FIG. 4A.
FIG. 4D illustrates an isometric view of the container of FIG. 4A.

FIG. 5A illustrates a top view of a stand up flexible container having a structural support frame that has an overall shape like a tetragonal prism.

FIG. 5B illustrates a front view of the container of FIG. 5A.

FIG. 5C illustrates a side view of the container of FIG. 5A.

FIG. 5D illustrates an isometric view of the container of FIG. 5A.

FIG. 6A illustrates a top view of a stand up flexible container having a structural support frame that has an overall shape like a pentagonal prism.

FIG. 6B illustrates a front view of the container of FIG. 6A.

FIG. 6C illustrates a side view of the container of FIG. 6A.

FIG. 6D illustrates an isometric view of the container of FIG. 6A.

FIG. 6E illustrates a perspective view of an alternative embodiment of the stand up flexible container of FIG. 6A, including an asymmetric structural support frame.

FIG. 6F illustrates a perspective view of an alternative embodiment of the stand up flexible container of FIG. 6A, including an internal structural support frame.

FIG. 6G illustrates a perspective view of an alternative embodiment of the stand up flexible container of FIG. 6A, including an external structural support frame.

FIG. 7A illustrates a top view of a stand up flexible container having a structural support frame that has an overall shape like a cone.

FIG. 7B illustrates a front view of the container of FIG. 7A.

FIG. 7C illustrates a side view of the container of FIG. 7A.

FIG. 7D illustrates an isometric view of the container of FIG. 7A.

FIG. 8A illustrates a top view of a stand up flexible container having a structural support frame that has an overall shape like a cylinder.

FIG. 8B illustrates a front view of the container of FIG. 8A.

FIG. 8C illustrates a side view of the container of FIG. 8A.

FIG. 8D illustrates an isometric view of the container of FIG. 8A.

FIG. 8E illustrates a perspective view of an alternative embodiment of the stand up flexible container of FIG. 8A, including an asymmetric structural support frame.

FIG. 8F illustrates a perspective view of an alternative embodiment of the stand up flexible container of FIG. 8A, including an internal structural support frame.

FIG. 8G illustrates a perspective view of an alternative embodiment of the stand up flexible container of FIG. 8A, including an external structural support frame.

FIG. 9A illustrates a top view of an embodiment of a self-supporting flexible container, having an overall shape like a square.

FIG. 9B illustrates an end view of the flexible container of FIG. 9A.

FIG. 10A illustrates a top view of an embodiment of a self-supporting flexible container, having an overall shape like a triangle.

FIG. 10B illustrates an end view of the flexible container of FIG. 10A.

FIG. 10C illustrates a perspective view of an alternative embodiment of the self-supporting flexible container of FIG. 10A, including an asymmetric structural support frame.

FIG. 10D illustrates a perspective view of an alternative embodiment of the self-supporting flexible container of FIG. 10A, including an internal structural support frame.

FIG. 10E illustrates a perspective view of an alternative embodiment of the self-supporting flexible container of FIG. 10A, including an external structural support frame.

FIG. 14A illustrates an isometric view of pump type dispenser.

FIG. 14B illustrates an isometric view of pump spray type dispenser.

FIG. 14C illustrates an isometric view of trigger spray type dispenser.

DETAILED DESCRIPTION

Figure 1A:
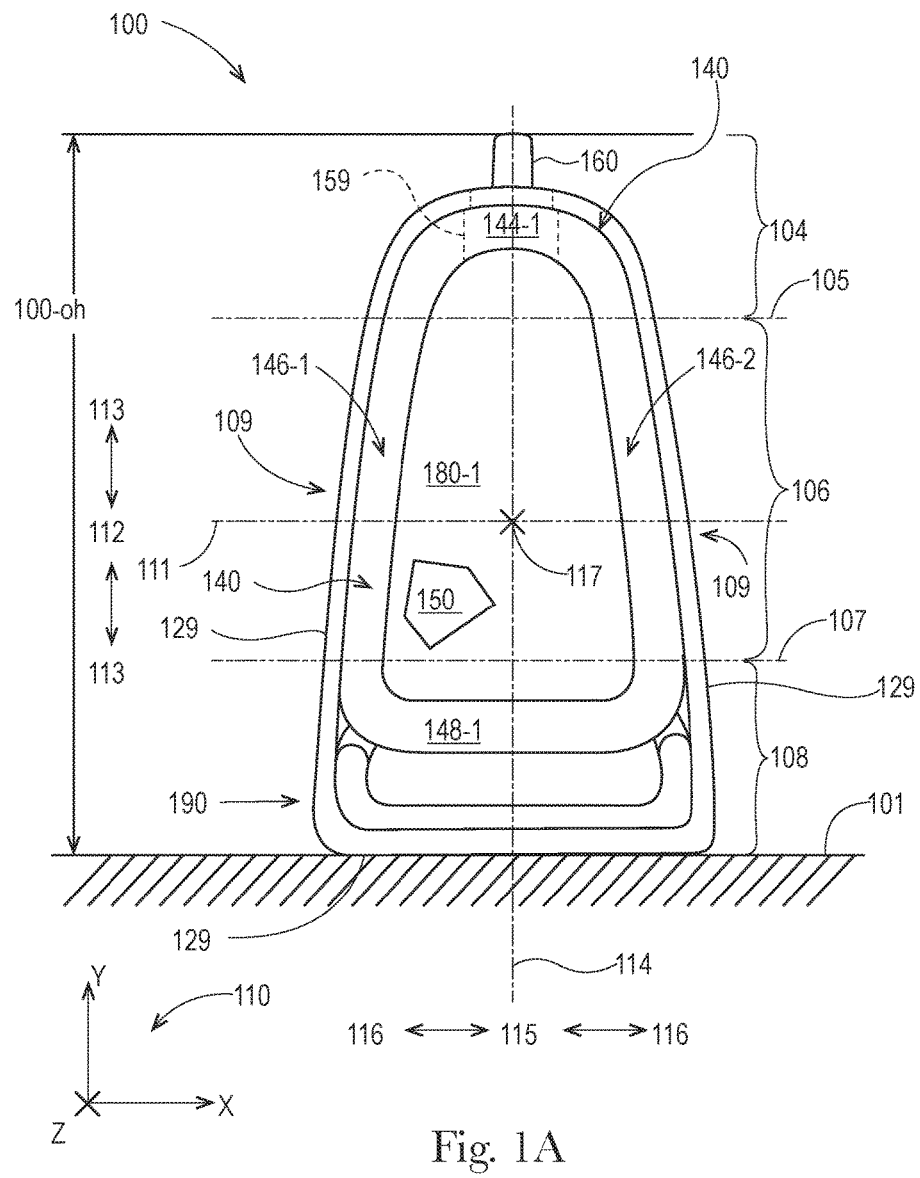
FIG. 1A illustrates a front view of an embodiment of a stand up flexible container.

The present disclosure describes various embodiments of containers made from flexible material. Because these containers are made from flexible material, these containers can be less expensive to make, can use less material, and can be easier to decorate, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to decorate, because their flexible materials can be easily printed before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands. Alternatively, any embodiment of flexible containers, as described herein, can be configured to dispense fluent products by pouring the fluent products out of its product volume.

Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed for sale and put into use, as intended, without failure.

As used herein, the term "about" modifies a particular value, by referring to a range equal to the particular value, plus or minus twenty percent (+/−20%). For any of the embodiments of flexible containers, disclosed herein, any disclosure of a particular value, can, in various alternate embodiments, also be understood as a disclosure of a range equal to about that particular value (i.e. +/−20%).

As used herein the term "activation" means any process by which tensile strain produced by intermeshing teeth and grooves causes intermediate web sections to stretch or extend as disclosed in U.S. Pat. No. 8,337,190 entitled "Method and Apparatus for Incrementally Stretching a Web," which is incorporated herein by reference. Such processes have been found useful in the production of many articles including breathable films, stretch composites, apertured materials and textured materials. For example, a common activation method is the process known in the art as ring rolling.

As used herein, the term "ambient conditions" refers to a temperature within the range of 15-35 degrees Celsius and a relative humidity within the range of 35-75%.

As used herein, the term "approximately" modifies a particular value, by referring to a range equal to the particular value, plus or minus fifteen percent (+/−15%). For any of the embodiments of flexible containers, disclosed herein, any disclosure of a particular value, can, in various alternate embodiments, also be understood as a disclosure of a range equal to approximately that particular value (i.e. +/−15%).

As used herein, when referring to a sheet of material, the term "basis weight" refers to a measure of mass per area, in units of grams per square meter (gsm). For any of the embodiments of flexible containers, disclosed herein, in various embodiments, any of the flexible materials can be configured to have a basis weight of 10-1000gsm, or any integer value for gsm from 10-1000, or within any range formed by any of these values, such as 20-800 gsm, 30-600 gsm, 40-400 gsm, or 50-200, etc.

As used herein, when referring to a flexible container, the term "bottom" refers to the portion of the container that is located in the lowermost 30% of the overall height of the container, that is, from 0-30% of the overall height of the container. As used herein, the term bottom can be further limited by modifying the term bottom with a particular percentage value, which is less than 30%. For any of the embodiments of flexible containers, disclosed herein, a reference to the bottom of the container can, in various alternate embodiments, refer to the bottom 25% (i.e. from 0-25% of the overall height), the bottom 20% (i.e. from 0-20% of the overall height), the bottom 15% (i.e. from 0-15% of the overall height), the bottom 10% (i.e. from 0-10% of the overall height), or the bottom 5% (i.e. from 0-5% of the overall height), or any integer value for percentage between 0% and 30%.

As used herein, the term "branding" refers to a visual element intended to distinguish a product from other products. Examples of branding include one of more of any of the following: trademarks, trade dress, logos, icons, and the like. For any of the embodiments of flexible containers, disclosed herein, in various embodiments, any surface of the flexible container can include one or more brandings of any size, shape, or configuration, disclosed herein or known in the art, in any combination.

As used herein, the term "character" refers to a visual element intended to convey information. Examples of characters include one or more of any of the following: letters, numbers, symbols, and the like. For any of the embodiments of flexible containers, disclosed herein, in various embodiments, any surface of the flexible container can include one or more characters of any size, shape, or configuration, disclosed herein or known in the art, in any combination.

As used herein, the term "closed" refers to a state of a product volume, wherein fluent products within the product volume are prevented from escaping the product volume (e.g. by one or more materials that form a barrier, and by a cap), but the product volume is not necessarily hermetically sealed. For example, a closed container can include a vent, which allows a head space in the container to be in fluid communication with air in the environment outside of the container.

As used herein, the term "connection device" refers to a structure distinct from the container that establishes a fluid communication between the contents of a product volume of a container and a secondary delivery device. In some embodiments, the connection device may be inserted into the container. For example, the connection device may be straw-like and may be inserted into a valve of a container between two expandable volumes such that the end of the cylinder is directly in the flow path of the fluent product. In other embodiments, the connection device may be externally connected to the dispenser of a flexible container.

As used herein, the term "critical pressure buildup" refers to a pressure sufficient to cause fluent product to be dispensed when such a pressure occurs within the product volume and is thus exerted on the valve. For example, a critical pressure buildup that would be acceptable to consumers would be in the range of about 0 Pa to about 90,000 Pa gauge pressure, or any range formed by these values such as about 10,000 Pa to about 60,000 Pa, about 25,500 Pa to about 90,000 Pa, or about 2 Pa to about 4562 Pa. When we refer to pressure values herein, it is understood that these are gauge pressures, or pressure measured above atmospheric pressure. The critical pressure buildup is not dependent upon container materials, container shape, or location where a force is applied to the container.

As used herein, the term "critical squeeze force" refers to a force sufficient to cause fluent product to be dispensed when such force is applied to the container. For example, a critical squeeze force that would be acceptable to consumers would be in the range of about 0.1 N to about 550 N, or any range formed by these values such as about 0.15 N to about 470 N, about 5 N to about 230 N, about 55 N to about 549 N, about .5 N to about 4 N, about 4 N to about 8 N, about 40 N to about 240 N, about 410 N to about 475 N, about 10 N to about 530 N, about 100 N to about 200 N, about 250 N to about 300 N, or about 400 to about 500 N. The critical squeeze force is dependent upon the container materials, the container shape, and the location where the force is applied.

As used herein, the term "curled" refers to a flow path for a fluent product turned over on itself without folding such that it has a scroll or reel-like structure. A curled flow path may be achieved by placing a score line or a plurality of score lines through the flow path perpendicular to the direction of flow to create a horizontal deflection, by using a thicker flexible material on the top of the flow path than on the bottom of the flexible flow path, by varying the number of layers of flexible material along the length of a valve, among other options.

As used herein, the term "deflation feature" refers to one or more structural features provided with a flexible container and configured for use in deflating some or all of the expanded structural support volume(s) of the flexible container, by allowing expansion material(s) inside of the structural support volume to escape into the environment, so that the structural support volume is no longer expanded. A deflation feature can be used when the flexible container is ready to be disposed of (i.e. as waste, compost, and/or recyclable material). Any of the flexible containers disclosed herein can be configured with any number of any kind of deflation feature, configured in any way disclosed herein or known in the art.

One kind of deflation feature is a cutting device, which is a rigid element that includes a point or edge configured to cut and/or pierce through flexible material(s) that form at least part of a structural support volume. As an example, a cutting device can be included with a flexible container by attaching the device to any portion of the outside (e.g. top, middle, side, bottom, etc.) of the container with adhesive, or under a label, or any other way known in the art, for externally attaching rigid elements to a container. As another example, a cutting device can be included with a flexible container by including the device with other packaging material, such as attached to an outer carton, inside of an overwrap layer, in between containers provided together, etc. As still another example, a cutting device can be included with a flexible container by including the device inside of any portion of the container, such as in a product volume, in a structural support volume, in a mixing chamber, in a dedicated space for the device, in a base structure, or any other way known in the art, for internally including rigid elements within a container. As yet another example, a cutting device can be included with a flexible container, by making the cutting device integral with or detachable from another rigid element that is part of the container, such as a rigid base structure, cap, dispenser, fitment, connecting element, reinforcing element, or any other rigid element for containers disclosed herein or known in the art. A cutting device can be configured to be any convenient size and any workable shape and can be used manually or through use of a tool. In addition to rigid elements, flexible materials that can be turned into a rigid cutting device through rolling up or folding flexible materials are also envisioned.

Another kind of deflation feature is an exit channel, which can be configured to be opened in material(s) that border or define at least a portion of the fillable space of a structural support volume. An exit channel can be an existing connection (e.g. seam, seal, or joint) in the container, which is configured to fail (e.g. separate and at least partially open) when exposed to opening forces. An exit channel can also be formed with one or more points, lines, and/or areas of weakness (e.g. thinned, scored, perforated, frangible seal, etc.), which are configured to fail or to otherwise be breached, when exposed to opening forces. An exit channel can be protected by another material, such as an adhesive label, to ensure the exit channel remains closed until the user wishes to deflate. An exit channel can further be formed by configuring the container with one or more tear initiation sites (such as a notch in an edge, a pull-tab, etc.) such that a tear propagating from the site(s) can open the flexible material. An exit channel can be configured to be any convenient size and any workable shape and can be opened manually (by grasping and pulling, by poking with a finger or fingernail, or any other way) or through use of a tool or by overpressurizing a structural support volume (through application of compressive force or controlled environmental conditions) such that the structural support volume fails when its expansion material(s) burst out.

Still another kind of deflation feature is a valve, connected to the fillable space of a structural support volume, wherein the valve can be opened to the container's environment. Embodiments of the present disclosure can use as a deflation feature, any and all embodiments of valves (including materials, structures, and/or features for valves, as well as any and all methods of making and/or using such valves), as disclosed in the following patent documents: U.S. nonprovisional patent application Ser. No. 13/379,655 filed Jun. 21, 2010, entitled "Collapsible Bottle, Method Of Manufacturing a Blank For Such Bottle and Beverage-Filled Bottle Dispensing System" in the name of Reidl, published as US2012/0097634; U.S. nonprovisional patent application Ser. No. 10/246893 filed Sep. 19, 2002, entitled "Bubble-Seal Apparatus for Easily Opening a Sealed Package" in the name of Perell, et al., published as 20040057638; and U.S. Pat. No. 7,585,528 filed Dec. 16, 2002, entitled "Package having an inflated frame" in the name of Ferri, et al., granted on Sep. 8, 2009; each of which is hereby incorporated by reference.

As used herein, the term "directly connected" refers to a configuration wherein elements are attached to each other without any intermediate elements therebetween, except for any means of attachment (e.g. adhesive).

As used herein, when referring to a flexible container, the term "dispenser" refers to a structure configured to dispense fluent product(s) from a product volume and/or from a mixing volume to the environment outside of the container. For any of the flexible containers disclosed herein, any dispenser can be configured in any way disclosed herein or known in the art, including any suitable size, shape, and flow rate. For example, a dispenser can be a push-pull type dispenser, a dispenser with a flip-top cap, a dispenser with a screw-on cap, a rotatable type dispenser, dispenser with a cap, a pump type dispenser, a pump spray type dispenser, a trigger spray type dispenser, a straw dispenser, a flip up straw dispenser, a straw dispenser with bite valve, a dosing dispenser, etc. A dispenser can be a parallel dispenser, providing multiple flow channels in fluid communication with multiple product volumes, wherein those flow channels remain separate until the point of dispensing, thus allowing fluent products from multiple product volumes to be dispensed as separate fluent products, dispensed together at the same time. A dispenser can be a mixing dispenser, providing one or more flow channels in fluid communication with multiple product volumes, with multiple flow channels combined before the point of dispensing, thus allowing fluent products from multiple product volumes to be dispensed as the fluent products mixed together. As another example, a dispenser can be formed by a frangible opening. As further examples, a dispenser can utilize one or more valves and/or dispensing mechanisms disclosed in the art, such as those disclosed in: published US patent application 2003/0096068, entitled "One-way valve for inflatable package"; U.S. Pat. No. 4,988,016 entitled "Self-sealing container"; and U.S. Pat. No. 7,207,717, entitled "Package having a fluid actuated closure"; each of which is hereby incorporated by reference. Still further, any of the dispensers disclosed herein, may be incorporated into a flexible container either directly, or in combination with one or more other materials or structures (such as a fitment), or in any way known in the art. In some alternate embodiments, dispensers disclosed herein can be configured for both dispensing and filling, to allow filling of product volume(s) through one or more dispensers. In other alternate embodiments, a product volume can include one or more filling structure(s) (e.g. for adding water to a mixing volume) in addition to or instead of one or more dispenser(s). Any location for a dispenser, disclosed herein can alternatively be used as a location for a filling structure. In some embodiments, a product volume can include one or more filling structures in addition to any dispenser(s). And, any location for a dispenser, disclosed herein can alternatively be used as a location for an opening, through which product can be filled and/or dispensed, wherein the opening may be reclosable or non-reclosable, and can be configured in any way known in the art of packaging. For example, an opening can be: a line of weakness, which can be torn open; a zipper seal, which can be pulled open and pressed closed (e.g. a press seal), or opened and closed with a slider; openings with adhesive-based closures; openings with cohesive-based closures; openings with closures having fasteners (e.g. snaps, tin tie, etc.), openings with closures having micro-sized fasteners (e.g. with opposing arrays of interlocking fastening elements, such as hook, loops, and/or other mating elements, etc.), and any other kind of opening for packages or containers, with or without a closure, known in the art.

As used herein, when referring to a flexible container, the term "disposable" refers to a container which, after dispensing a product to an end user, is not configured to be refilled with an additional amount of the product, but is configured to be disposed of (i.e. as waste, compost, and/or recyclable material). Part, parts, or all of any of the embodiments of flexible containers, disclosed herein, can be configured to be disposable.

As used herein, when referring to a flexible container, the term "durable" refers to a container that is reusable more than non-durable containers.

As used herein, when referring to a flexible container, the term "effective base contact area" refers to a particular area defined by a portion of the bottom of the container, when the container (with all of its product volume(s) filled 100% with water) is standing upright and its bottom is resting on a horizontal support surface. The effective base contact area lies in a plane defined by the horizontal support surface. The effective base contact area is a continuous area bounded on all sides by an outer periphery.

The outer periphery is formed from an actual contact area and from a series of projected areas from defined cross-sections taken at the bottom of the container. The actual contact area is the one or more portions of the bottom of the container that contact the horizontal support surface, when the effective base contact area is defined. The effective base contact area includes all of the actual contact area. However, in some embodiments, the effective base contact area may extend beyond the actual contact area.

The series of projected area are formed from five horizontal cross-sections, taken at the bottom of the flexible container. These cross-sections are taken at 1%, 2%, 3%, 4%, and 5% of the overall height. The outer extent of each of these cross-sections is projected vertically downward onto the horizontal support surface to form five (overlapping) projected areas, which, together with the actual contact area, form a single combined area. This is not a summing up of the values for these areas, but is the formation of a single combined area that includes all of these (projected and actual) areas, overlapping each other, wherein any overlapping portion makes only one contribution to the single combined area.

The outer periphery of the effective base contact area is formed as described below. In the following description, the terms convex, protruding, concave, and recessed are understood from the perspective of points outside of the combined area. The outer periphery is formed by a combination of the outer extent of the combined area and any chords, which are straight line segments constructed as described below.

For each continuous portion of the combined area that has an outer perimeter with a shape that is concave or recessed, a chord is constructed across that portion. This chord is the shortest straight line segment that can be drawn tangent to the combined area on both sides of the concave/recessed portion.

For a combined area that is discontinuous (formed by two or more separate portions), one or more chords are constructed around the outer perimeter of the combined area, across the one or more discontinuities (open spaces disposed between the portions). These chords are straight lines segments drawn tangent to the outermost separate portions of the combined area. These chords are drawn to create the largest possible effective base contact area.

Thus, the outer periphery is formed by a combination of the outer extent of the combined area and any chords, constructed as described above, which all together enclose the effective base area. Any chords that are bounded by the combined area and/or one or more other chords, are not part of the outer periphery and should be ignored.

Any of the embodiments of flexible containers, disclosed herein, can be configured to have an effective base contact area from 1 to 50,000 square centimeters ($cm^2$), or any integer value for $cm^2$ between 1 and 50,000 $cm^2$, or within any range formed by any of the preceding values, such as: from 2 to 25,000 $cm^2$, 3 to 10,000 $cm^2$, 4 to 5,000 $cm^2$, 5 to 2,500 $cm^2$, from 10 to 1,000 $cm^2$, from 20 to 500 $cm^2$, from 30 to 300 $cm^2$, from 40 to 200 $cm^2$, or from 50 to 100 $cm^2$, etc.

As used herein, the term "expandable volume" refers to a fillable space made from one or more flexible materials, wherein the space is configured to be at least partially filled with one or more expansion materials. One or more expandable volumes can be configured to be included in a valve. Expandable volumes may be configured to generate and maintain tension in a flexible material adjacent to the expandable volume, for example in an area that forms a flow path in a valve. In such an embodiment, the expandable volumes may be formed from different layers of flexible material than the layers of flexible material forming the flow path. The size and shape of an expandable volume can be constant or variable. For example, an expandable volume can have a width at a largest point ranging from about 0.1 inches to about 1.5 inches, or any range therein such as about 0.1 inches to about 1.1 inches, about 0.3 inches to about 0.4 inches, or about 1.1 inches to about 1.5 inches.

As used herein, when referring to a flexible container, the term "expanded" refers to the state of one or more flexible materials that are configured to be formed into a structural support volume, after the structural support volume is made rigid by one or more expansion materials. An expanded structural support volume has an overall width that is significantly greater than the combined thickness of its one or more flexible materials, before the structural support volume is filled with the one or more expansion materials. Examples of expansion materials include liquids (e.g. water), gases (e.g. compressed air), fluent products, foams (that can expand after being added into a structural support volume), co-reactive materials (that produce gas), or phase change materials (that can be added in solid or liquid form, but which turn into a gas; for example, liquid nitrogen or dry ice), or other suitable materials known in the art, or combinations of any of these (e.g. fluent product and liquid nitrogen). In various embodiments, expansion materials can be added at atmospheric pressure, or added under pressure greater than atmospheric pressure, or added to provide a material change that will increase pressure to something above atmospheric pressure. For any of the embodiments of flexible containers, disclosed herein, its one or more flexible materials can be expanded at various points in time, with respect to its manufacture, sale, and use, including, for example: before or after its product volume(s) are filled with fluent product(s), before or after the flexible container is shipped to a seller, and before or after the flexible container is purchased by an end user.

As used herein, when referring to a product volume of a flexible container, the term "filled" refers to the state when the product volume contains an amount of fluent product(s) that is equal to a full capacity for the product volume, with an allowance for head space, under ambient conditions. As used herein, the term filled can be modified by using the term filled with a particular percentage value, wherein 100% filled represents the maximum capacity of the product volume.

As used herein, the term "flat" refers to a surface that is without significant projections or depressions.

As used herein, the term "flexible container" refers to a container configured to have a product volume, wherein one or more flexible materials form 50-100% of the overall surface area of the one or more materials that define the three-dimensional space of the product volume. For any of the embodiments of flexible containers, disclosed herein, in various embodiments, the flexible container can be configured to have a product volume, wherein one or more flexible materials form a particular percentage of the overall area of the one or more materials that define the three-dimensional space, and the particular percentage is any integer value for percentage between 50% and 100%, or within any range formed by any of these values, such as: 60-100%, or 70-100%, or 80-100%, or 90-100%, etc. One kind of flexible container is a film-based container, which is a flexible container made from one or more flexible materials, which include a film.

For any of the embodiments of flexible containers, disclosed herein, in various embodiments, the middle of the flexible container (apart from any fluent product) can be configured to have an overall middle mass, wherein one or more flexible materials form a particular percentage of the overall middle mass, and the particular percentage is any integer value for percentage between 50% and 100%, or within any range formed by any of the preceding values, such as: 60-100%, or 70-100%, or 80-100%, or 90-100%, etc.

For any of the embodiments of flexible containers, disclosed herein, in various embodiments, the entire flexible container (apart from any fluent product) can be configured to have an overall mass, wherein one or more flexible materials form a particular percentage of the overall mass, and the particular percentage is any integer value for percentage between 50% and 100%, or within any range formed by any of the preceding values, such as: 60-100%, or 70-100%, or 80-100%, or 90-100%, etc.

As used herein, when referring to a flexible container, the term "flexible material" refers to a thin, easily deformable, sheet-like material, having a flexibility factor within the range of 1,000-2,500,000 N/m. For any of the embodiments of flexible containers, disclosed herein, in various embodiments, any of the flexible materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning.

Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art.

As examples, flexible materials such as films and nonwovens, can be made from one or more thermoplastic polymers, as described herein and/or as known in the art. Thermoplastic polymers can include polyolefins such as polyethylene and/or copolymers thereof, including low density, high density, linear low density, or ultra low density polyethylenes. Polypropylene and/or polypropylene copolymers, including atactic polypropylene; isotactic polypropylene, syndiotactic polypropylene, and/or combinations thereof can also be used. Polybutylene is also a useful polyolefin.

Other suitable polymers include polyamides or copolymers thereof, such as Nylon 6, Nylon 11, Nylon 12, Nylon 46, Nylon 66; polyesters and/or copolymers thereof, such as maleic anhydride polypropylene copolymer, polyethylene terephthalate; olefin carboxylic acid copolymers such as ethylene/acrylic acid copolymer, ethylene/maleic acid copolymer, ethylene/methacrylic acid copolymer, ethylene/vinyl acetate copolymers or combinations thereof; polyacrylates, polymethacrylates, and/or their copolymers such as poly(methyl methacrylates).

Other nonlimiting examples of polymers include polyesters, polycarbonates, polyvinyl acetates, poly(oxymethylene), styrene copolymers, polyacrylates, polymethacrylates, poly(methyl methacrylates), polystyrene/methyl methacrylate copolymers, polyetherimides, polysulfones, and/or combinations thereof. In some embodiments, thermoplastic polymers can include polypropylene, polyethylene, polyamides, polyvinyl alcohol, ethylene acrylic acid, polyolefin carboxylic acid copolymers, polyesters, and/or combinations thereof.

Biodegradable thermoplastic polymers also are contemplated for use herein. Biodegradable materials are susceptible to being assimilated by microorganisms, such as molds, fungi, and bacteria when the biodegradable material is buried in the ground or otherwise contacts the microorganisms Suitable biodegradable polymers also include those biodegradable materials which are environmentally-degradable using aerobic or anaerobic digestion procedures, or by virtue of being exposed to environmental elements such as sunlight, rain, moisture, wind, temperature, and the like. The biodegradable thermoplastic polymers can be used individually or as a combination of biodegradable or non-biodegradable polymers. Biodegradable polymers include polyesters containing aliphatic components. Among the polyesters are ester polycondensates containing aliphatic constituents and poly(hydroxycarboxylic) acid. The ester polycondensates include diacids/diol aliphatic polyesters such as polybutylene succinate, polybutylene succinate co-adipate, aliphatic/aromatic polyesters such as terpolymers made of butylenes diol, adipic acid and terephthalic acid. The poly(hydroxycarboxylic) acids include lactic acid based homopolymers and copolymers, polyhydroxybutyrate (PHB), or other polyhydroxyalkanoate homopolymers and copolymers. Such polyhydroxyalkanoates include copolymers of PHB with higher chain length monomers, such as C6-C12, and higher, polyhydroxyalkanaotes, such as those disclosed in U.S. Pat. No. RE 36,548 and 5,990,271, polyglycolic acid, and polycaprolactone.

Non-limiting examples of suitable commercially available polymers include Basell Profax PH-835 (a 35 melt flow rate Ziegler-Natta isotactic polypropylene from Lyondell-Basell), Basell Metocene MF-650W (a 500 melt flow rate metallocene isotactic polypropylene from Lyondell-Basell), Polybond 3200 (a 250 melt flow rate maleic anhydride polypropylene copolymer from Crompton), Exxon Achieve 3854 (a 25 melt flow rate metallocene isotactic polypropylene from Exxon-Mobil Chemical), Mosten NB425 (a 25 melt flow rate Ziegler-Natta isotactic polypropylene from Unipetrol), Danimer 27510 (a polyhydroxyalkanoate polypropylene from Danimer Scientific LLC), Dow Aspun 6811A (a 27 melt index polyethylene polypropylene copolymer from Dow Chemical), and Eastman 9921 (a polyester terephthalic homopolymer with a nominally 0.81 intrinsic viscosity from Eastman Chemical), any biosourced materials for example, from Braskem, and acrylonitrile-methyl acrylate polymers, such as Barex.

A thermoplastic polymer component of a flexible material can be a single polymer species as described above or a blend of two or more thermoplastic polymers as described above.

Also as examples, flexible materials can further include one or more additives, as described herein and/or as known in the art. Non-limiting examples of classes of such additives include perfumes, dyes, pigments, nanoparticles, antistatic agents, fillers, photoactives, and other classes of additives known in the art, and combinations. The films disclosed herein can contain a single additive or a mixture of any number of additives.

Contemplated fillers include, but are not limited to inorganic fillers such as, for example, the oxides of magnesium, aluminum, silicon, and titanium. These materials can be added as inexpensive fillers or processing aides. Other inorganic materials that can function as fillers include hydrous magnesium silicate, titanium dioxide, calcium carbonate, clay, chalk, boron nitride, limestone, diatomaceous earth, mica glass quartz, and ceramics. Additionally, inorganic salts, including alkali metal salts, alkaline earth metal salts, phosphate salts, can be used. Additionally, alkyd resins can also be added as fillers. Alkyd resins can comprise a polyol, a polyacid or anhydride, and/or a fatty acid.

Additional contemplated additives include nucleating and clarifying agents for the thermoplastic polymer. Specific examples, suitable for polypropylene, for example, are benzoic acid and derivatives (e.g. sodium benzoate and lithium benzoate), as well as kaolin, talc and zinc glycerolate. Dibenzlidene sorbitol (DBS) is an example of a clarifying agent that can be used. Other nucleating agents that can be used are organocarboxylic acid salts, sodium phosphate and metal salts (for example aluminum dibenzoate).

Contemplated nanoparticles include metals, metal oxides, allotropes of carbon, clays, organically modified clays, sulfates, nitrides, hydroxides, oxy/hydroxides, particulate water-insoluble polymers, silicates, phosphates, and carbonates. Examples include silicon dioxide, carbon black, graphite, graphene, fullerenes, expanded graphite, carbon nanotubes, talc, calcium carbonate, bentonite, montmorillonite, kaolin, zinc glycerolate, silica, aluminosilicates, boron nitride, aluminum nitride, barium sulfate, calcium sulfate, antimony oxide, feldspar, mica, nickel, copper, iron, cobalt, steel, gold, silver, platinum, aluminum, wollastonite, aluminum oxide, zirconium oxide, titanium dioxide, cerium oxide, zinc oxide, magnesium oxide, tin oxide, iron oxides (Fe2O3, Fe3O4) and mixtures thereof.

Thermoplastic polymers, and their variations, as disclosed herein can be formed into a film and can comprise many different configurations, depending on the film properties desired. The properties of the film can be manipulated by varying, for example, the thickness, or in the case of multilayered films, the number of layers, the chemistry of the layers, i.e., hydrophobic or hydrophilic, and the types of polymers used to form the polymeric layers. The films disclosed herein can be multi-layer films. The film can have at least two layers (e.g., a first film layer and a second film layer). The first film layer and the second film layer can be layered adjacent to each other to form the multi-layer film. A multi-layer film can have at least three layers (e.g., a first film layer, a second film layer and a third film layer). The second film layer can at least partially overlie at least one of an upper surface or a lower surface of the first film layer. The third film layer can at least partially overlie the second film layer such that the second film layer forms a core layer. It is contemplated that multi-layer films can include additional layers (e.g., binding layers, non-permeable layers, etc.). It will be appreciated that multi-layer films can comprise from about 2 layers to about 1000 layers; in certain embodiments from about 3 layers to about 200 layers; and in certain embodiments from about 5 layers to about 100 layers, or any integer value for number of layers, in any of these ranges. For multi-layer films, each respective layer can be made from any material disclosed herein or known in the art, in any manner disclosed herein or known in the art.

A multi-layer film can include a 3-layer arrangement wherein a first film layer and a third film layer form the skin layers and a second film layer is formed between the first film layer and the third film layer to form a core layer. The third film layer can be the same or different from the first film layer, such that the third film layer can comprise a composition as described herein. It will be appreciated that similar film layers could be used to form multi-layer films having more than 3 layers. One embodiment for using multi-layer films is to control the location of the oil. For example, in a 3 layer film, the core layer may contain the oil while the outer layer do not. Alternatively, the inner layer may not contain oil and the outer layers do contain oil.

If incompatible layers are to be adjacent in a multi-layer film, a tie layer can be positioned between them. The purpose of the tie layer is to provide a transition and adequate adhesion between incompatible materials. An adhesive or tie layer is typically used between layers of layers that exhibit delamination when stretched, distorted, or deformed. The delamination can be either microscopic separation or macroscopic separation. In either event, the performance of the film may be compromised by this delamination. Consequently, a tie layer that exhibits adequate adhesion between the layers is used to limit or eliminate this delamination.

A tie layer is generally useful between incompatible materials. For instance, when a polyolefin and a copoly (ester-ether) are the adjacent layers, a tie layer is generally useful.

The tie layer is chosen according to the nature of the adjacent materials, and is compatible with and/or identical to one material (e.g. nonpolar and hydrophobic layer) and a reactive group which is compatible or interacts with the second material (e.g. polar and hydrophilic layer).

Suitable backbones for the tie layer include polyethylene (low density—LDPE, linear low density—LLDPE, high density—HDPE, and very low density—VLDPE) and polypropylene.

The reactive group may be a grafting monomer that is grafted to this backbone, and is or contains at least one alpha- or beta- ethylenically unsaturated carboxylic acid or anhydrides, or a derivative thereof. Examples of such carboxylic acids and anhydrides, which maybe mono-, di-, or polycarboxylic acids, are acrylic acid, methacrylic acid, maleic acid, fumaric acid, itaconic acid, crotonic acid, itaconic anhydride, maleic anhydride, and substituted malic anhydride, e.g. dimethyl maleic anhydride. Examples of derivatives of the unsaturated acids are salts, amides, imides and esters e.g. mono- and disodium maleate, acrylamide, maleimide, and diethyl fumarate.

A particularly tie layer is a low molecular weight polymer of ethylene with about 0.1 to about 30 weight percent of one or more unsaturated monomers which can be copolymerized with ethylene, e.g., maleic acid, fumaric acid, acrylic acid, methacrylic acid, vinyl acetate, acrylonitrile, methacrylonitrile, butadiene, carbon monoxide, etc. Exemplary embodiments are acrylic esters, maleic anhydride, vinyl acetate, and methyacrylic acid. Anhydrides can be used as grafting monomers, for example maleic anhydride can be used.

An exemplary class of materials suitable for use as a tie layer is a class of materials known as anhydride modified ethylene vinyl acetate sold by DuPont under the tradename Bynel®, e.g., Bynel® 3860. Another material suitable for use as a tie layer is an anhydride modified ethylene methyl acrylate also sold by DuPont under the tradename Bynel®, e.g., Bynel® 2169. Maleic anhydride graft polyolefin polymers suitable for use as tie layers are also available from Elf Atochem North America, Functional Polymers Division, of Philadelphia, Pa. as Orevac™.

Alternatively, a polymer suitable for use as a tie layer material can be incorporated into the composition of one or more of the layers of the films as disclosed herein. By such incorporation, the properties of the various layers are modified so as to improve their compatibility and reduce the risk of delamination.

Other intermediate layers besides tie layers can be used in the multi-layer film disclosed herein. For example, a layer of a polyolefin composition can be used between two outer layers of a hydrophilic resin to provide additional mechanical strength to the extruded web. Any number of intermediate layers may be used.

Examples of suitable thermoplastic materials for use in forming intermediate layers include polyethylene resins such as low density polyethylene (LDPE), linear low density polyethylene (LLDPE), ethylene vinyl acetate (EVA), ethylene methyl acrylate (EMA), polypropylene, and poly (vinyl chloride). Polymeric layers of this type can have mechanical properties that are substantially equivalent to those described above for the hydrophobic layer.

In addition to being formed from the compositions described herein, the films can further include additional additives. For example, opacifying agents can be added to one or more of the film layers. Such opacifying agents can include iron oxides, carbon black, aluminum, aluminum oxide, titanium dioxide, talc and combinations thereof. These opacifying agents can comprise about 0.1% to about 5% by weight of the film; and in certain embodiments, the opacifying agents can comprise about 0.3% to about 3% of the film. It will be appreciated that other suitable opacifying agents can be employed and in various concentrations. Examples of opacifying agents are described in U.S. Pat. No. 6,653,523.

Furthermore, the films can comprise other additives, such as other polymers materials (e.g., a polypropylene, a polyethylene, a ethylene vinyl acetate, a polymethylpentene any combination thereof, or the like), a filler (e.g., glass, talc, calcium carbonate, or the like), a mold release agent, a flame retardant, an electrically conductive agent, an anti-static agent, a pigment, an antioxidant, an impact modifier, a stabilizer (e.g., a UV absorber), wetting agents, dyes, a film anti-static agent or any combination thereof. Film antistatic agents include cationic, anionic, and/or, nonionic agents. Cationic agents include ammonium, phosphonium and sulphonium cations, with alkyl group substitutions and an associated anion such as chloride, methosulphate, or nitrate. Anionic agents contemplated include alkylsulphonates. Nonionic agents include polyethylene glycols, organic stearates, organic amides, glycerol monostearate (GMS), alkyl di-ethanolamides, and ethoxylated amines. Other filler materials can comprise fibers, structural reinforcing agents, and all types of biosourced materials such as oils (hydrogenated soy bean oil), fats, starch, etc.

For any of the flexible materials, materials that are safe/approved for food contact may be selected. Additionally, materials that are approved for medical usage, or materials that can be sterilized through retort, autoclave, or radiation treatment, or other sterilization processes known in the art, may be used.

In various embodiments, part, parts, or all of a flexible material can be coated or uncoated, treated or untreated, processed or unprocessed, in any manner known in the art. In various embodiments, parts, parts, or about all, or approximately all, or substantially all, or nearly all, or all of a flexible material can made of sustainable, bio-sourced, recycled, recyclable, and/or biodegradable material. Part, parts, or about all, or approximately all, or substantially all, or nearly all, or all of any of the flexible materials described herein can be partially or completely translucent, partially or completely transparent, or partially or completely opaque.

With regard to films and elastomers for use as flexible materials, these can be formed in any manner known in the art, such as casting, extruding (blown or flat; singly or with coextrusion), calendering, depositing solution(s), skiving, etc. then slitting, cutting, and/or converting the films and/or elastomers into the desired sizes or shapes, as sheets or webs, as will be understood by one skilled in the art. With regard to blown films, multiple processes can be used including: collapsed bubble to create a blocked film, and double and or triple bubble processes. Flexible materials may further be subjected to any number or orienting, tenter frame, tenter hook, stretching, or activation processes. With regard to foamed sheets for use as flexible materials, these can be formed in any manner known in the art, by mixing base ingredients, adding the foaming mixture to a mold or shaping apparatus, then curing, cutting, and/or converting the foam into the desired sizes or shapes, as sheets or webs. With regard to nonwoven fabrics, these can be formed in any manner known in the art using spunbonded fibers and/or meltblown fibers, staple-length and/or continuous fibers, with any layering, mixing, or other combination known in the art. Other materials listed herein for use as flexible materials can be made in any manner known in the art.

The flexible materials used to make the containers disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, when referring to a flexible container, the term "flexibility factor" refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

As used herein, the term "flow path" refers to a passageway through which fluent product travels in a valve that restricts flow of the fluent product. In other words, a flow path is a restricted passageway through which fluent product travels in a flexible valve. The flow path can be trapezoidal or any other type of profile shape. The angle at which the flow path extends from inlet to outlet can be any value, for example about 0, about 40, about 60, or about 90 degrees.

As used herein, when referring to a flexible container, the term "fluent product" refers to one or more liquids and/or pourable solids, and combinations thereof. Examples of fluent products include one or more of any of the following: bites, bits, creams, chips, chunks, crumbs, crystals, emulsions, flakes, gels, grains, granules, jellies, kibbles, liquid solutions, liquid suspensions, lotions, nuggets, ointments, particles, particulates, pastes, pieces, pills, powders, salves, shreds, sprinkles, and the like, either individually or in any combination. Throughout the present disclosure the terms "fluent product" and "flowable product" are used interchangeably and are intended to have the same meaning. Any of the product volumes disclosed herein can be configured to include one or more of any fluent product disclosed herein, or known in the art, in any combination.

As used herein, when referring to a flexible container, the term "formed" refers to the state of one or more materials that are configured to be formed into a product volume, after the product volume is provided with its defined three-dimensional space.

As used herein, the term "graphic" refers to a visual element intended to provide a decoration or to communicate information. Examples of graphics include one or more of any of the following: colors, patterns, designs, images, and the like. For any of the embodiments of flexible containers, disclosed herein, in various embodiments, any surface of the flexible container can include one or more graphics of any size, shape, or configuration, disclosed herein or known in the art, in any combination.

As used herein, when referring to a flexible container, the term "height area ratio" refers to a ratio for the container, with units of per centimeter ($cm^{-1}$), which is equal to the value for the overall height of the container (with all of its product volume(s) filled 100% with water, and with overall height measured in centimeters) divided by the value for the effective base contact area of the container (with all of its product volume(s) filled 100% with water, and with effective base contact area measured in square centimeters). For any of the embodiments of flexible containers, disclosed herein, in various embodiments, any of the flexible containers, can be configured to have a height area ratio from 0.3 to 3.0 per centimeter, or any value in increments of 0.05 $cm^{-1}$ between 0.3 and 3.0 per centimeter, or within any range formed by any of the preceding values, such as: from 0.35 to 2.0 $cm^{-1}$, from 0.4 to 1.5 $cm^{-1}$, from 0.4 to 1.2 $cm^{-1}$, or from 0.45 to 0.9 $cm^{-1}$, etc.

As used herein, the term "indicia" refers to one or more of characters, graphics, branding, or other visual elements, in any combination. For any of the embodiments of flexible containers, disclosed herein, in various embodiments, any surface of the flexible container can include one or more indicia of any size, shape, or configuration, disclosed herein or known in the art, in any combination.

As used herein, the term "indirectly connected" refers to a configuration wherein elements are attached to each other with one or more intermediate elements therebetween.

As used herein, when referring to a valve, the term "indicator" refers to an element that provides feedback as to whether a valve is open or closed. For example, an indicator may be a portion of a flow path of a valve formed of clear materials. In such an embodiment, the fluent product is visible in the indicator if the valve is open but is not visible in the indicator due to the suck-back effect if the valve is closed. In other embodiments, the flow path may be formed by and between two layers of flexible material, and the indicator may comprise a portion of each of the two overlapping layers. When the valve is closed, the two layers are proximate enough to one another to create a visual signal when the layers are combined as viewed externally, whereas when the valve is open, the two layers are visually distinct and do not create a signal. Examples of a signal include a change in color (i.e., a yellow layer and a blue layer combine to make a green signal) or a combination of designs that form a new design (i.e., a circle on one layer and a parenthesis and colon on another layer combine to make a smiley face, or vertical lines on one layer of an indicator and horizontal lines on another layer of an indicator combine to create a cross hatch pattern).

As used herein, when referring to a flexible container, the term "initial hermetic seal" refers to a structure that initially hermetically seals the dispenser so that fluent product cannot be dispensed from the product volume to the environment outside of the container, but is further configured to be removed by the consumer or end user such that the dispenser is unsealed and fluent product can be dispensed from the product volume to the environment outside of the container. Various embodiments of an initial hermetic seal include, but are not limited to, a pull-tab, a bubble to pop, a perforation, a notch and score, any line of weakness, a sticker to peel off, a frangible seal, or a seal having mechanical or laser perforations. Further examples of initial hermetic seals can be found in US patent publication No. 20100166924 A1 entitled "Flexible package having multiple opening feature" and US patent publication No. US 20110211778 A1 entitled "Reclosable Fasteners, Packages Having Reclosable Fasteners, and Methods for Creating Reclosable Fasteners", the entirety of each of which is incorporated herein by reference.

As used herein, when referring to a valve, the term "inlet" refers to the opening and immediately surrounding area in the valve at the start of a flow path through which fluent product is received, generally from the product volume.

As used herein, the term "joined" refers to a configuration wherein elements are either directly connected or indirectly connected.

As used herein, the term "lateral" refers to a direction, orientation, or measurement that is parallel to a lateral centerline of a container, when the container is standing upright on a horizontal support surface, as described herein. A lateral orientation may also be referred to a "horizontal" orientation, and a lateral measurement may also be referred to as a "width."

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with a differing first digit, wherein that first digit matches the number for its figure; as an example, an element of FIG. 3 labeled 320 and an element of FIG. 4 labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-*a* and a second embodiment of an element in FIG. 3B labeled 320-*b*, are like numbered.

As used herein, the term "longitudinal" refers to a direction, orientation, or measurement that is parallel to a longitudinal centerline of a container, when the container is standing upright on a horizontal support surface, as described herein. A longitudinal orientation may also be referred to a "vertical" orientation. When expressed in relation to a horizontal support surface for a container, a longitudinal measurement may also be referred to as a "height", measured above the horizontal support surface.

As used herein, when referring to a flexible container, the term "middle" refers to the portion of the container that is located in between the top of the container and the bottom of the container. As used herein, the term middle can be modified by describing the term middle with reference to a particular percentage value for the top and/or a particular percentage value for the bottom. For any of the embodiments of flexible containers, disclosed herein, a reference to the middle of the container can, in various alternate embodiments, refer to the portion of the container that is located between any particular percentage value for the top, disclosed herein, and/or any particular percentage value for the bottom, disclosed herein, in any combination.

As used herein, the term "mixing volume" refers to a type product volume that is configured to receive one or more fluent product(s) from one or more product volumes and/or from the environment outside of the container.

As used herein, when referring to a product volume, the term "multiple dose" refers to a product volume that is sized to contain a particular amount of product that is about equal to two or more units of typical consumption, application, or use by an end user. Any of the embodiments of flexible containers, disclosed herein, can be configured to have one or more multiple dose product volumes. A container with only one product volume, which is a multiple dose product volume, is referred to herein as a "multiple dose container."

As used herein, the term "nearly" modifies a particular value, by referring to a range equal to the particular value, plus or minus five percent (+/−5%). For any of the embodiments of flexible containers, disclosed herein, any disclosure of a particular value, can, in various alternate embodiments, also be understood as a disclosure of a range equal to approximately that particular value (i.e. +/−5%).

As used herein, when referring to a flexible container, the term "non-durable" refers to a container that is temporarily reusable, or disposable, or single use.

As used herein, when referring to a flexible container, the term "non-fluent product" refers to materials, products, and/or articles that are not liquids, pourable solids, or combinations or liquids and pourable solids. Any of the flexible containers disclosed herein can be configured for packaging one or more of any non-fluent product disclosed herein, or known in the art, in any combination. When used for non-fluent products, flexible containers, as disclosed herein, can provide benefits associated with partly or fully supporting and/or enclosing the non-fluent product with primary and/or secondary packaging that includes one or more structural support volumes, one or more structural support members, and/or one or more structural support frames; for example, so the non-fluent product can be supported and/or enclosed by packaging that is self-supporting and/or standing upright, as will be understood by one skilled in the art.

As used herein, when referring to a flexible container, the term "nonstructural panel" refers to a layer of one or more adjacent sheets of flexible material, the layer having an outermost major surface that faces outward, toward the environment outside of the flexible container, and an innermost major surface that faces inward, toward product volume(s) disposed within the flexible container; a nonstructural panel is configured such that, the layer, does not independently provide substantial support in making the container self-supporting and/or standing upright.

As used herein, when referring to a flexible container, the term "outlet" refers to the opening and immediately surrounding area of the flow path through which fluent product must flow before reaching the environment outside of the container. The outlet opening can have a width ranging from about 0.2 inches to about 1 inches, or any range therein such as about 0.3 inches to about 0.8 inches, about 0.6 inches to about 0.9 inches, or about 0.2 inches to about 0.25 inches.

As used herein, when referring to a flexible container, the term "overall height" refers to a distance that is measured while the container is standing upright on a horizontal support surface, the distance measured vertically from the upper side of the support surface to a point on the top of the container, which is farthest away from the upper side of the support surface. Any of the embodiments of flexible containers, disclosed herein, can be configured to have an overall height from 2.0 cm to 100.0 cm, or any value in increments of 0.1 cm between 2.0 and 100.0 cm, or within any range formed by any of the preceding values, such as: from 4.0 to 90.0 cm, from 5.0 to 80.0 cm, from 6.0 to 70.0 cm, from 7.0 to 60.0 cm, from 8.0 to 50.0 cm, from 9.0 to 40.0 cm, or from 10.0 to 30.0, etc.

As used herein, when referring to a sheet of flexible material, the term "overall thickness" refers to a linear dimension measured perpendicular to the outer major surfaces of the sheet, when the sheet is lying flat. For any of the embodiments of flexible containers, disclosed herein, in various embodiments, any of the flexible materials can be configured to have an overall thickness 5-500 micrometers ($\mu$m), or any integer value for micrometers from 5-500, or within any range formed by any of these values, such as 10-500 $\mu$m, 20-400 $\mu$m, 30-300 $\mu$m, 40-200 $\mu$m, or 50-100 $\mu$m, etc.

As used herein, the term "product sensory-experience sampling mechanism" refers to a user-interactive component that enables a user to gain exposure to at least one of a group of smell, taste, lubricity, texture, and visual characteristics of a fluent product contained in the product volume. In various embodiments, the product sensory-experience sampling mechanism may achieve this end either by providing access to the product volume or to a secondary product volume containing the fluent product. In other various embodiments, the product sensory-experience sampling mechanism may not provide access to the fluent product but may nonetheless convey the desired sensory-experience of the fluent product via a scratch-and-smell sticker, adhesive perfume delivery vehicle (see, e.g., patent publication US 2010181215 A1 entitled "Package Comprising an Adhesive Perfume Delivery Material", the entirety of which is incorporated herein by reference), printed PMCs, scratch-and-sniff inks, separate promotional items such as cards, a porous membrane, or other alternatives.

As used herein, the term "product volume" refers to an enclosable three-dimensional space that is configured to receive and directly contain one or more fluent product(s), wherein that space is defined by one or more materials that form a barrier that prevents the fluent product(s) from escaping the product volume. By directly containing the one or more fluent products, the fluent products come into contact with the materials that form the enclosable three-dimensional space; there is no intermediate material or container, which prevents such contact. Throughout the present disclosure the terms "product volume" and "product receiving volume" are used interchangeably and are intended to have the same meaning. Any of the embodiments of flexible containers, disclosed herein, can be configured to have any number of product volumes including one product volume, two product volumes, three product volumes, four product volumes, five product volumes, six product volumes, or even more product volumes. In some embodiments, one or more product volumes can be enclosed within another product volume. Any of the product volumes disclosed herein can have a product volume of any size, including from 0.001 liters to 100.0 liters, or any value in increments of 0.001 liters between 0.001 liters and 3.0 liters, or any value in increments of 0.01 liters between 3.0 liters and 10.0 liters, or any value in increments of 1.0 liters between 10.0 liters and 100.0 liters, or within any range formed by any of the preceding values, such as: from 0.001 to 2.2 liters, 0.01 to 2.0 liters, 0.05 to 1.8 liters, 0.1 to 1.6 liters, 0.15 to 1.4 liters, 0.2 to 1.2 liters, 0.25 to 1.0 liters, etc. A product volume can have any shape in any orientation. A product volume can be included in a container that has a structural support frame, and a product volume can be included in a container that does not have a structural support frame.

As used herein, when referring to a flexible container, the term "reclosing mechanism" refers to a structure that, after an initial hermetic seal is compromised, provides the ability to close the dispenser so that fluent product cannot be dispensed from the product volume to the environment outside of the container. A reclosing mechanism could, in various embodiments, be a screw-on lid, a flap, a VELCRO™-type hook-and-loop fastener, a tin tie, or a portion of the dispenser that can be folded and tucked or strapped. Examples of traditional reclosing mechanisms include flip top rigid closures, screw-on cap rigid closures, push pull closures, clips, interlocking rigid parts, and other types of rigid closures such as snap closures. Other reclosing mechanisms include flexible reclosing mechanisms, including press to seal closures or inflated reclose mechanisms such as those disclosed in U.S. Pat. No. 7,207,717 B2 entitled "Package Having a Fluid Actuated Closure", US patent publication 20080279485 A1 entitled "Packages Having Fluid-Filled Chamber Closures", and U.S. Pat. No. 7,883,268 B2 entitled "Package Having a Fluid Actuated Closure." Additional reclosing mechanisms include self sealing closures, such as that disclosed in U.S. Pat. No. 4,988,016 entitled "Self-Sealing Container", and rigid elements configured to air with automatic reclose such as that disclosed in US patent application 2009/0269450 A1 entitled "Flexible Package Having an Automatic Closure Feature." An elongate valve that may be tucked into a flap provided along an exterior wall or otherwise secured (e.g., by adhesive or fasteners such as Velcro) of a flexible container is yet another example of a reclosing mechanism within the scope of the present disclosure. Further examples of reclosing mechanisms can be found in US patent publication 20100166924 A1 entitled "Flexible Package Having Multiple Opening Feature" and US patent publication 20110211778 A1 entitled "Reclosable Fasteners, Packages Having Reclosable Fasteners, and Methods for Creating Reclosable Fasteners." The entirety of each of the publications referenced in this paragraph is incorporated herein by reference.

As used herein, when referring to a flexible container, the term "resting on a horizontal support surface" refers to the container resting directly on the horizontal support surface, without other support.

As used herein, the term "score line" refers to a gouge or notch in a flexible material. Score lines can be produced through various methods, for example, activation.

As used herein, the term "sealed," when referring to a product volume, refers to a state of the product volume wherein fluent products within the product volume are prevented from escaping the product volume (e.g. by one or more materials that form a barrier, and by a seal), and the product volume is hermetically sealed.

As used herein, the term "secondary delivery device" refers to a system or mechanism that is distinct from a flexible container through which fluent product may be dispensed. Examples of secondary delivery devices include nontraditional mopping systems, wall-mounted soap and shampoo dispensers, and shaving cream warmers, among other options. A secondary delivery device may be put into fluid communication with a product volume of a flexible container directly via the dispenser of the flexible container or via a connection device. The flow of fluent product through the secondary delivery device may be regulated by a valve of a flexible container or a valve or other flow regulation device of the secondary delivery device or both.

As used herein, the term "secondary product volume" refers to an enclosable three-dimensional space that is configured to receive and directly contain one or more fluent product(s), wherein that space is defined by one or more materials that form a barrier that prevents the fluent product (s) from escaping the secondary product volume, and wherein the secondary product volume is located in the product sensory-experience sampling mechanism and has a volume in the range of about 0.1 milliliters to about 20 milliliters, or any value in increments of 1 milliliters between about 0.1 milliliters and about 20 milliliters, or within any range formed by any of the preceding values, such as about 0.5 milliliters to about 12 milliliters, about 2 milliliters to about 18 milliliters, about 10 milliliters to about 19 milliliters, etc. A secondary product volume can be useful to allow a user to sample or experience some aspect of the product when the product volume is hermetically sealed.

As used herein, when referring to a flexible container, the term "self-supporting" refers to a container that includes a product volume and a structural support frame, wherein, when the container is resting on a horizontal support surface, in at least one orientation, the structural support frame is configured to prevent the container from collapsing and to give the container an overall height that is significantly greater than the combined thickness of the materials that form the container, even when the product volume is unfilled. Any of the embodiments of flexible containers, disclosed herein, can be configured to be self-supporting. As examples, self-supporting flexible containers of the present disclosure can be used to form pillow packs, pouches, doy packs, sachets, tubes, boxes, tubs, cartons, flow wraps, gusseted packs, jugs, bottles, jars, bags in boxes, trays, hanging packs, blister packs, or any other forms known in the art.

As used herein, when referring to a flexible container, the term "single use" refers to a closed container which, after being opened by an end user, is not configured to be reclosed. Any of the embodiments of flexible containers, disclosed herein, can be configured to be single use.

As used herein, when referring to a product volume, the term "single dose" refers to a product volume that is sized to contain a particular amount of product that is about equal to one unit of typical consumption, application, or use by an end user. Any of the embodiments of flexible containers, disclosed herein, can be configured to have one or more single dose product volumes. A container with only one product volume, which is a single dose product volume, is referred to herein as a "single dose container."

As used herein, when referring to a flexible container, the terms "stand up," "stands up," "standing up", "stand upright", "stands upright", and "standing upright" refer to a particular orientation of a self-supporting flexible container, when the container is resting on a horizontal support surface. This standing upright orientation can be determined from the structural features of the container and/or indicia on the container. In a first determining test, if the flexible container has a clearly defined base structure that is configured to be used on the bottom of the container, then the container is determined to be standing upright when this base structure is resting on the horizontal support surface. If the first test cannot determine the standing upright orientation, then, in a second determining test, the container is determined to be standing upright when the container is oriented to rest on the horizontal support surface such that the indicia on the flexible container are best positioned in an upright orientation. If the second test cannot determine the standing upright orientation, then, in a third determining test, the container is determined to be standing upright when the container is oriented to rest on the horizontal support surface such that the container has the largest overall height. If the third test cannot determine the standing upright orientation, then, in a fourth determining test, the container is determined to be standing upright when the container is oriented to rest on the horizontal support surface such that the container has the largest height area ratio. If the fourth test cannot determine the standing upright orientation, then, any orientation used in the fourth determining test can be considered to be a standing upright orientation.

As used herein, when referring to a flexible container, the term "stand up container" refers to a self-supporting container, wherein, when the container (with all of its product volume(s) filled 100% with water) is standing up, the container has a height area ratio from 0.4 to 1.5 $cm^{-1}$. Any of the embodiments of flexible containers, disclosed herein, can be configured to be stand up containers.

As used herein, when referring to a flexible container, the term "structural support frame" refers to a rigid structure formed of one or more structural support members, joined together, around one or more sizable empty spaces and/or one or more nonstructural panels, and generally used as a major support for the product volume(s) in the flexible container and in making the container self-supporting and/or standing upright. In each of the embodiments disclosed herein, when a flexible container includes a structural support frame and one or more product volumes, the structural support frame is considered to be supporting the product volumes of the container, unless otherwise indicated.

As used herein, when referring to a flexible container, the term "structural support member" refers to a rigid, physical structure, which includes one or more expanded structural support volumes, and which is configured to be used in a structural support frame, to carry one or more loads (from the flexible container) across a span. A structure that does not include at least one expanded structural support volume, is not considered to be a structural support member, as used herein.

A structural support member has two defined ends, a middle between the two ends, and an overall length from its one end to its other end. A structural support member can have one or more cross-sectional areas, each of which has an overall width that is less than its overall length.

A structural support member can be configured in various forms. A structural support member can include one, two, three, four, five, six or more structural support volumes, arranged in various ways. For example, a structural support member can be formed by a single structural support volume. As another example, a structural support member can be formed by a plurality of structural support volumes, disposed end to end, in series, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other. As a further example, a structural support member can be formed by a plurality of support volumes disposed side by side, in parallel, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other.

In some embodiments, a structural support member can include a number of different kinds of elements. For example, a structural support member can include one or more structural support volumes along with one or more mechanical reinforcing elements (e.g. braces, collars, connectors, joints, ribs, etc.), which can be made from one or more rigid (e.g. solid) materials.

Structural support members can have various shapes and sizes. Part, parts, or about all, or approximately all, or substantially all, or nearly all, or all of a structural support member can be straight, curved, angled, segmented, or other shapes, or combinations of any of these shapes. Part, parts, or about all, or approximately all, or substantially all, or nearly all, or all of a structural support member can have any suitable cross-sectional shape, such as circular, oval, square, triangular, star-shaped, or modified versions of these shapes, or other shapes, or combinations of any of these shapes. A structural support member can have an overall shape that is tubular, or convex, or concave, along part, parts, or about all, or approximately all, or substantially all, or nearly all, or all of a length. A structural support member can have any suitable cross-sectional area, any suitable overall width, and any suitable overall length. A structural support member can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of a structural support member can increase or decrease along part, parts, or all of its length. Part, parts, or all of any of the embodiments of structural support members of the present disclosure, can be configured according to any embodiment disclosed herein, including any workable combination of structures, features, materials, and/or connections from any number of any of the embodiments disclosed herein.

As used herein, when referring to a flexible container, the term "structural support volume" refers to a fillable space made from one or more flexible materials, wherein the space is configured to be at least partially filled with one or more expansion materials, which create tension in the one or more flexible materials, and form an expanded structural support volume. One or more expanded structural support volumes can be configured to be included in a structural support member. A structural support volume is distinct from structures configured in other ways, such as: structures without a fillable space (e.g. an open space), structures made from inflexible (e.g. solid) materials, structures with spaces that are not configured to be filled with an expansion material (e.g. an unattached area between adjacent layers in a multi-layer panel), and structures with flexible materials that are not configured to be expanded by an expansion material (e.g. a space in a structure that is configured to be a non-structural panel). Notably, in various embodiments, any spaces defined by the unattached area between adjacent layers in a multi-layer panel may contain any gas or vapor composition of single or multiple chemistries including air, nitrogen or a gas composition comprising, as examples, greater than 80% nitrogen, greater than 20% carbon dioxide, greater than 10% of a noble gas, less than 15% oxygen; the gas or vapor contained in such spaces may include water vapor at a relative humidity of 0-100%, or any integer percentage value in this range. Throughout the present disclosure the terms "structural support volume" and "expandable chamber" are used interchangeably and are intended to have the same meaning.

In some embodiments, a structural support frame can include a plurality of structural support volumes, wherein some of or all of the structural support volumes are in fluid communication with each other. In other embodiments, a structural support frame can include a plurality of structural support volumes, wherein some of or none of the structural support volumes are in fluid communication with each other. Any of the structural support frames of the present disclosure can be configured to have any kind of fluid communication disclosed herein.

As used herein, the term "substantially" modifies a particular value, by referring to a range equal to the particular value, plus or minus ten percent (+/−10%). For any of the embodiments of flexible containers, disclosed herein, any disclosure of a particular value, can, in various alternate embodiments, also be understood as a disclosure of a range equal to approximately that particular value (i.e. +/−10%).

As used herein, the term "suck-back effect" refers to the reversal in direction in flow of a fluent product that a tension gradient within a flow path causes when the force being applied to dispense to fluent product falls below the critical force. The tension gradient in the flow path creates a region of high tension (i.e., high resistance to flow) nearest the outlet of the valve and lower tension (i.e., relatively less resistance to flow) nearer the inlet of the valve. The suck-back effect limits dripping and leakage through the valve after a critical squeeze force is released.

As used herein, when referring to a flexible container, the term "temporarily reusable" refers to a container which, after dispensing a product to an end user, is configured to be refilled with an additional amount of a product, up to ten times, before the container experiences a failure that renders it unsuitable for receiving, containing, or dispensing the product. As used herein, the term temporarily reusable can be further limited by modifying the number of times that the container can be refilled before the container experiences such a failure. For any of the embodiments of flexible containers, disclosed herein, a reference to temporarily reusable can, in various alternate embodiments, refer to temporarily reusable by refilling up to eight times before failure, by refilling up to six times before failure, by refilling up to four times before failure, or by refilling up to two times before failure, or any integer value for refills between one and ten times before failure. Any of the embodiments of flexible containers, disclosed herein, can be configured to be temporarily reusable, for the number of refills disclosed herein.

As used herein, the term "tension-inducing element" refers to a structure that causes tension in order to restrict the flow of the fluent product. A "tension-inducing element" includes, in various embodiments, an expandable volume or a non-inflated physical structure, among other options.

As used herein, the term "thickness" refers to a measurement that is parallel to a third centerline of a container, when the container is standing upright on a horizontal support surface, as described herein. A thickness may also be referred to as a "depth."

As used herein, when referring to a flexible container, the term "top" refers to the portion of the container that is located in the uppermost 20% of the overall height of the container, that is, from 80-100% of the overall height of the container. As used herein, the term top can be further limited by modifying the term top with a particular percentage value, which is less than 20%. For any of the embodiments of flexible containers, disclosed herein, a reference to the top of the container can, in various alternate embodiments, refer to the top 15% (i.e. from 85-100% of the overall height), the top 10% (i.e. from 90-100% of the overall height), or the top 5% (i.e. from 95-100% of the overall height), or any integer value for percentage between 0% and 20%.

As used herein, when referring to a flow path, the term "trapezoidal" refers to a flow path that has a larger width adjacent to the product volume and a smaller width at the outlet, regardless of whether the taper between the larger width and smaller width is continuous or discontinuous or interrupted or uninterrupted.

As used herein, when referring to a flexible container, the term "unexpanded" refers to the state of one or more materials that are configured to be formed into a structural support volume, before the structural support volume is made rigid by an expansion material.

As used herein, when referring to a product volume of a flexible container, the term "unfilled" refers to the state of the product volume when it does not contain a fluent product.

As used herein, when referring to a flexible container, the term "unformed" refers to the state of one or more materials that are configured to be formed into a product volume, before the product volume is provided with its defined three-dimensional space. For example, an article of manufacture could be a container blank with an unformed product volume, wherein sheets of flexible material, with portions joined together, are laying flat against each other.

As used herein, the term "valve" refers to a mechanism for selectively dispensing fluent product. For example, a valve may comprise a portion that has undergone activation, a flow path comprising tension-inducing elements such as expandable volumes, and/or other structures that prevent fluent product from being dispensed when a force less than the critical squeeze force is applied to the container and a pressure less than the critical pressure buildup exists inside the product volume, yet allow fluent product to be dispensed when the force applied to the container exceeds the critical squeeze force or the pressure inside the product volume exceeds the critical pressure buildup. A valve may further comprise an indicator that creates a signal to inform users as to whether the valve is open or closed.

Flexible containers, as described herein, may be used across a variety of industries for a variety of products. For example, any embodiment of flexible containers, as described herein, may be used across the consumer products industry, including any of the following products, any of which can take any workable fluent product form described herein or known in the art: baby care products (e.g. soaps, shampoos, and lotions); beauty care products for cleaning, treating, beautifying, and/or decorating human or animal hair (e.g. hair shampoos, hair conditioners, hair dyes, hair colorants, hair repair products, hair growth products, hair removal products, hair minimization products, etc.); beauty care products for cleaning, treating, beautifying, and/or decorating human or animal skin (e.g. soaps, body washes, body scrubs, facial cleansers, astringents, sunscreens, sun block lotions, lip balms, cosmetics, skin conditioners, cold creams, skin moisturizers, antiperspirants, deodorants, etc.); beauty care products for cleaning, treating, beautifying, and/or decorating human or animal nails (e.g. nail polishes, nail polish removers, etc.); grooming products for cleaning, treating, beautifying, and/or decorating human facial hair (e.g. shaving products, pre-shaving products, after shaving products, etc.); health care products for cleaning, treating, beautifying, and/or decorating human or animal oral cavities (e.g. toothpaste, mouthwash, breath freshening products, anti-plaque products, tooth whitening products, etc.); health care products for treating human and/or animal health conditions (e.g. medicines, medicaments, pharmaceuticals, vitamins, nutraceuticals, nutrient supplements (for calcium, fiber, etc.), cough treatment products, cold remedies, lozenges, treatments for respiratory and/or allergy conditions, pain relievers, sleep aids, gastrointestinal treatment products (for heartburn, upset stomach, diarrhea, irritable bowel syndrome, etc.), purified water, treated water, etc.); pet care products for feeding and/or caring for animals (e.g. pet food, pet vitamins, pet medicines, pet chews, pet treats, etc.); fabric care products for cleaning, conditioning, refreshing and/or treating fabrics, clothes and/or laundry (e.g. laundry detergents, fabric conditioners, fabric dyes, fabric bleaches, etc.); dish care products for home, commercial, and/or industrial use (e.g. dish soaps and rinse aids for handwashing and/or machine washing); cleaning and/or deodorizing products for home, commercial, and/or industrial use (e.g. soft surface cleaners, hard surface cleaners, glass cleaners, ceramic tile cleaners, carpet cleaner, wood cleaners, multi-surface cleaners, surface disinfectants, kitchen cleaners, bath cleaners (e.g. sink, toilet, tub, and/or shower cleaners), appliance cleaning products, appliance treatment products, car cleaning products, car deodorizing products, air cleaners, air deodorizers, air disinfectants, etc.), and the like.

As further examples, any embodiment of flexible containers, as described herein, may be used across additional areas of home, commercial, and/or industrial, building and/or grounds, construction and/or maintenance, including any of the following products, any of which can take any workable fluent product form (e.g. liquid, granular, powdered, etc.) described herein or known in the art: products for establishing, maintaining, modifying, treating, and/or improving lawns, gardens, and/or grounds (e.g. grass seeds, vegetable seeds, plant seeds, birdseed, other kinds of seeds, plant food, fertilizer, soil nutrients and/or soil conditions (e.g. nitrogen, phosphate, potash, lime, etc.), soil sterilants, herbicides, weed preventers, pesticides, pest repellents, insecticides, insect repellents, etc.); products for landscaping use (e.g. topsoils, potting soils, general use soils, mulches, wood chips, tree bark nuggets, sands, natural stones and/or rocks (e.g. decorative stones, pea gravel, gravel, etc.) of all kinds, man-made compositions based on stones and rocks (e.g. paver bases, etc.)); products for starting and/or fueling fires in grills, fire pits, fireplaces, etc. (e.g. fire logs, fire starting nuggets, charcoal, lighter fluid, matches, etc.); lighting products (e.g. light bulbs and light tubes or all kinds including: incandescents, compact fluorescents, fluorescents, halogens, light emitting diodes, of all sizes, shapes, and uses); chemical products for construction, maintenance, remodeling, and/or decorating (e.g. concretes, cements, mortars, mix colorants, concrete curers/sealants, concrete protectants, grouts, blacktop sealants, crack filler/repair products, spackles, joint compounds, primers, paints, stains, topcoats, sealants, caulks, adhesives, epoxies, drain cleaning/declogging products, septic treatment products, etc.); chemical products (e.g. thinners, solvents, and strippers/removers including alcohols, mineral spirits, turpentines, linseed oils, etc.); water treatment products (e.g. water softening products such as salts, bacteriostats, fungicides, etc.); fasteners of all kinds (e.g. screws, bolts, nuts, washers, nails, staples, tacks, hangers, pins, pegs, rivets, clips, rings, and the like, for use with/in/on wood, metal, plastic, concrete, concrete, etc.); and the like.

As further examples, any embodiment of flexible containers, as described herein, may be used across the food and beverage industry, including any of the following products, any of which can take any workable fluent product form described herein or known in the art: foods such as basic ingredients (e.g. grains such as rice, wheat, corn, beans, and derivative ingredients made from any of these, as well as nuts, seeds, and legumes, etc.), cooking ingredients (e.g. sugar, spices such as salt and pepper, cooking oils, vinegars, tomato pastes, natural and artificial sweeteners, flavorings, seasonings, etc.), baking ingredients (e.g. baking powders, starches, shortenings, syrups, food colorings, fillings, gelatins, chocolate chips and other kinds of chips, frostings, sprinkles, toppings, etc.), dairy foods (e.g. creams, yogurts, sour creams, wheys, caseins, etc.), spreads (e.g. jams, jellies, etc.), sauces (e.g. barbecue sauces, salad dressings, tomato sauces, etc.), condiments (e.g. ketchups, mustards, relishes, mayonnaises, etc.), processed foods (noodles and pastas, dry cereals, cereal mixes, premade mixes, snack chips and snacks and snack mixes of all kinds, pretzels, crackers, cookies, candies, chocolates of all kinds, marshmallows, puddings, etc.); beverages such as water, milks, juices, flavored and/or carbonated beverages (e.g. soda), sports drinks, coffees, teas, spirits, alcoholic beverages (e.g. beer, wine, etc.), etc.; and ingredients for making or mixing into beverages (e.g. coffee beans, ground coffees, cocoas, tea leaves, dehydrated beverages, powders for making beverages, natural and artificial sweeteners, flavorings, etc.). Further, prepared foods, fruits, vegetables, soups, meats, pastas, microwavable and or frozen foods as well as produce, eggs, milk, and other fresh foods. Any of the embodiments of flexible containers disclosed herein can also be sterilized (e.g. by treatment with ultraviolet light or peroxide-based compositions), to make the containers safe for use in storing food and/or beverage. In any embodiment, the containers can be configured to be suitable for retort processes.

As still further examples, any embodiment of flexible containers, as described herein, may be used across the medical industry, in the areas of medicines, medical devices, and medical treatment, including uses for receiving, containing, storing and/or dispensing, any of the following fluent products, in any form known in the art: bodily fluids from humans and/or animals (e.g. amniotic fluid, aqueous humour, vitreous humour, bile, blood, blood plasma, blood serum, breast milk, cerebrospinal fluid, cerumen (earwax), chyle, chime, endolymph (and perilymph), ejaculate, runny feces, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, tears, sweat, vaginal secretion, vomit, urine, etc.); fluids for intravenous therapy to human or animal bodies (e.g. volume expanders (e.g. crystalloids and colloids), blood-based products including blood substitutes, buffer solutions, liquid-based medications (which can include pharmaceuticals), parenteral nutritional formulas (e.g. for intravenous feeding, wherein such formulas can include salts, glucose, amino acids, lipids, supplements, nutrients, and/or vitamins); other medicinal fluids for administering to human or animal bodies (e.g. medicines, medicaments, nutrients, nutraceuticals, pharmaceuticals, etc.) by any suitable method of administration (e.g. orally (in solid, liquid, or pill form), topically, intranasally, by inhalation, or rectally. Any of the embodiments of flexible containers disclosed herein can also be sterilized (e.g. by treatment with ultraviolet light or peroxide-based compositions or through an autoclave or retort process), to make the containers safe for use in sterile medical environments.

As even further examples, any embodiment of flexible containers, as described herein, may be used across any and all industries that use internal combustion engines (such as the transportation industry, the power equipment industry, the power generation industry, etc.), including products for vehicles such as cars, trucks, automobiles, boats, aircraft, etc., with such containers useful for receiving, containing, storing, and/or dispensing, any of the following fluent products, in any form known in the art: engine oil, engine oil additives, fuel additives, brake fluids, transmission fluids, engine coolants, power steering fluids, windshield wiper fluids, products for vehicle care (e.g. for body, tires, wheels, windows, trims, upholsteries, etc.), as well as other fluids configured to clean, penetrate, degrease, lubricate, and/or protect one or more parts of any and all kinds of engines, power equipment, and/or transportation vehicles.

Any embodiment of flexible containers, as described herein, can also be used for receiving, containing, storing, and/or dispensing, non-fluent products, in any of the following categories: Baby Care products, including disposable wearable absorbent articles, diapers, training pants, infant and toddler care wipes, etc. and the like; Beauty Care products including applicators for applying compositions to human or animal hair, skin, and/or nails, etc. and the like; Home Care products including wipes and scrubbers for all kinds of cleaning applications and the like; Family Care products including wet or dry bath tissue, facial tissue, disposable handkerchiefs, disposable towels, wipes, etc. and the like; Feminine Care products including catamenial pads, incontinence pads, interlabial pads, panty liners, pessaries, sanitary napkins, tampons, tampon applicators, wipes, etc. and the like; Health Care products including oral care products such as oral cleaning devices, dental floss, flossing devices, toothbrushes, etc. and the like; Pet Care products including grooming aids, pet training aids, pet devices, pet toys, etc. and the like; Portable Power products including electrochemical cells, batteries, battery current interrupters, battery testers, battery chargers, battery charge monitoring equipment, battery charge/discharge rate controlling equipment, "smart" battery electronics, flashlights, etc. and the like; Small Appliance Products including hair removal appliances (including, e.g. electric foil shavers for men and women, charging and/or cleaning stations, electric hair trimmers, electric beard trimmers, electric epilator devices, cleaning fluid cartridges, shaving conditioner cartridges, shaving foils, and cutter blocks); oral care appliances (including, e.g., electric toothbrushes with accumulator or battery, refill brushheads, interdental cleaners, tongue cleaners, charging stations, electric oral irrigators, and irrigator clip on jets); small electric household appliances (including, e.g., coffee makers, water kettles, handblenders, handmixers, food processors, steam cookers, juicers, citrus presses, toasters, coffee or meat grinders, vacuum pumps, irons, steam pressure stations for irons and in general non electric attachments therefore, hair care appliances (including, e.g., electric hair driers, hairstylers, hair curlers, hair straighteners, cordless gas heated styler/irons and gas cartridges therefore, and air filter attachments); personal diagnostic appliances (including, e.g., blood pressure monitors, ear thermometers, and lensfilters therefore); clock appliances and watch appliances (including, e.g., alarm clocks, travel alarm clocks combined with radios, wall clocks, wristwatches, and pocket calculators), etc. and the like.

FIGS. 1A-1D illustrates various views of an embodiment of a stand up flexible container 100. FIG. 1A illustrates a front view of the container 100. The container 100 is standing upright on a horizontal support surface 101.

In FIG. 1A, a coordinate system 110, provides lines of reference for referring to directions in the figure. The coordinate system 110 is a three-dimensional Cartesian coordinate system with an X-axis, a Y-axis, and a Z-axis, wherein each axis is perpendicular to the other axes, and any two of the axes define a plane. The X-axis and the Z-axis are parallel with the horizontal support surface 101 and the Y-axis is perpendicular to the horizontal support surface 101.

FIG. 1A also includes other lines of reference, for referring to directions and locations with respect to the container 100. A lateral centerline 111 runs parallel to the X-axis. An XY plane at the lateral centerline 111 separates the container 100 into a front half and a back half. An XZ plane at the lateral centerline 111 separates the container 100 into an upper half and a lower half. A longitudinal centerline 114 runs parallel to the Y-axis. A YZ plane at the longitudinal centerline 114 separates the container 100 into a left half and a right half. A third centerline 117 runs parallel to the Z-axis. The lateral centerline 111, the longitudinal centerline 114, and the third centerline 117 all intersect at a center of the container 100.

A disposition with respect to the lateral centerline 111 defines what is longitudinally inboard 112 and longitudinally outboard 113. When a first location is nearer to the lateral centerline 111 than a second location, the first location is considered to be disposed longitudinally inboard 112 to the second location. And, the second location is considered to be disposed longitudinally outboard 113 from the first location. The term lateral refers to a direction, orientation, or measurement that is parallel to the lateral centerline 111. A lateral orientation may also be referred to a horizontal orientation, and a lateral measurement may also be referred to as a width.

A disposition with respect to the longitudinal centerline 114 defines what is laterally inboard 115 and laterally outboard 116. When a first location is nearer to the longitudinal centerline 114 than a second location, the first location is considered to be disposed laterally inboard 115 to the second location. And, the second location is considered to be disposed laterally outboard 116 from the first location.

The term longitudinal refers to a direction, orientation, or measurement that is parallel to the longitudinal centerline 114. A longitudinal orientation may also be referred to a vertical orientation.

A longitudinal direction, orientation, or measurement may also be expressed in relation to a horizontal support surface for the container 100. When a first location is nearer to the support surface than a second location, the first location can be considered to be disposed lower than, below, beneath, or under the second location. And, the second location can be considered to be disposed higher than, above, or upward from the first location. A longitudinal measurement may also be referred to as a height, measured above the horizontal support surface 100.

A measurement that is made parallel to the third centerline 117 is referred to a thickness or depth. A disposition in the direction of the third centerline 117 and toward a front 102-1 of the container is referred to as forward 118 or in front of. A disposition in the direction of the third centerline 117 and toward a back 102-2 of the container is referred to as backward 119 or behind.

These terms for direction, orientation, measurement, and disposition, as described above, are used for all of the embodiments of the present disclosure, whether or not a support surface, reference line, or coordinate system is shown in a figure.

The container 100 includes a top 104, a middle 106, and a bottom 108, the front 102-1, the back 102-2, and left and right sides 109. The top 104 is separated from the middle 106 by a reference plane 105, which is parallel to the XZ plane. The middle 106 is separated from the bottom 108 by a reference plane 107, which is also parallel to the XZ plane. The container 100 has an overall height of 100-oh. In the embodiment of FIG. 1A, the front 102-1 and the back 102-2 of the container are joined together at a seal 129, which extends around the outer periphery of the container 100, across the top 104, down the side 109, and then, at the bottom of each side 109, splits outward to follow the front and back portions of the base 190, around their outer extents.

The container 100 includes a structural support frame 140, a product volume 150, a dispenser 160, panels 180-1 and 180-2, and a base structure 190. A portion of panel 180-1 is illustrated as broken away, in order to show the product volume 150. The product volume 150 is configured to contain one or more fluent products. The dispenser 160 allows the container 100 to dispense these fluent product(s) from the product volume 150 through a flow channel 159 then through the dispenser 160, to the environment outside of the container 100. In the embodiment of FIGS. 1A-1D, the dispenser 160 is disposed in the center of the uppermost part of the top 104, however, in various alternate embodiments, the dispenser 160 can be disposed anywhere else on the top 140, middle 106, or bottom 108, including anywhere on either of the sides 109, on either of the panels 180-1 and 180-2, and on any part of the base 190 of the container 100. The structural support frame 140 supports the mass of fluent product(s) in the product volume 150, and makes the container 100 stand upright. The panels 180-1 and 180-2 are relatively flat surfaces, overlaying the product volume 150, and are suitable for displaying any kind of indicia. However, in various embodiments, part, parts, or about all, or approximately all, or substantially all, or nearly all, or all of either or both of the panels 180-1 and 180-2 can include one or more curved surfaces. The base structure 190 supports the structural support frame 140 and provides stability to the container 100 as it stands upright.

The structural support frame 140 is formed by a plurality of structural support members. The structural support frame 140 includes top structural support members 144-1 and 144-2, middle structural support members 146-1, 146-2, 146-3, and 146-4, as well as bottom structural support members 148-1 and 148-2.

The top structural support members 144-1 and 144-2 are disposed on the upper part of the top 104 of the container 100, with the top structural support member 144-1 disposed in the front 102-1 and the top structural support member 144-2 disposed in the back 102-2, behind the top structural support member 144-1. The top structural support members 144-1 and 144-2 are adjacent to each other and can be in contact with each other along the laterally outboard portions of their lengths. In various embodiments, the top structural support members 144-1 and 144-2 can be in contact with each other at one or more relatively smaller locations and/or at one or more relatively larger locations, along part, or parts, or about all, or approximately all, or substantially all, or nearly all, or all of their overall lengths, so long as there is a flow channel 159 between the top structural support members 144-1 and 144-2, which allows the container 100 to dispense fluent product(s) from the product volume 150 through the flow channel 159 then through the dispenser 160. The top structural support members 144-1 and 144-2 are not directly connected to each other. However, in various alternate embodiments, the top structural support members 144-1 and 144-2 can be directly connected and/or joined together along part, or parts, or about all, or approximately all, or substantially all, or nearly all, or all of their overall lengths.

The top structural support members 144-1 and 144-2 are disposed substantially above the product volume 150. Overall, each of the top structural support members 144-1 and 144-2 is oriented about horizontally, but with its ends curved slightly downward. And, overall each of the top structural support members 144-1 and 144-2 has a cross-sectional area that is substantially uniform along its length; however the cross-sectional area at their ends are slightly larger than the cross-sectional area in their middles.

The middle structural support members 146-1, 146-2, 146-3, and 146-4 are disposed on the left and right sides 109, from the top 104, through the middle 106, to the bottom 108. The middle structural support member 146-1 is disposed in the front 102-1, on the left side 109; the middle structural support member 146-4 is disposed in the back 102-2, on the left side 109, behind the middle structural support member 146-1. The middle structural support members 146-1 and 146-4 are adjacent to each other and can be in contact with each other along substantially all of their lengths. In various embodiments, the middle structural support members 146-1 and 146-4 can be in contact with each other at one or more relatively smaller locations and/or at one or more relatively larger locations, along part, or parts, or about all, or approximately all, or substantially all, or nearly all, or all of their overall lengths. The middle structural support members 146-1 and 146-4 are not directly connected to each other. However, in various alternate embodiments, the middle structural support members 146-1 and 146-4 can be directly connected and/or joined together along part, or parts, or about all, or approximately all, or substantially all, or nearly all, or all of their overall lengths.

The middle structural support member 146-2 is disposed in the front 102-1, on the right side 109; the middle structural support member 146-3 is disposed in the back 102-2, on the right side 109, behind the middle structural support member 146-2. The middle structural support members 146-2 and 146-3 are adjacent to each other and can be in contact with each other along substantially all of their lengths. In various embodiments, the middle structural support members 146-2 and 146-3 can be in contact with each other at one or more relatively smaller locations and/or at one or more relatively larger locations, along part, or parts, or about all, or approximately all, or substantially all, or nearly all, or all of their overall lengths. The middle structural support members 146-2 and 146-3 are not directly connected to each other. However, in various alternate embodiments, the middle structural support members 146-2 and 146-3 can be directly connected and/or joined together along part, or parts, or about all, or approximately all, or substantially all, or nearly all, or all of their overall lengths.

The middle structural support members 146-1, 146-2, 146-3, and 146-4 are disposed substantially laterally outboard from the product volume 150. Overall, each of the middle structural support members 146-1, 146-2, 146-3, and 146-4 is oriented about vertically, but angled slightly, with its upper end laterally inboard to its lower end. And, overall each of the middle structural support members 146-1, 146-2, 146-3, and 146-4 has a cross-sectional area that changes along its length, increasing in size from its upper end to its lower end.

The bottom structural support members 148-1 and 148-2 are disposed on the bottom 108 of the container 100, with the bottom structural support member 148-1 disposed in the front 102-1 and the bottom structural support member 148-2 disposed in the back 102-2, behind the top structural support member 148-1. The bottom structural support members 148-1 and 148-2 are adjacent to each other and can be in contact with each other along substantially all of their lengths. In various embodiments, the bottom structural support members 148-1 and 148-2 can be in contact with each other at one or more relatively smaller locations and/or at one or more relatively larger locations, along part, or parts, or about all, or approximately all, or substantially all, or nearly all, or all of their overall lengths. The bottom structural support members 148-1 and 148-2 are not directly connected to each other. However, in various alternate embodiments, the bottom structural support members 148-1 and 148-2 can be directly connected and/or joined together along part, or parts, or about all, or approximately all, or substantially all, or nearly all, or all of their overall lengths.

The bottom structural support members 148-1 and 148-2 are disposed substantially below the product volume 150, but substantially above the base structure 190. Overall, each of the bottom structural support members 148-1 and 148-2 is oriented about horizontally, but with its ends curved slightly upward. And, overall each of the bottom structural support members 148-1 and 148-2 has a cross-sectional area that is substantially uniform along its length.

In the front portion of the structural support frame 140, the left end of the top structural support member 144-1 is joined to the upper end of the middle structural support member 146-1; the lower end of the middle structural support member 146-1 is joined to the left end of the bottom structural support member 148-1; the right end of the bottom structural support member 148-1 is joined to the lower end of the middle structural support member 146-2; and the upper end of the middle structural support member 146-2 is joined to the right end of the top structural support member 144-1. Similarly, in the back portion of the structural support frame 140, the left end of the top structural support member 144-2 is joined to the upper end of the middle structural support member 146-4; the lower end of the middle structural support member 146-4 is joined to the left end of the bottom structural support member 148-2; the right end of the bottom structural support member 148-2 is joined to the lower end of the middle structural support member 146-3; and the upper end of the middle structural support member 146-3 is joined to the right end of the top structural support member 144-2. In the structural support frame 140, the ends of the structural support members, which are joined together, are directly connected, all around the periphery of their walls. However, in various alternative embodiments, any of the structural support members 144-1, 144-2, 146-1, 146-2, 146-3, 146-4, 148-1, and 148-2 can be joined together in any way described herein or known in the art.

In alternative embodiments of the structural support frame 140, adjacent structural support members can be combined into a single structural support member, wherein the combined structural support member can effectively substitute for the adjacent structural support members, as their functions and connections are described herein. In other alternative embodiments of the structural support frame 140, one or more additional structural support members can be added to the structural support members in the structural support frame 140, wherein the expanded structural support frame can effectively substitute for the structural support frame 140, as its functions and connections are described herein. Also, in some alternative embodiments, a flexible container may not include a base structure.

Figure 1B:
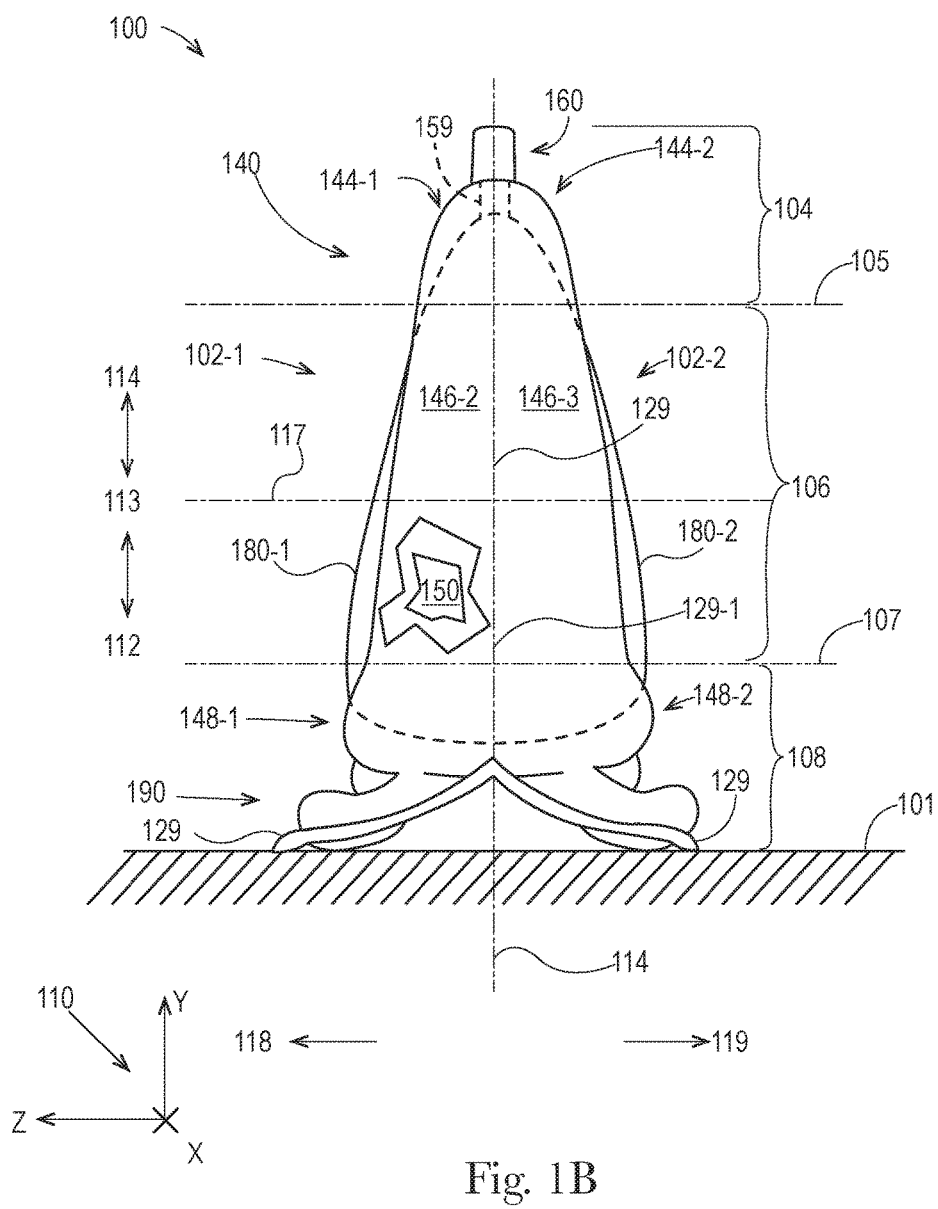
FIG. 1B illustrates a side view of the stand up flexible container of FIG. 1A.

FIG. 1B illustrates a side view of the stand up flexible container 100 of FIG. 1A.

FIG. 1C illustrates a top view of the stand up flexible container 100 of FIG. 1A.

Figure 1D:
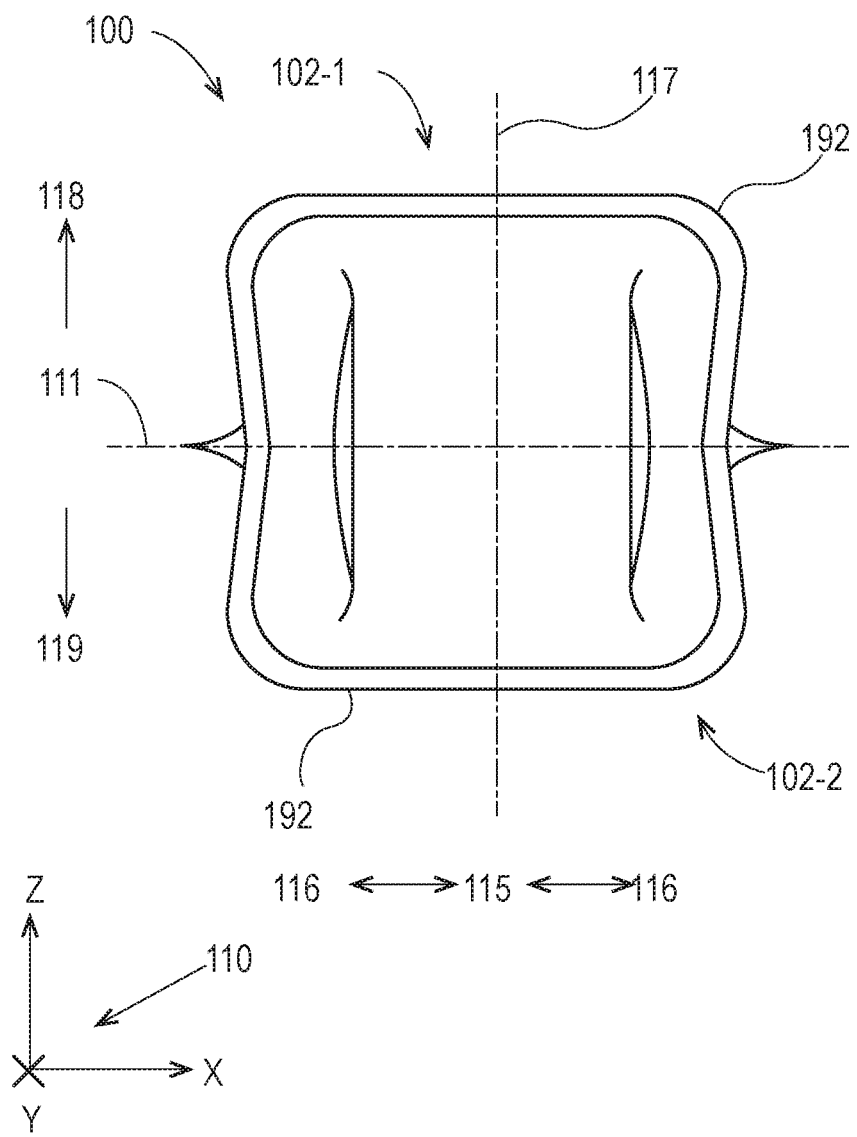
FIG. 1D illustrates a bottom view of the stand up flexible container of FIG. 1A.

FIG. 1D illustrates a bottom view of the stand up flexible container 100 of FIG. 1A.

Figure 1G:
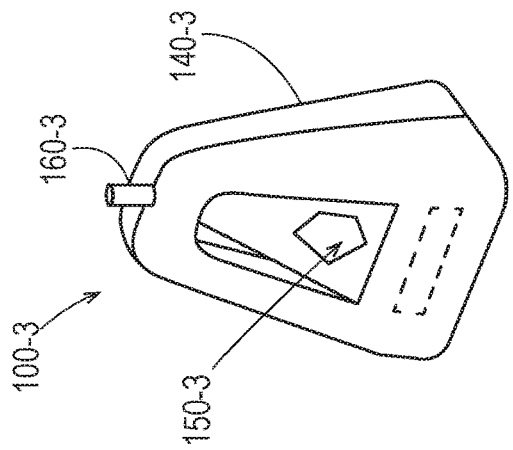
FIG. 1G illustrates a perspective view of an alternative embodiment of the stand up flexible container of FIG. 1A, including an external structural support frame.
Figure 1F:
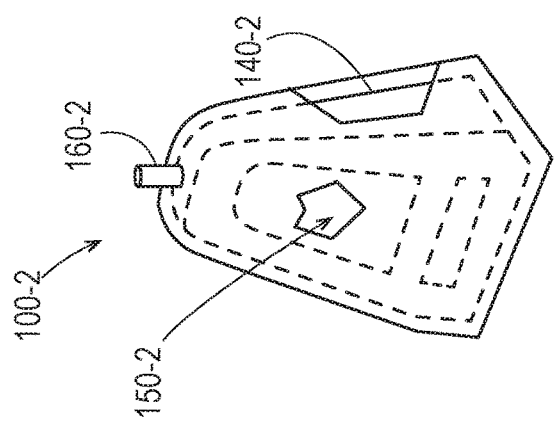
FIG. 1F illustrates a perspective view of an alternative embodiment of the stand up flexible container of FIG. 1A, including an internal structural support frame.
Figure 1E:
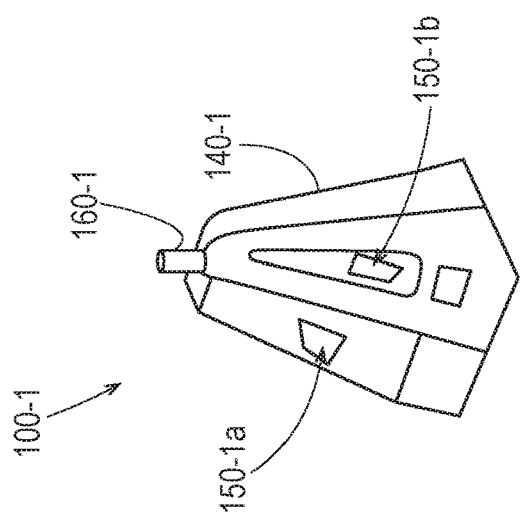
FIG. 1E illustrates a perspective view of an alternative embodiment of the stand up flexible container of FIG. 1A, including an asymmetric structural support frame.

FIG. 1E illustrates a perspective view of a container 100-1, which is an alternative embodiment of the stand up flexible container 100 of FIG. 1A, including an asymmetric structural support frame 140-1, a first portion of the product volume 150-1b, a second portion of the product volume 150-1a, and a dispenser 160-1. The embodiment of FIG. 1E is similar to the embodiment of FIG. 1A with like-numbered terms configured in the same way, except that the frame 140-1 extends around about half of the container 100-1, directly supporting a first portion of the product volume 150-1b, which is disposed inside of the frame 140-1, and indirectly supporting a second portion of the product volume 150-1a, which is disposed outside of the frame 140-1. In various embodiments, any stand-up flexible container of the present disclosure can be modified in a similar way, such that: the frame extends around only part or parts of the container, and/or the frame is asymmetric with respect to one or more centerlines of the container, and/or part or parts of one or more product volumes of the container are disposed outside of the frame, and/or part or parts of one or more product volumes of the container are indirectly supported by the frame.

FIG. 1F illustrates a perspective view of a container 100-2, which is an alternative embodiment of the stand up flexible container 100 of FIG. 1A, including an internal structural support frame 140-2, a product volume 150-2, and a dispenser 160-2. The embodiment of FIG. 1F is similar to the embodiment of FIG. 1A with like-numbered terms configured in the same way, except that the frame 140-2 is internal to the product volume 150-2. In various embodiments, any stand-up flexible container of the present disclosure can be modified in a similar way, such that: part, parts, or all of the frame (including part, parts, or all of one or more of any structural support members that form the frame) are about, approximately, substantially, nearly, or completely enclosed by one or more product volumes.

FIG. 1G illustrates a perspective view of a container 100-3, which is an alternative embodiment of the stand up flexible container 100 of FIG. 1A, including an external structural support frame 140-3, a product volume 150-3, and a dispenser 160-3. The embodiment of FIG. 1G is similar to the embodiment of FIG. 1A with like-numbered terms configured in the same way, except that the product volume 150-3 is not integrally connected to the frame 140-3 (that is, not simultaneously made from the same web of flexible materials), but rather the product volume 150-3 is separately made and then joined to the frame 140-3. The product volume 150-3 can be joined to the frame in any convenient manner disclosed herein or known in the art. In the embodiment of FIG. 1G, the product volume 150-3 is disposed within the frame 140-3, but the product volume 150-3 has a reduced size and a somewhat different shape, when compared with the product volume 150 of FIG. 1A; however, these differences are made to illustrate the relationship between the product volume 150-3 and the frame 140-3, and are not required. In various embodiments, any stand-up flexible container of the present disclosure can be modified in a similar way, such that one or more the product volumes are not integrally connected to the frame.

FIGS. 2A-8G illustrate embodiments of stand up flexible containers having various overall shapes. Any of the embodiments of FIGS. 2A-8G can be configured according to any of the embodiments disclosed herein, including the embodiments of FIGS. 1A-1G. Any of the elements (e.g. structural support frames, structural support members, panels, dispensers, etc.) of the embodiments of FIGS. 2A-8G, can be configured according to any of the embodiments disclosed herein. While each of the embodiments of FIGS. 2A-8G illustrates a container with one dispenser, in various embodiments, each container can include multiple dispensers, according to any embodiment described herein. FIGS. 2A-8G illustrate exemplary additional/alternate locations for dispenser with phantom line outlines. Part, parts, or about all, or approximately all, or substantially all, or nearly all, or all of each of the panels in the embodiments of FIGS. 2A-8G is suitable to display any kind of indicia. Each of the side panels in the embodiments of FIGS. 2A-8G is configured to be a nonstructural panel, overlaying product volume(s) disposed within the flexible container, however, in various embodiments, one or more of any kind of decorative or structural element (such as a rib, protruding from an outer surface) can be joined to part, parts, or about all, or approximately all, or substantially all, or nearly all, or all of any of these side panels. For clarity, not all structural details of these flexible containers are shown in FIGS. 2A-8G, however any of the embodiments of FIGS. 2A-8G can be configured to include any structure or feature for flexible containers, disclosed herein. For example, any of the embodiments of FIGS. 2A-8G can be configured to include any kind of base structure disclosed herein.

FIG. 2A illustrates a front view of a stand up flexible container 200 having a structural support frame 240 that has an overall shape like a frustum. In the embodiment of FIG. 2A, the frustum shape is based on a four-sided pyramid, however, in various embodiments, the frustum shape can be based on a pyramid with a different number of sides, or the frustum shape can be based on a cone. The support frame 240 is formed by structural support members disposed along the edges of the frustum shape and joined together at their ends. The structural support members define a rectangular shaped top panel 280-t, trapezoidal shaped side panels

280-1, 280-2, 280-3, and 280-4, and a rectangular shaped bottom panel (not shown). Each of the side panels 280-1, 280-2, 280-3, and 280-4 is about flat, however in various embodiments, part, parts, or about all, or approximately all, or substantially all, or nearly all, or all of any of the side panels can be approximately flat, substantially flat, nearly flat, or completely flat. The container 200 includes a dispenser 260, which is configured to dispense one or more fluent products from one or more product volumes disposed within the container 200. In the embodiment of FIG. 2A, the dispenser 260 is disposed in the center of the top panel 280-*t*, however, in various alternate embodiments, the dispenser 260 can be disposed anywhere else on the top, sides, or bottom, of the container 200, according to any embodiment described or illustrated herein. FIG. 2B illustrates a front view of the container 200 of FIG. 2A, including exemplary additional/alternate locations for a dispenser, any of which can also apply to the back of the container. FIG. 2C illustrates a side view of the container 200 of FIG. 2A, including exemplary additional/alternate locations for a dispenser (shown as phantom lines), any of which can apply to either side of the container. FIG. 2D illustrates an isometric view of the container 200 of FIG. 2A.

FIG. 2E illustrates a perspective view of a container 200-1, which is an alternative embodiment of the stand up flexible container 200 of FIG. 2A, including an asymmetric structural support frame 240-1, a first portion of the product volume 250-1*b*, a second portion of the product volume 250-1*a*, and a dispenser 260-1, configured in the same manner as the embodiment of FIG. 1E, except based on the container 200. FIG. 2F illustrates a perspective view of a container 200-2, which is an alternative embodiment of the stand up flexible container 200 of FIG. 2A, including an internal structural support frame 240-2, a product volume 250-2, and a dispenser 260-2, configured in the same manner as the embodiment of FIG. 1F, except based on the container 200. FIG. 2G illustrates a perspective view of a container 200-3, which is an alternative embodiment of the stand up flexible container 200 of FIG. 2A, including an external structural support frame 240-3, a non-integral product volume 250-3 joined to and disposed within the frame 240-3, and a dispenser 260-3, configured in the same manner as the embodiment of FIG. 1G, except based on the container 200.

FIG. 3A illustrates a front view of a stand up flexible container 300 having a structural support frame 340 that has an overall shape like a pyramid. In the embodiment of FIG. 3A, the pyramid shape is based on a four-sided pyramid, however, in various embodiments, the pyramid shape can be based on a pyramid with a different number of sides. The support frame 340 is formed by structural support members disposed along the edges of the pyramid shape and joined together at their ends. The structural support members define triangular shaped side panels 380-1, 380-2, 380-3, and 380-4, and a square shaped bottom panel (not shown). Each of the side panels 380-1, 380-2, 380-3, and 380-4 is about flat, however in various embodiments, part, parts, or about all, or approximately all, or substantially all, or nearly all, or all of any of the side panels can be approximately flat, substantially flat, nearly flat, or completely flat. The container 300 includes a dispenser 360, which is configured to dispense one or more fluent products from one or more product volumes disposed within the container 300. In the embodiment of FIG. 3A, the dispenser 360 is disposed at the apex of the pyramid shape, however, in various alternate embodiments, the dispenser 360 can be disposed anywhere else on the top, sides, or bottom, of the container 300. FIG. 3B illustrates a front view of the container 300 of FIG. 3A, including exemplary additional/alternate locations for a dispenser (shown as phantom lines), any of which can also apply to any side of the container. FIG. 3C illustrates a side view of the container 300 of FIG. 3A. FIG. 3D illustrates an isometric view of the container 300 of FIG. 3A.

Figure 3G:
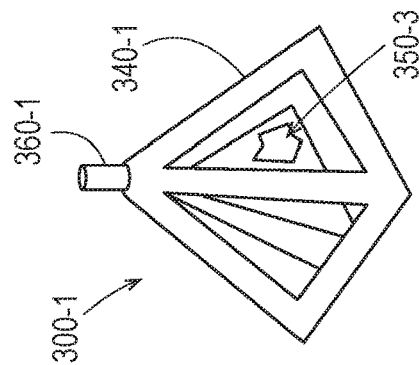
FIG. 3G illustrates a perspective view of an alternative embodiment of the stand up flexible container of FIG. 3A, including an external structural support frame.
Figure 3F:
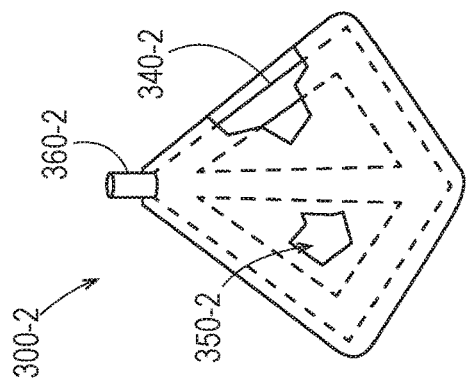
FIG. 3F illustrates a perspective view of an alternative embodiment of the stand up flexible container of FIG. 3A, including an internal structural support frame.
Figure 3E:
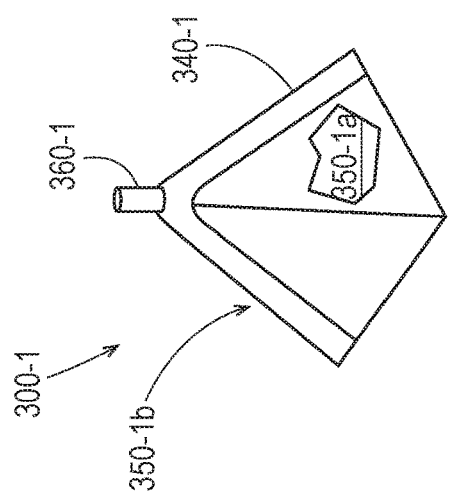
FIG. 3E illustrates a perspective view of an alternative embodiment of the stand up flexible container of FIG. 3A, including an asymmetric structural support frame.

FIG. 3E illustrates a perspective view of a container 300-1, which is an alternative embodiment of the stand up flexible container 300 of FIG. 3A, including an asymmetric structural support frame 340-1, a first portion of the product volume 350-1*b*, a second portion of the product volume 350-1*a*, and a dispenser 360-1, configured in the same manner as the embodiment of FIG. 1E, except based on the container 300. FIG. 3F illustrates a perspective view of a container 300-2, which is an alternative embodiment of the stand up flexible container 300 of FIG. 3A, including an internal structural support frame 340-2, a product volume 350-2, and a dispenser 360-2, configured in the same manner as the embodiment of FIG. 1F, except based on the container 300. FIG. 3G illustrates a perspective view of a container 300-3, which is an alternative embodiment of the stand up flexible container 300 of FIG. 3A, including an external structural support frame 340-3, a non-integral product volume 350-3 joined to and disposed within the frame 340-3, and a dispenser 360-3, configured in the same manner as the embodiment of FIG. 1G, except based on the container 300.

FIG. 4A illustrates a front view of a stand up flexible container 400 having a structural support frame 440 that has an overall shape like a trigonal prism. In the embodiment of FIG. 4A, the prism shape is based on a triangle. The support frame 440 is formed by structural support members disposed along the edges of the prism shape and joined together at their ends. The structural support members define a triangular shaped top panel 480-*t*, rectangular shaped side panels 480-1, 480-2, and 480-3, and a triangular shaped bottom panel (not shown). Each of the side panels 480-1, 480-2, and 480-3 is about flat, however in various embodiments, part, parts, or about all, or approximately all, or substantially all, or nearly all, or all of the side panels can be approximately flat, substantially flat, nearly flat, or completely flat. The container 400 includes a dispenser 460, which is configured to dispense one or more fluent products from one or more product volumes disposed within the container 400. In the embodiment of FIG. 4A, the dispenser 460 is disposed in the center of the top panel 480-*t*, however, in various alternate embodiments, the dispenser 460 can be disposed anywhere else on the top, sides, or bottom, of the container 400. FIG. 4B illustrates a front view of the container 400 of FIG. 4A, including exemplary additional/alternate locations for a dispenser (shown as phantom lines), any of which can also apply to any side of the container 400. FIG. 4C illustrates a side view of the container 400 of FIG. 4A. FIG. 4D illustrates an isometric view of the container 400 of FIG. 4A.

Figure 4G:
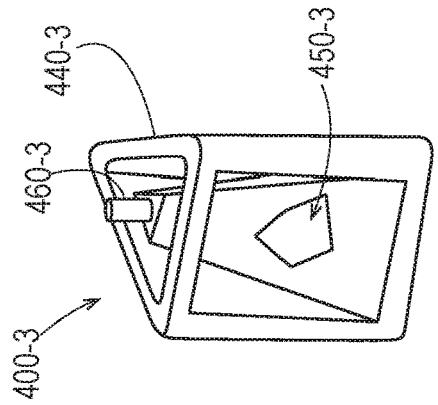
FIG. 4G illustrates a perspective view of an alternative embodiment of the stand up flexible container of FIG. 4A, including an external structural support frame.
Figure 4F:
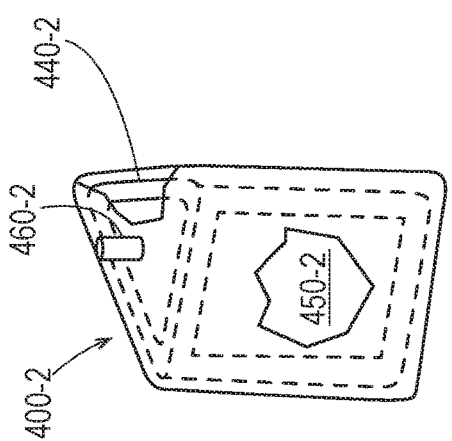
FIG. 4F illustrates a perspective view of an alternative embodiment of the stand up flexible container of FIG. 4A, including an internal structural support frame.
Figure 4E:
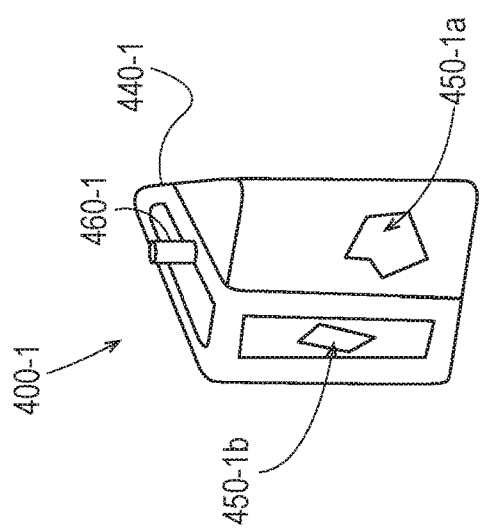
FIG. 4E illustrates a perspective view of an alternative embodiment of the stand up flexible container of FIG. 4A, including an asymmetric structural support frame.

FIG. 4E illustrates a perspective view of a container 400-1, which is an alternative embodiment of the stand up flexible container 400 of FIG. 4A, including an asymmetric structural support frame 440-1, a first portion of the product volume 450-1*b*, a second portion of the product volume 450-1*a*, and a dispenser 460-1, configured in the same manner as the embodiment of FIG. 1E, except based on the container 400. FIG. 4F illustrates a perspective view of a container 400-2, which is an alternative embodiment of the stand up flexible container 400 of FIG. 4A, including an internal structural support frame 440-2, a product volume 450-2, and a dispenser 460-2, configured in the same manner as the embodiment of FIG. 1F, except based on the container 400. FIG. 4G illustrates a perspective view of a container 400-3, which is an alternative embodiment of the stand up flexible container 400 of FIG. 4A, including an external structural support frame 440-3, a non-integral product volume 450-3 joined to and disposed within the frame 440-3, and a dispenser 460-3, configured in the same manner as the embodiment of FIG. 1G, except based on the container 400.

FIG. 5A illustrates a front view of a stand up flexible container 500 having a structural support frame 540 that has an overall shape like a tetragonal prism. In the embodiment of FIG. 5A, the prism shape is based on a square. The support frame 540 is formed by structural support members disposed along the edges of the prism shape and joined together at their ends. The structural support members define a square shaped top panel 580-*t*, rectangular shaped side panels 580-1, 580-2, 580-3, and 580-4, and a square shaped bottom panel (not shown). Each of the side panels 580-1, 580-2, 580-3, and 580-4 is about flat, however in various embodiments, part, parts, or about all, or approximately all, or substantially all, or nearly all, or all of any of the side panels can be approximately flat, substantially flat, nearly flat, or completely flat. The container 500 includes a dispenser 560, which is configured to dispense one or more fluent products from one or more product volumes disposed within the container 500. In the embodiment of FIG. 5A, the dispenser 560 is disposed in the center of the top panel 580-*t*, however, in various alternate embodiments, the dispenser 560 can be disposed anywhere else on the top, sides, or bottom, of the container 500. FIG. 5B illustrates a front view of the container 500 of FIG. 5A, including exemplary additional/alternate locations for a dispenser (shown as phantom lines), any of which can also apply to any side of the container 500. FIG. 5C illustrates a side view of the container 500 of FIG. 5A. FIG. 5D illustrates an isometric view of the container 500 of FIG. 5A.

Figure 5E:
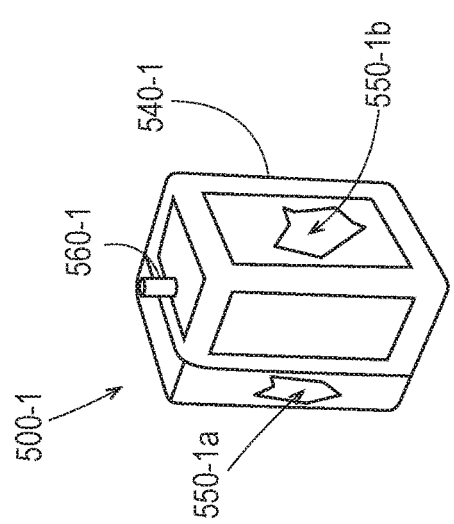
FIG. 5E illustrates a perspective view of an alternative embodiment of the stand up flexible container of FIG. 5A, including an asymmetric structural support frame.
Figure 5F:
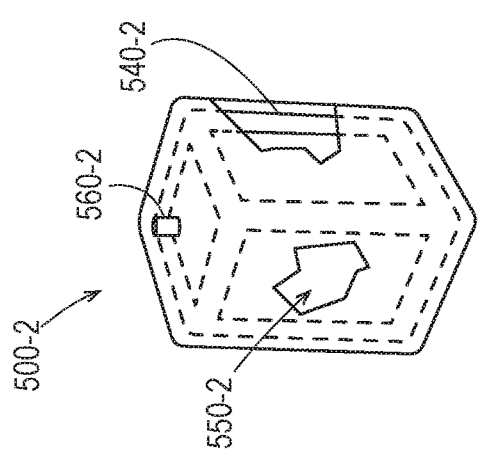
FIG. 5F illustrates a perspective view of an alternative embodiment of the stand up flexible container of FIG. 5A, including an internal structural support frame.
Figure 5G:
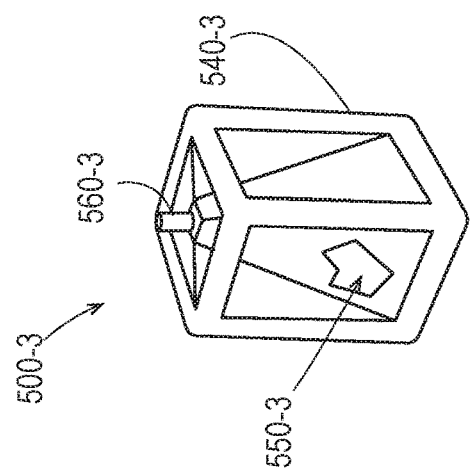
FIG. 5G illustrates a perspective view of an alternative embodiment of the stand up flexible container of FIG. 5A, including an external structural support frame.

FIG. 5E illustrates a perspective view of a container 500-1, which is an alternative embodiment of the stand up flexible container 500 of FIG. 5A, including an asymmetric structural support frame 540-1, a first portion of the product volume 550-1*b*, a second portion of the product volume 550-1*a*, and a dispenser 560-1, configured in the same manner as the embodiment of FIG. 1E, except based on the container 500. FIG. 5F illustrates a perspective view of a container 500-2, which is an alternative embodiment of the stand up flexible container 500 of FIG. 5A, including an internal structural support frame 540-2, a product volume 550-2, and a dispenser 560-2, configured in the same manner as the embodiment of FIG. 1F, except based on the container 500. FIG. 5G illustrates a perspective view of a container 500-3, which is an alternative embodiment of the stand up flexible container 500 of FIG. 5A, including an external structural support frame 540-3, a non-integral product volume 550-3 joined to and disposed within the frame 540-3, and a dispenser 560-3, configured in the same manner as the embodiment of FIG. 1G, except based on the container 500.

FIG. 6A illustrates a front view of a stand up flexible container 600 having a structural support frame 640 that has an overall shape like a pentagonal prism. In the embodiment of FIG. 6A, the prism shape is based on a pentagon. The support frame 640 is formed by structural support members disposed along the edges of the prism shape and joined together at their ends. The structural support members define a pentagon shaped top panel 680-*t*, rectangular shaped side panels 680-1, 680-2, 680-3, 680-4, and 680-5, and a pentagon shaped bottom panel (not shown). Each of the side panels 680-1, 680-2, 680-3, 680-4, and 680-5 is about flat, however in various embodiments, part, parts, or about all, or approximately all, or substantially all, or nearly all, or all of any of the side panels can be approximately flat, substantially flat, nearly flat, or completely flat. The container 600 includes a dispenser 660, which is configured to dispense one or more fluent products from one or more product volumes disposed within the container 600. In the embodiment of FIG. 6A, the dispenser 660 is disposed in the center of the top panel 680-*t*, however, in various alternate embodiments, the dispenser 660 can be disposed anywhere else on the top, sides, or bottom, of the container 600. FIG. 6B illustrates a front view of the container 600 of FIG. 6A, including exemplary additional/alternate locations for a dispenser (shown as phantom lines), any of which can also apply to any side of the container 600. FIG. 6C illustrates a side view of the container 600 of FIG. 6A. FIG. 6D illustrates an isometric view of the container 600 of FIG. 6A.

FIG. 6E illustrates a perspective view of a container 600-1, which is an alternative embodiment of the stand up flexible container 600 of FIG. 6A, including an asymmetric structural support frame 640-1, a first portion of the product volume 650-1*b*, a second portion of the product volume 650-1*a*, and a dispenser 660-1, configured in the same manner as the embodiment of FIG. 1E, except based on the container 600. FIG. 6F illustrates a perspective view of a container 600-2, which is an alternative embodiment of the stand up flexible container 600 of FIG. 6A, including an internal structural support frame 640-2, a product volume 650-2, and a dispenser 660-2, configured in the same manner as the embodiment of FIG. 1F, except based on the container 600. FIG. 6G illustrates a perspective view of a container 600-3, which is an alternative embodiment of the stand up flexible container 600 of FIG. 6A, including an external structural support frame 640-3, a non-integral product volume 650-3 joined to and disposed within the frame 640-3, and a dispenser 660-3, configured in the same manner as the embodiment of FIG. 1G, except based on the container 600.

FIG. 7A illustrates a front view of a stand up flexible container 700 having a structural support frame 740 that has an overall shape like a cone. The support frame 740 is formed by curved structural support members disposed around the base of the cone and by straight structural support members extending linearly from the base to the apex, wherein the structural support members are joined together at their ends. The structural support members define curved somewhat triangular shaped side panels 780-1, 780-2, and 780-3, and a circular shaped bottom panel (not shown). Each of the side panels 780-1, 780-2, and 780-3, is curved, however in various embodiments, part, parts, or about all, or approximately all, or substantially all, or nearly all, or all of any of the side panels can be approximately flat, substantially flat, nearly flat, or completely flat. The container 700 includes a dispenser 760, which is configured to dispense one or more fluent products from one or more product volumes disposed within the container 700. In the embodiment of FIG. 7A, the dispenser 760 is disposed at the apex of the conical shape, however, in various alternate embodiments, the dispenser 760 can be disposed anywhere else on the top, sides, or bottom, of the container 700. FIG. 7B illustrates a front view of the container 700 of FIG. 7A. FIG. 7C illustrates a side view of the container 700 of FIG. 7A, including exemplary additional/alternate locations for a dispenser (shown as phantom lines), any of which can also apply to any side panel of the container 700. FIG. 7D illustrates an isometric view of the container 700 of FIG. 7A.

Figure 7G:
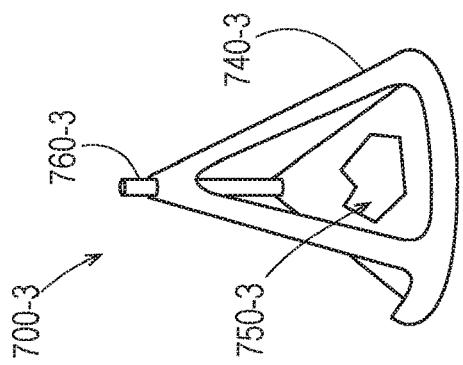
FIG. 7G illustrates a perspective view of an alternative embodiment of the stand up flexible container of FIG. 7A, including an external structural support frame.
Figure 7F:
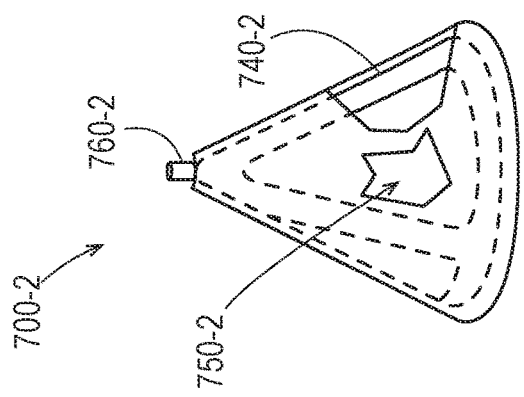
FIG. 7F illustrates a perspective view of an alternative embodiment of the stand up flexible container of FIG. 7A, including an internal structural support frame.
Figure 7E:
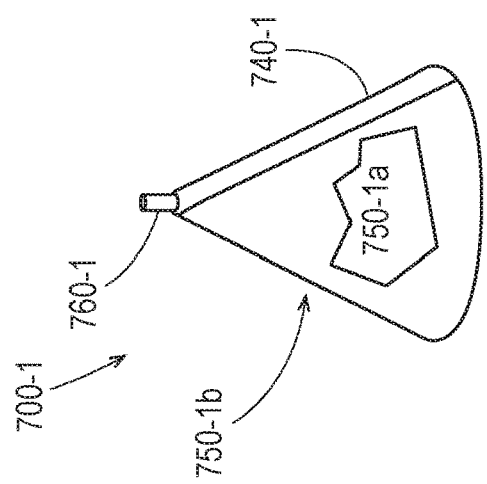
FIG. 7E illustrates a perspective view of an alternative embodiment of the stand up flexible container of FIG. 7A, including an asymmetric structural support frame.

FIG. 7E illustrates a perspective view of a container 700-1, which is an alternative embodiment of the stand up flexible container 700 of FIG. 7A, including an asymmetric structural support frame 740-1, a first portion of the product volume 750-1*b*, a second portion of the product volume 750-1a, and a dispenser 760-1, configured in the same manner as the embodiment of FIG. 1E, except based on the container 700. FIG. 7F illustrates a perspective view of a container 700-2, which is an alternative embodiment of the stand up flexible container 700 of FIG. 7A, including an internal structural support frame 740-2, a product volume 750-2, and a dispenser 760-2, configured in the same manner as the embodiment of FIG. 1F, except based on the container 700. FIG. 7G illustrates a perspective view of a container 700-3, which is an alternative embodiment of the stand up flexible container 700 of FIG. 7A, including an external structural support frame 740-3, a non-integral product volume 750-3 joined to and disposed within the frame 740-3, and a dispenser 760-3, configured in the same manner as the embodiment of FIG. 1G, except based on the container 700.

FIG. 8A illustrates a front view of a stand up flexible container 800 having a structural support frame 840 that has an overall shape like a cylinder. The support frame 840 is formed by curved structural support members disposed around the top and bottom of the cylinder and by straight structural support members extending linearly from the top to the bottom, wherein the structural support members are joined together at their ends. The structural support members define a circular shaped top panel 880-t, curved somewhat rectangular shaped side panels 880-1, 880-2, 880-3, and 880-4, and a circular shaped bottom panel (not shown). Each of the side panels 880-1, 880-2, 880-3, and 880-4, is curved, however in various embodiments, part, parts, or about all, or approximately all, or substantially all, or nearly all, or all of any of the side panels can be approximately flat, substantially flat, nearly flat, or completely flat. The container 800 includes a dispenser 860, which is configured to dispense one or more fluent products from one or more product volumes disposed within the container 800. In the embodiment of FIG. 8A, the dispenser 860 is disposed in the center of the top panel 880-t, however, in various alternate embodiments, the dispenser 860 can be disposed anywhere else on the top, sides, or bottom, of the container 800. FIG. 8B illustrates a front view of the container 800 of FIG. 8A, including exemplary additional/alternate locations for a dispenser (shown as phantom lines), any of which can also apply to any side panel of the container 800. FIG. 8C illustrates a side view of the container 800 of FIG. 8A. FIG. 8D illustrates an isometric view of the container 800 of FIG. 8A.

FIG. 8E illustrates a perspective view of a container 800-1, which is an alternative embodiment of the stand up flexible container 800 of FIG. 8A, including an asymmetric structural support frame 840-1, a first portion of the product volume 850-1b, a second portion of the product volume 850-1a, and a dispenser 860-1, configured in the same manner as the embodiment of FIG. 1E, except based on the container 800. FIG. 8F illustrates a perspective view of a container 800-2, which is an alternative embodiment of the stand up flexible container 800 of FIG. 8A, including an internal structural support frame 840-2, a product volume 850-2, and a dispenser 860-2, configured in the same manner as the embodiment of FIG. 1F, except based on the container 800. FIG. 8G illustrates a perspective view of a container 800-3, which is an alternative embodiment of the stand up flexible container 800 of FIG. 8A, including an external structural support frame 840-3, a non-integral product volume 850-3 joined to and disposed within the frame 840-3, and a dispenser 860-3, configured in the same manner as the embodiment of FIG. 1G, except based on the container 800.

In additional embodiments, any stand up flexible container with a structural support frame, as disclosed herein, can be configured to have an overall shape that corresponds with any other known three-dimensional shape, including any kind of polyhedron, any kind of prismatoid, and any kind of prism (including right prisms and uniform prisms).

FIG. 9A illustrates a top view of an embodiment of a self-supporting flexible container 900, having an overall shape like a square. FIG. 9B illustrates an end view of the flexible container 900 of FIG. 9A. The container 900 is resting on a horizontal support surface 901.

In FIG. 9B, a coordinate system 910, provides lines of reference for referring to directions in the figure. The coordinate system 910 is a three-dimensional Cartesian coordinate system, with an X-axis, a Y-axis, and a Z-axis. The X-axis and the Z-axis are parallel with the horizontal support surface 901 and the Y-axis is perpendicular to the horizontal support surface 901.

FIG. 9A also includes other lines of reference, for referring to directions and locations with respect to the container 100. A lateral centerline 911 runs parallel to the X-axis. An XY plane at the lateral centerline 911 separates the container 100 into a front half and a back half. An XZ plane at the lateral centerline 911 separates the container 100 into an upper half and a lower half. A longitudinal centerline 914 runs parallel to the Y-axis. A YZ plane at the longitudinal centerline 914 separates the container 900 into a left half and a right half. A third centerline 917 runs parallel to the Z-axis. The lateral centerline 911, the longitudinal centerline 914, and the third centerline 917 all intersect at a center of the container 900. These terms for direction, orientation, measurement, and disposition, in the embodiment of FIGS. 9A-9B are the same as the like-numbered terms in the embodiment of FIGS. 1A-1D.

The container 900 includes a top 904, a middle 906, and a bottom 908, the front 902-1, the back 902-2, and left and right sides 909. In the embodiment of FIGS. 9A-9B, the upper half and the lower half of the container are joined together at a seal 929, which extends around the outer periphery of the container 900. The bottom of the container 900 is configured in the same way as the top of the container 900.

The container 900 includes a structural support frame 940, a product volume 950, a dispenser 960, a top panel 980-t and a bottom panel (not shown). A portion of the top panel 980-t is illustrated as broken away, in order to show the product volume 950. The product volume 950 is configured to contain one or more fluent products. The dispenser 960 allows the container 900 to dispense these fluent product(s) from the product volume 950 through a flow channel 959 then through the dispenser 960, to the environment outside of the container 900. The structural support frame 940 supports the mass of fluent product(s) in the product volume 950. The top panel 980-t and the bottom panel are relatively flat surfaces, overlaying the product volume 950, and are suitable for displaying any kind of indicia.

The structural support frame 940 is formed by a plurality of structural support members. The structural support frame 940 includes front structural support members 943-1 and 943-2, intermediate structural support members 945-1, 945-2, 945-3, and 945-4, as well as back structural support members 947-1 and 947-2. Overall, each of the structural support members in the container 900 is oriented horizontally. And, each of the structural support members in the container 900 has a cross-sectional area that is substantially uniform along its length, although in various embodiments, this cross-sectional area can vary.

Upper structural support members 943-1, 945-1, 945-2, and 947-1 are disposed in an upper part of the middle 906 and in the top 904, while lower structural support members 943-2, 945-4, 945-3, and 947-2 are disposed in a lower part of the middle 906 and in the bottom 908. The upper structural support members 943-1, 945-1, 945-2, and 947-1 are disposed above and adjacent to the lower structural support members 943-2, 945-4, 945-3, and 947-2, respectively.

In various embodiments, adjacent upper and lower structural support members can be in contact with each other at one or more relatively smaller locations and/or at one or more relatively larger locations, along part, or parts, or about all, or approximately all, or substantially all, or nearly all, or all of their overall lengths, so long as there is a gap in the contact for the flow channel 959, between the structural support members 943-1 and 943-2. In the embodiment of FIGS. 9A-9B, the upper and lower structural support members are not directly connected to each other. However, in various alternate embodiments, adjacent upper and lower structural support members can be directly connected and/or joined together along part, or parts, or about all, or approximately all, or substantially all, or nearly all, or all of their overall lengths.

The ends of structural support members 943-1, 945-2, 947-1, and 945-1 are joined together to form a top square that is outward from and surrounding the product volume 950, and the ends of structural support members 943-2, 945-3, 947-2, and 945-4 are also joined together to form a bottom square that is outward from and surrounding the product volume 950. In the structural support frame 940, the ends of the structural support members, which are joined together, are directly connected, all around the periphery of their walls. However, in various alternative embodiments, any of the structural support members of the embodiment of FIGS. 9A-9B can be joined together in any way described herein or known in the art.

In alternative embodiments of the structural support frame 940, adjacent structural support members can be combined into a single structural support member, wherein the combined structural support member can effectively substitute for the adjacent structural support members, as their functions and connections are described herein. In other alternative embodiments of the structural support frame 940, one or more additional structural support members can be added to the structural support members in the structural support frame 940, wherein the expanded structural support frame can effectively substitute for the structural support frame 940, as its functions and connections are described herein.

Figure 9E:
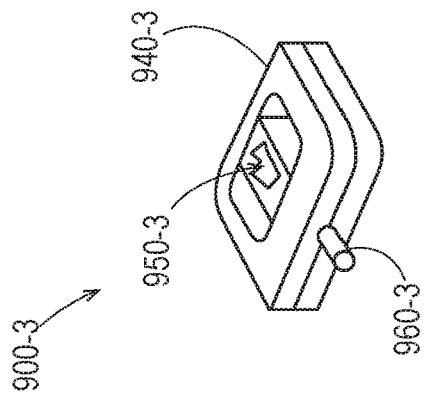
FIG. 9E illustrates a perspective view of an alternative embodiment of the self-supporting flexible container of FIG. 9A, including an external structural support frame.
Figure 9D:
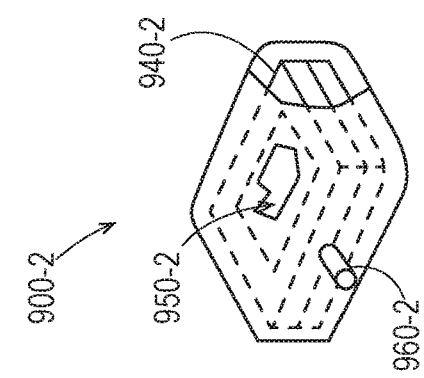
FIG. 9D illustrates a perspective view of an alternative embodiment of the self-supporting flexible container of FIG. 9A, including an internal structural support frame.
Figure 9C:
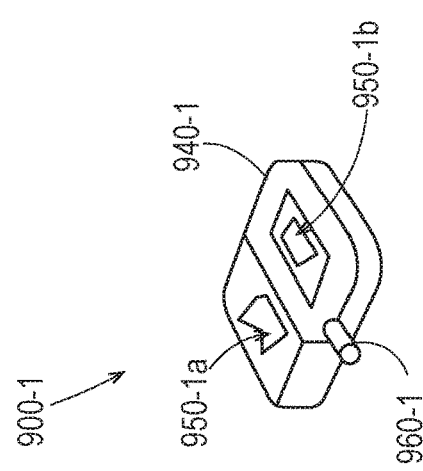
FIG. 9C illustrates a perspective view of an alternative embodiment of the self-supporting flexible container of FIG. 9A, including an asymmetric structural support frame.

FIG. 9C illustrates a perspective view of a container 900-1, which is an alternative embodiment of the self-supporting flexible container 900 of FIG. 1A, including an asymmetric structural support frame 940-1, a first portion of the product volume 950-1b, a second portion of the product volume 950-1a, and a dispenser 960-1. The embodiment of FIG. 9C is similar to the embodiment of FIG. 9A with like-numbered terms configured in the same way, except that the frame 940-1 extends around about half of the container 900-1, directly supporting a first portion of the product volume 950-1b, which is disposed inside of the frame 940-1, and indirectly supporting a second portion of the product volume 950-1a, which is disposed outside of the frame 940-1. In various embodiments, any self-supporting flexible container of the present disclosure can be modified in a similar way, such that: the frame extends around only part or parts of the container, and/or the frame is asymmetric with respect to one or more centerlines of the container, and/or part or parts of one or more product volumes of the container are disposed outside of the frame, and/or part or parts of one or more product volumes of the container are indirectly supported by the frame.

FIG. 9D illustrates a perspective view of a container 900-2, which is an alternative embodiment of the self-supporting flexible container 900 of FIG. 9A, including an internal structural support frame 940-2, a product volume 950-2, and a dispenser 960-2. The embodiment of FIG. 9D is similar to the embodiment of FIG. 9A with like-numbered terms configured in the same way, except that the frame 940-2 is internal to the product volume 950-2. In various embodiments, any self-supporting flexible container of the present disclosure can be modified in a similar way, such that: part, parts, or all of the frame (including part, parts, or all of one or more of any structural support members that form the frame) are about, approximately, substantially, nearly, or completely enclosed by one or more product volumes.

FIG. 9E illustrates a perspective view of a container 900-3, which is an alternative embodiment of the stand up flexible container 900 of FIG. 9A, including an external structural support frame 940-3, a product volume 950-3, and a dispenser 960-3. The embodiment of FIG. 9E is similar to the embodiment of FIG. 9A with like-numbered terms configured in the same way, except that the product volume 950-3 is not integrally connected to the frame 940-3 (that is, not simultaneously made from the same web of flexible materials), but rather the product volume 950-3 is separately made and then joined to the frame 940-3. The product volume 950-3 can be joined to the frame in any convenient manner disclosed herein or known in the art. In the embodiment of FIG. 9E, the product volume 950-3 is disposed within the frame 940-3, but the product volume 950-3 has a reduced size and a somewhat different shape, when compared with the product volume 950 of FIG. 9A; however, these differences are made to illustrate the relationship between the product volume 950-3 and the frame 940-3, and are not required. In various embodiments, any self-supporting flexible container of the present disclosure can be modified in a similar way, such that one or more the product volumes are not integrally connected to the frame.

FIGS. 10A-11E illustrate embodiments of self-supporting flexible containers (that are not stand up containers) having various overall shapes. Any of the embodiments of FIGS. 10A-11E can be configured according to any of the embodiments disclosed herein, including the embodiments of FIGS. 9A-9E. Any of the elements (e.g. structural support frames, structural support members, panels, dispensers, etc.) of the embodiments of FIGS. 10A-11E, can be configured according to any of the embodiments disclosed herein. While each of the embodiments of FIGS. 10A-11E illustrates a container with one dispenser, in various embodiments, each container can include multiple dispensers, according to any embodiment described herein. Part, parts, or about all, or approximately all, or substantially all, or nearly all, or all of each of the panels in the embodiments of FIGS. 10A-11E is suitable to display any kind of indicia. Each of the top and bottom panels in the embodiments of FIGS. 10A-11E is configured to be a nonstructural panel, overlaying product volume(s) disposed within the flexible container, however, in various embodiments, one or more of any kind of decorative or structural element (such as a rib, protruding from an outer surface) can be joined to part, parts, or about all, or approximately all, or substantially all, or nearly all, or all of any of these panels. For clarity, not all structural details of these flexible containers are shown in FIGS. 10A-11E, however any of the embodiments of FIGS. 10A-11E can be configured to include any structure or feature for flexible containers, disclosed herein.

FIG. 10A illustrates a top view of an embodiment of a self-supporting flexible container 1000 (that is not a stand up flexible container) having a product volume 1050 and an overall shape like a triangle. However, in various embodiments, a self-supporting flexible container can have an overall shape like a polygon having any number of sides. The support frame 1040 is formed by structural support members disposed along the edges of the triangular shape and joined together at their ends. The structural support members define a triangular shaped top panel 1080-*t*, and a triangular shaped bottom panel (not shown). The top panel 1080-*t* and the bottom panel are about flat, however in various embodiments, part, parts, or about all, or approximately all, or substantially all, or nearly all, or all of any of the side panels can be approximately flat, substantially flat, nearly flat, or completely flat. The container 1000 includes a dispenser 1060, which is configured to dispense one or more fluent products from one or more product volumes disposed within the container 1000. In the embodiment of FIG. 10A, the dispenser 1060 is disposed in the center of the front, however, in various alternate embodiments, the dispenser 1060 can be disposed anywhere else on the top, sides, or bottom, of the container 1000. FIG. 10A includes exemplary additional/alternate locations for a dispenser (shown as phantom lines). FIG. 10B illustrates an end view of the flexible container 1000 of FIG. 10B, resting on a horizontal support surface 1001.

FIG. 10C illustrates a perspective view of a container 1000-1, which is an alternative embodiment of the self-supporting flexible container 1000 of FIG. 10A, including an asymmetric structural support frame 1040-1, a first portion of the product volume 1050-1*b*, a second portion of the product volume 1050-1*a*, and a dispenser 1060-1, configured in the same manner as the embodiment of FIG. 9C, except based on the container 1000. FIG. 10D illustrates a perspective view of a container 1000-2, which is an alternative embodiment of the self-supporting flexible container 1000 of FIG. 10A, including an internal structural support frame 1040-2, a product volume 1050-2, and a dispenser 1060-2, configured in the same manner as the embodiment of FIG. 9D, except based on the container 1000. FIG. 10E illustrates a perspective view of a container 1000-3, which is an alternative embodiment of the self-supporting flexible container 1000 of FIG. 10A, including an external structural support frame 1040-3, a non-integral product volume 1050-3 joined to and disposed within the frame 1040-3, and a dispenser 1060-3, configured in the same manner as the embodiment of FIG. 9E, except based on the container 1000.

Figure 11A:
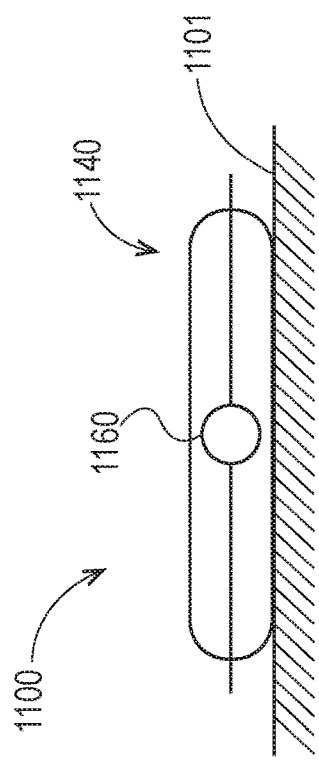
FIG. 11A illustrates a top view of an embodiment of a self-supporting flexible container, having an overall shape like a circle.
Figure 11B:
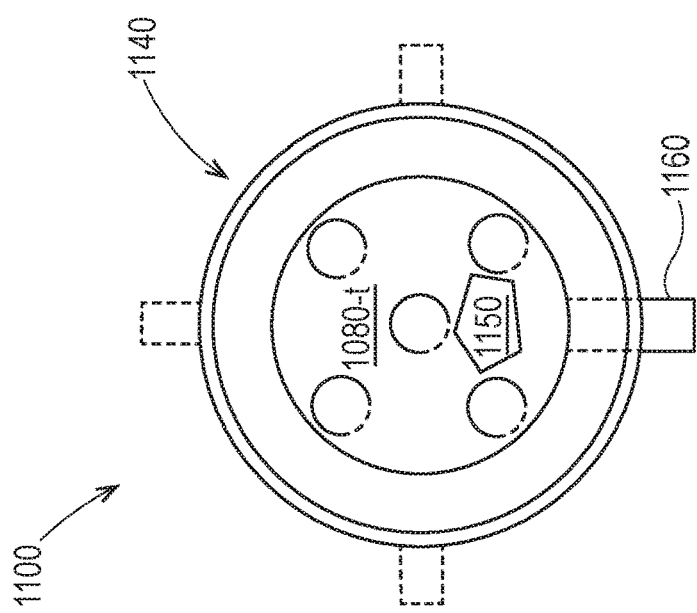
FIG. 11B illustrates an end view of the flexible container of FIG. 11A.

FIG. 11A illustrates a top view of an embodiment of a self-supporting flexible container 1100 (that is not a stand up flexible container) having a product volume 1150 and an overall shape like a circle. The support frame 1140 is formed by structural support members disposed around the circumference of the circular shape and joined together at their ends. The structural support members define a circular shaped top panel 1180-*t*, and a circular shaped bottom panel (not shown). The top panel 1180-*t* and the bottom panel are about flat, however in various embodiments, part, parts, or about all, or approximately all, or substantially all, or nearly all, or all of any of the side panels can be approximately flat, substantially flat, nearly flat, or completely flat. The container 1100 includes a dispenser 1160, which is configured to dispense one or more fluent products from one or more product volumes disposed within the container 1100. In the embodiment of FIG. 11A, the dispenser 1160 is disposed in the center of the front, however, in various alternate embodiments, the dispenser 1160 can be disposed anywhere else on the top, sides, or bottom, of the container 1100. FIG. 11A includes exemplary additional/alternate locations for a dispenser (shown as phantom lines). FIG. 11B illustrates an end view of the flexible container 1100 of FIG. 10B, resting on a horizontal support surface 1101.

Figures 11C, 11D, 11E:
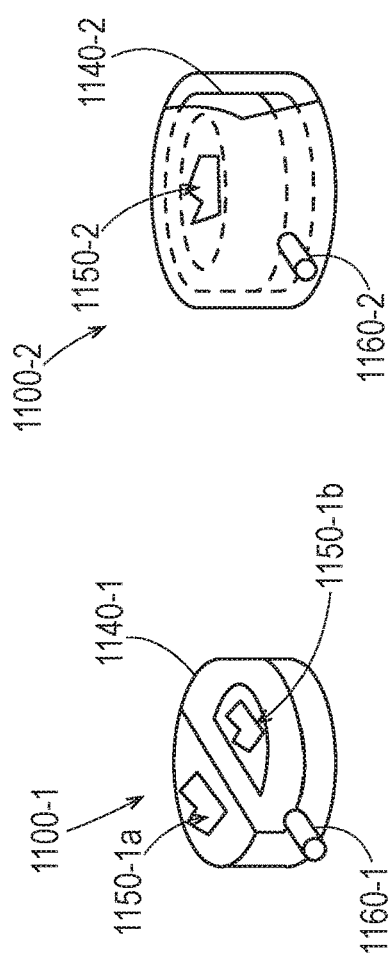
FIG. 11C illustrates a perspective view of an alternative embodiment of the self-supporting flexible container of FIG. 11A, including an asymmetric structural support frame.
FIG. 11D illustrates a perspective view of an alternative embodiment of the self-supporting flexible container of FIG. 11A, including an internal structural support frame.
FIG. 11E illustrates a perspective view of an alternative embodiment of the self-supporting flexible container of FIG. 11A, including an external structural support frame.

FIG. 11C illustrates a perspective view of a container 1100-1, which is an alternative embodiment of the self-supporting flexible container 1100 of FIG. 11A, including an asymmetric structural support frame 1140-1, a first portion of the product volume 1150-1*b*, a second portion of the product volume 1150-1*a*, and a dispenser 1160-1, configured in the same manner as the embodiment of FIG. 9C, except based on the container 1100. FIG. 11D illustrates a perspective view of a container 1100-2, which is an alternative embodiment of the self-supporting flexible container 1100 of FIG. 11A, including an internal structural support frame 1140-2, a product volume 1150-2, and a dispenser 1160-2, configured in the same manner as the embodiment of FIG. 9D, except based on the container 1100. FIG. 11E illustrates a perspective view of a container 1100-3, which is an alternative embodiment of the self-supporting flexible container 1100 of FIG. 11A, including an external structural support frame 1140-3, a non-integral product volume 1150-3 joined to and disposed within the frame 1140-3, and a dispenser 1160-3, configured in the same manner as the embodiment of FIG. 9E, except based on the container 1100.

In additional embodiments, any self-supporting container with a structural support frame, as disclosed herein, can be configured to have an overall shape that corresponds with any other known three-dimensional shape. For example, any self-supporting container with a structural support frame, as disclosed herein, can be configured to have an overall shape (when observed from a top view) that corresponds with a rectangle, a polygon (having any number of sides), an oval, an ellipse, a star, or any other shape, or combinations of any of these.

Figure 12A:
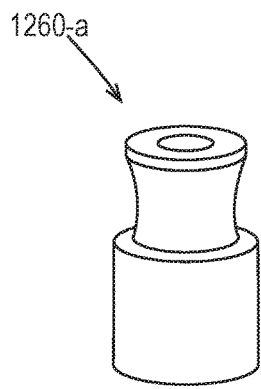
FIG. 12A illustrates an isometric view of push-pull type dispenser.
Figure 12B:
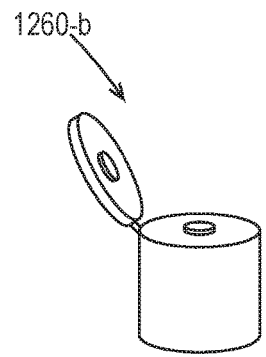
FIG. 12B illustrates an isometric view of dispenser with a flip-top cap.
Figure 12C:
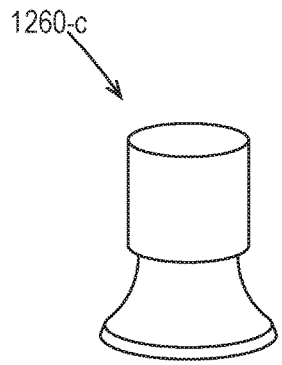
FIG. 12C illustrates an isometric view of dispenser with a screw-on cap.
Figure 12D:
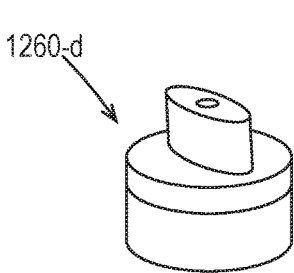
FIG. 12D illustrates an isometric view of rotatable type dispenser.
Figure 12E:
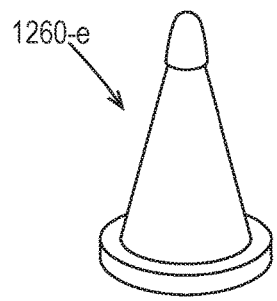
FIG. 12E illustrates an isometric view of nozzle type dispenser with a cap.
Figure 13D:
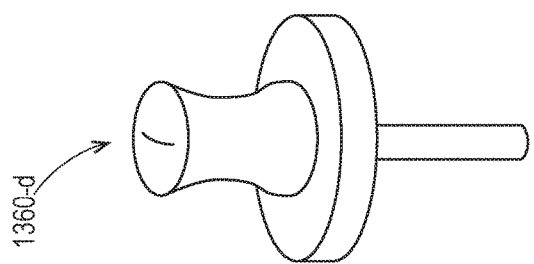
FIG. 13D illustrates an isometric view of straw dispenser with bite valve.
Figure 13C:
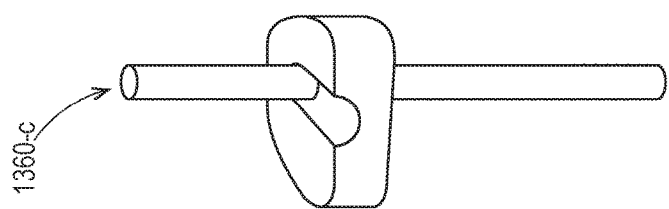
FIG. 13C illustrates an isometric view of flip up straw dispenser.
Figure 13B:
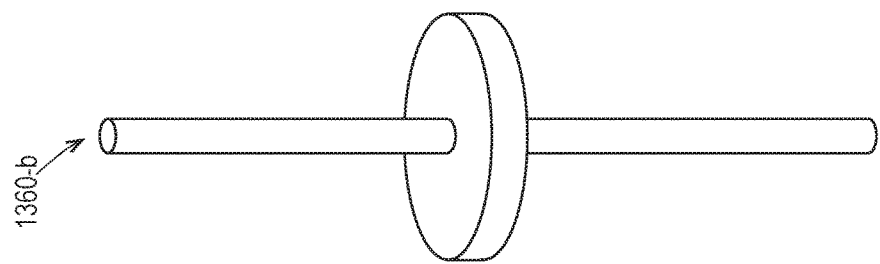
FIG. 13B illustrates an isometric view of straw dispenser with a lid.
Figure 13A:
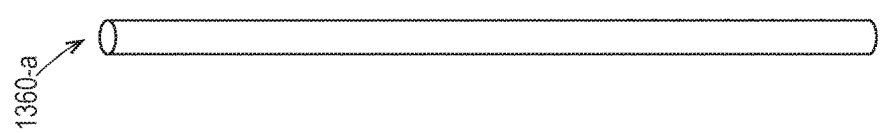
FIG. 13A illustrates an isometric view of straw dispenser.

FIGS. 12A-14C illustrate various exemplary dispensers, which can be used with the flexible containers disclosed herein. FIG. 12A illustrates an isometric view of push-pull type dispenser 1260-*a*. FIG. 12B illustrates an isometric view of dispenser with a flip-top cap 1260-*b*. FIG. 12C illustrates an isometric view of dispenser with a screw-on cap 1260-*c*. FIG. 12D illustrates an isometric view of rotatable type dispenser 1260-*d*. FIG. 12E illustrates an isometric view of nozzle type dispenser with a cap 1260-*d*. FIG. 13A illustrates an isometric view of straw dispenser 1360-*a*. FIG. 13B illustrates an isometric view of straw dispenser with a lid 1360-*b*. FIG. 13C illustrates an isometric view of flip up straw dispenser 1360-*c*. FIG. 13D illustrates an isometric view of straw dispenser with bite valve 1360-*d*. FIG. 14A illustrates an isometric view of pump type dispenser 1460-*a*, which can, in various embodiments be a foaming pump type dispenser. FIG. 14B illustrates an isometric view of pump spray type dispenser 1460-*b*. FIG. 14C illustrates an isometric view of trigger spray type dispenser 1460-*c*.

Figure 15:
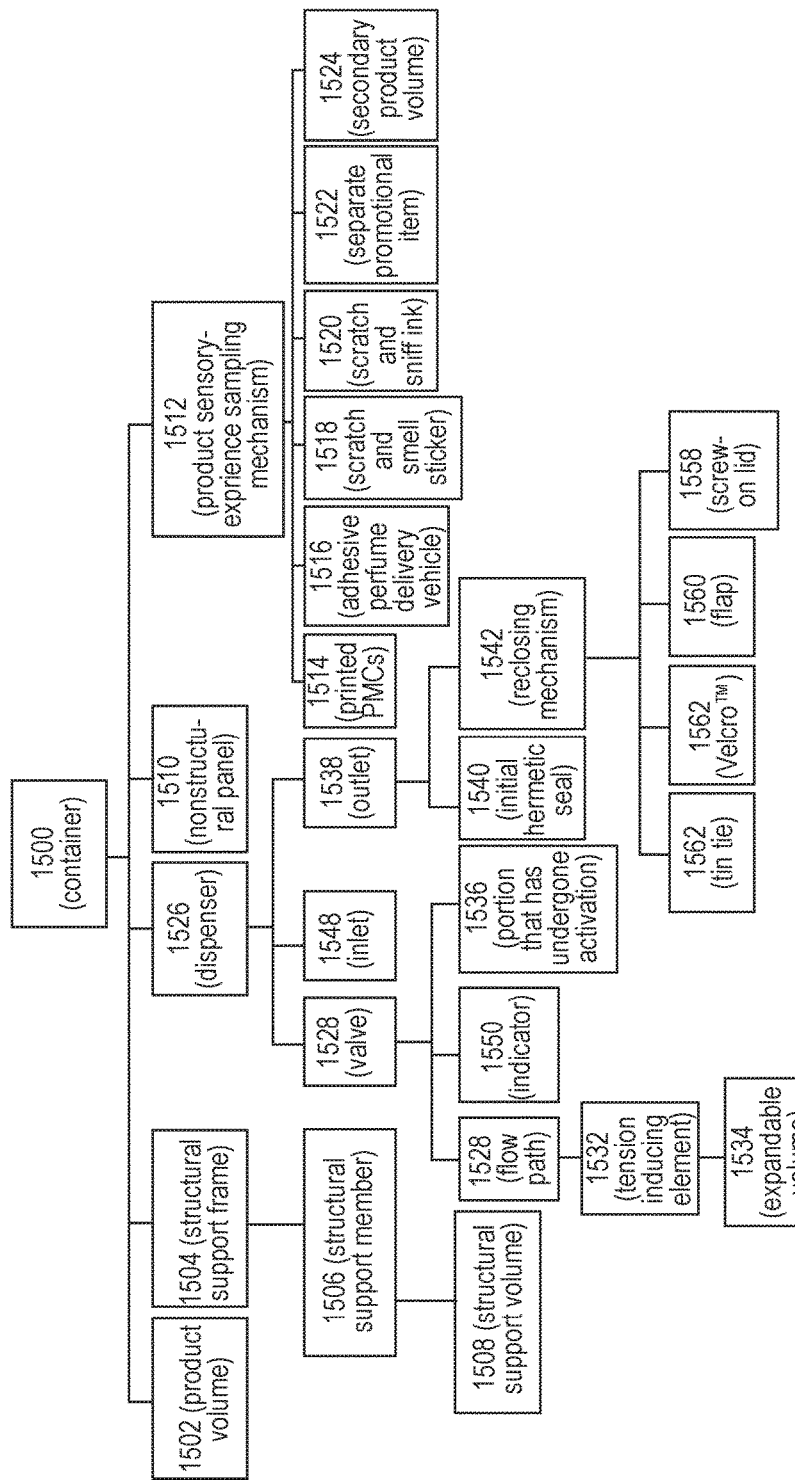
FIG. 15 illustrates a block diagram of the various elements of a non-durable container comprising a valve.

FIG. 15 illustrates a block diagram of the various elements of a non-durable container 1500. The non-durable container may comprise any or all of the features described below. The non-durable container 1500 may comprise a product volume 1502, a structural support frame 1504, a nonstructural panel 1510, and a dispenser 1526. A fluent product may be contained in the product volume 1502. The structural support frame 1504 may be formed by a plurality of structural support members 1506, comprising structural support volumes 1508, joined together around the product volume 1502. The structural support members 1506 may define the nonstructural panels 1510 of the non-durable container 1500. The non-durable container 1500 may further comprise a product sensory-experience sampling mechanism 1512. A product sensory-experience sampling mechanism 1512 is a user-interactive component that enables a user to gain exposure to at least one of a group of smell, taste, lubricity, texture, and visual characteristics of a fluent product contained in the product volume. In various embodiments, the product sensory-experience sampling mechanism 1512 may achieve this end either by providing access to the product volume 1502 or to a secondary product volume 1524 containing the fluent product. In other various embodiments, the product sensory-experience sampling mechanism 1512 may not provide access to the fluent product but may nonetheless convey the desired sensory-experience of the fluent product via printed PMCs 1514, an adhesive perfume delivery vehicle 1516, a scratch and smell sticker 1518, scratch and sniff inks 1520, or separate promotion items 1522 such as cards, or other alternatives.

The non-durable container 1500 comprises a dispenser 1526, and the dispenser 1526 comprises a valve 1528, an inlet 1548 through which fluent product enters the dispenser 1526, and an outlet 1538 through which fluent product exits the dispenser 1526. The valve 1528 may be a traditional valve. Alternately, the valve 1528 may be a flexible valve 1528. The flexible valve 1528 may be formed from silicone. Silicone valves are conventionally used in squeeze-to-dose rigid and semi-rigid containers. Alternately, the flexible valve 1528 may be formed from a non-silicone material. The use of a non-silicone flexible valve 1528 as disclosed herein has not previously been known. The flexible valve 1528 comprises a flow path 1530, which is a restricted passageway through which fluent product travels in the flexible valve 1528. The flow path 1530 may be trapezoidal and may comprise tension-inducing elements 1532, such as expandable volumes 1534. The flexible valve may comprise a portion that has undergone activation 1536. The flexible valve 1528 may be located in the bottom or the top of a non-durable container 1500, or at any other location such as the side, edge, corner, or seam. The flexible valve 1528 closes the outlet 1538 of the dispenser 1526 when a force less than a critical squeeze force is applied to the container 1500 and a pressure less than the critical pressure buildup exists inside the product volume 1502, and opens the outlet 1528 of the dispenser 1526 when a force equal to or greater than the critical squeeze force of the container is applied to the container 1500 or when a pressure equal to or greater than the critical pressure buildup exists inside the product volume 1502. Provided that the amount of force applied to the container 1500 is equal to or greater than the critical squeeze force, the amount of fluent product dispensed through the dispenser 1526 may be directly correlated to the force applied to the container 1500. The critical squeeze force and critical pressure buildup may be optimized as dictated by consumers' preferences for how easily a fluent product can be dispensed from the product volume 1502. The critical squeeze force is dependent upon the container materials, container shape, and location where the force is applied. A critical pressure buildup, in contrast, is not dependent upon container materials, container shape, or location where a force is applied to the container. A critical squeeze force that would be acceptable to consumers would be in the range of about 0.1 to 550 N, or any range formed by these values such as or any range formed by these values such as about 0.15 N to about 470 N, about 5 N to about 230 N, about 55 N to about 549 N, about 0.5 N to about 4 N, about 4 N to about 8 N, about 40 N to about 230 N, about 410 N to about 475 N, about 10 N to about 530 N, about 100 N to about 200 N, about 250 N to about 300 N, or about 400 N to about 500 N. A critical pressure buildup that would be acceptable to consumers would be in the range of approximately 0 Pa to approximately 90,000 Pa gauge pressure, or any range formed by these values such as about 10,000 to about 60,000 Pa, about 25,500 Pa to about 90,000 Pa, or about 2 Pa to about 4562 Pa.

The outlet 1538 of the dispenser 1526 may comprise an initial hermetic seal 1540. The initial hermetic seal 1540 is a structure that initially seals the outlet 1538 so that fluent product cannot be dispensed from the product volume 1502 to the environment outside of the non-durable container 1500 during transport of the container, but is further configured to be removable so that fluent product can be dispensed by a consumer or end user. Various embodiments of an initial hermetic seal include, but are not limited to, a pull-tab, a bubble to pop, a perforation, a notch and score, any line of weakness, or a sticker to peel off. The outlet 1538 may further comprise a reclosing mechanism 1542 that provides the ability to close the outlet 1538 after the initial hermetic seal 1540 has been compromised so that fluent product is not inadvertently dispensed from the product volume 1502 to the environment outside the non-durable container 1500. A reclosing mechanism 1542 could, in various embodiments, be a screw on lid 1558, a flap 1560, Velcro 1562, or a tin tie 1564.

The flow path 1530 may have a tension gradient that contributes toward a suck-back effect when the force applied to the non-durable container 1500 exceeds the critical squeeze force and then falls below the critical squeeze force. The tension gradient creates a region of high tension (i.e., high resistance to flow) nearest the outlet 1538 and lower tension (i.e., relatively less resistance to flow) nearest the inlet 1548. As a result, after the critical squeeze force is released, there is a sharp cutoff of fluent product flow from the outlet 1538, and the fluent product that is in the flow path 1530 reverses its direction of travel to migrate back into the product volume 1502. This helps to limit dripping and leakage through the flexible valve 1528 after the critical squeeze force is released. A suck-back effect is a particularly important feature for non-durable containers 1500 containing fluent products with lower viscosities, such as liquid dish soap, as such fluent products are more likely to leak.

In order to achieve the necessary tension gradient in the flow path 1530, the flexible valve 1528 may comprise a tension-inducing element 1532. In various embodiments, the tension-inducing element 1532 may be an expandable volume 1534. Alternately, the tension-inducing element 1532 may be a non-inflated structure. In various embodiments, the tension-inducing element 1532 is an expandable volume 1534 adjacent to a structural support volume 1508. The tension-inducing element 1532 may be in fluid communication with one or more structural support volume 1508. The tension-inducing element 1532 affects the level of tension in the flow path 1530, which in turn regulates the mass flow rate of the fluent product through the flexible valve 1528. A desirable mass flow rate when a critical squeeze force is applied to the container or a critical pressure buildup occurs inside the product volume is in the range of about 0.1 g/s to about 100 g/s, or any range formed by these values such as about 0.5 g/s to about 50 g/s, about 3 g/s to about 75 g/s, or about 54 g/s to about 99 g/s. Alternately or in conjunction with a tension-inducing element 1532, the flexible valve 1528 may include a portion of the flexible valve 1528 that has undergone activation 1532.

The valve 1528 may comprise an indicator 1550 to convey to a user of the non-durable container 1500 whether the flexible valve 1528 is open or closed. An indicator may be a portion of the flow path 1530 formed of clear materials. In such an embodiment, fluent product is visible in the indicator 1550 if the flexible valve 1528 is open but is not visible in the indicator 1550 due to the suck-back effect if the flexible valve 1528 is closed. In other embodiments, the flow path 1530 may be formed by and between two layers of flexible material, and the indicator 1550 may comprise a portion of each of the two overlapping layers. When the flexible valve 1528 is closed, the two layers (front and back) of the indicator 1550 are proximate enough to one another to create a signal when visually combined, whereas when the valve is open, the two layers are visually distinct and do not create a signal. Examples of a signal include a change in color (i.e., a yellow layer and a blue layer combine to make a green signal) or a combination of designs that form a new design (i.e., a circle on one layer and a parenthesis and colon on another layer combine to make a smiley face). Various embodiments are envisioned where pieces of an artwork or pattern are not easily discernible when the layers are separate and are obviously discernible when the layers are visually combined.

Figure 16:
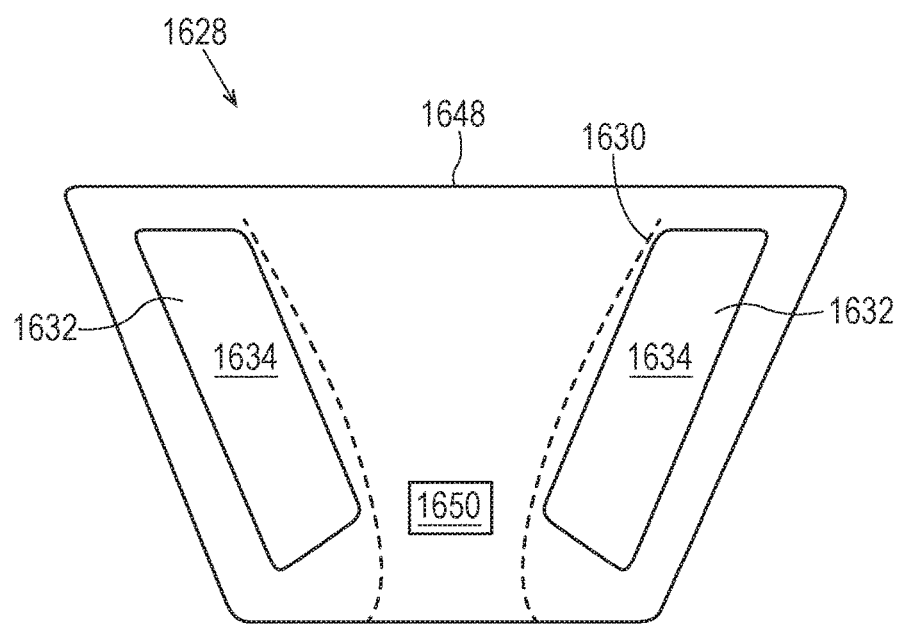
FIG. 16 illustrates a top view of a flexible valve having two expandable volumes and a flow path.

FIG. 16 illustrates a top view of a flexible valve 1628 comprising two tension-inducing elements 1632 opposed from one another, which are expandable volumes 1634, and a flow path 1630. Fluent product enters the flow path 1630 through the inlet 1648 and exits the flow path 1630 through the outlet 1638 when a critical squeeze force is applied and the flexible valve 1628 opens. When the critical squeeze force is released and the flexible valve 1628 closes, a tension gradient in the flow path 1630 creates a suck-back effect such that fluent product in the flow path 1630 reverses its direction of travel to migrate back through the inlet 1648. The indicator 1650, which can be any of the embodiments described above, located on the flow path 1630 cues a user as to whether the flexible valve 1628 is open or closed. Flexible material forms the flow path 1630. The tension-inducing elements 1632 may hold the flexible material forming the flow path 1630 at a fixed position when a critical squeeze force is applied so that fluent product can be dispensed. In some embodiments, the flexible material forming the flow path 1630 between the tension-inducing elements 1632 may curve upward or downward relative to the two tension-inducing elements 1632. The flexible material forming the flow path 1630 in some embodiments should be relatively flat and in some embodiments does not have crooks or bends that block the flow path 1630.

The width of the outlet 1638 strongly affects what the critical squeeze force is. The smaller the width of the outlet 1638, the greater the critical squeeze force is. The stiffness of the flexible material forming the flow path 1630 should also be adjusted to help achieve the desired critical squeeze force. The shape, size, relative orientation, and pressure of the tension-inducing elements 1632 affect the critical squeeze force and mass flow rate achievable through the flexible valve 1628. The mass flow rate through the flexible valve 1628 of fluent product and the critical squeeze force of the flexible valve 1628 are also adjustable through manipulation of the container comprising the flexible valve 1628. Numerous parameters of the materials forming the container, the geometry and arrangement of the tension-inducing elements 1632 (e.g., separation distance, shape, size), the size, shape, and width of seals used to create expandable volumes, and the fluid properties of the fluent product impact the performance and optimization of the flexible valve 1628. The inlet 1648 and the outlet 1638 can have different sizes, leading to a flow channel that in non-rectangular. For example, the flow path 1630 can be trapezoidal or any other suitable type of profile shape. The angle at which the flow path 1630 constricts fluent product flow can be any value, for example 0, 40, 60, or 75 degrees. The size and shape of each expandable volume 1634 can be constant or variable. For example, each expandable volume 1634 can have a width at a largest point of about 0.1 inches to about 1.5 inches, or any range therein such as about 0.1 inches to about 1.1 inches, about 0.3 inches to about 0.4 inches, or about 1.1 inches to about 1.5 inches. The opening of the outlet 1638 can have a width ranging from about 0.2 inches to about 1 inches, or any range therein such as about 0.3 inches to about 0.8 inches, about 0.6 inches to about 0.9 inches, or about 0.2 inches to about 0.25 inches. The mass of fluent product dispensed can be about 0.1 g to about 100 g, or any range therein such as about 0.5 g to about 10 g, about 56 g to about 99 g, or about 2 g to about 43 g. The critical squeeze force can be from about 0.1 N to about 550 N, or any range therein such as about 0.5 N to about 110 N, about 125 N to about 130 N, or about 500 N to about 540 N. The impulse before dispense (N*s) can range from about 1 N s to about 1000 N s and is calculated as the area under the force vs. time curve before any mass flow rate begins. The impulse to dispense (N*s) can range from about 1 N s to about 1500 N s and is calculated as the area under the force vs. time curve during dispensing. The total effort to dispense (N*s/g) can range from about 1 to about 1200 N s/g and is calculated from adding the impulse before and during dispense and dividing by the amount of mass dispensed.

Figure 17:
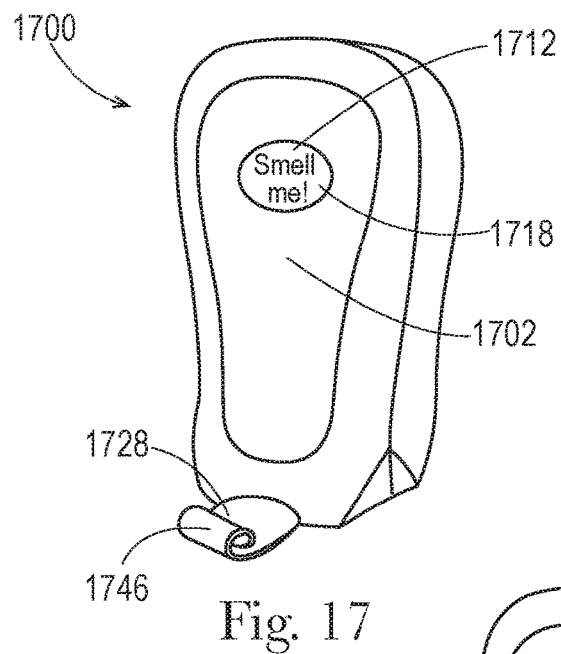
FIG. 17 illustrates an isometric view of a non-durable container comprising a flexible valve having a curled flow path and a product sensory-experience sampling mechanism.

FIG. 17 illustrates an isometric view of the non-durable container 1700 comprising a product sensory-experience sampling mechanism 1712 and a flexible valve 1728 comprising a curled flow path 1746. The curled flow path 1746 has a scroll or reel-like structure. The structure of a curled flow path 1746 may be achieved by placing a score line or a series of score lines through the flow path perpendicular to the direction of flow to create a horizontal deflection, by using a thicker flexible material on the top of the flow path than on the bottom of the flexible flow path, or by imparting tension to a top layer of flexible material before sealing the top layer to a bottom layer of flexible material, among other options. The curled flow path 1746 controls the flow of fluent product and may signal that the flexible valve 1728 is closed. Above a critical squeeze force, the pressure inside the product volume 1702 will result in fluent product pushing the flexible valve 1728 open by straightening the curled flow path 1746 to allow product dispensing. This effect can be achieved in alternate ways in other embodiments. The product sensory-experience sampling mechanism enables a potential purchaser of the non-durable container 1700 to gather information relevant to their purchasing decision just as a potential purchaser of a conventional rigid dispenser could gather information by, for example, opening the lid of the conventional rigid dispenser. In FIG. 17, the product sensory-experience sampling mechanism 1712 is a scratch-and-smell sticker 1718. This embodiment enables a consumer to smell the product without breaking the hermetic seal.

Figure 18:
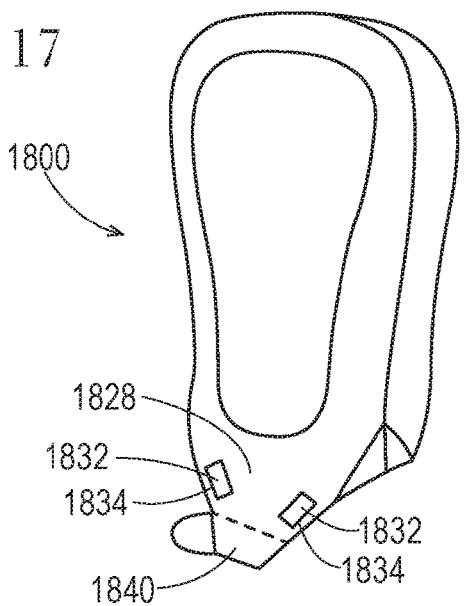
FIG. 18 illustrates an isometric view of a non-durable container comprising a flexible valve comprising an initial hermetic seal.

FIG. 18 illustrates an isometric view of a non-durable container 1800 comprising a flexible valve 1828 having an initial hermetic seal 1840. The initial hermetic seal 1840 depicted in FIG. 18 is a tear-off. The tear off may have any suitable shape to aid a consumer in handling, gripping, and removing the hermetic seal 1840. The hermetic seal 1840 may include artwork and be suitably shaped to compliment the package design. The hermetic seal may also include a sensory-experience sampling mechanism (not pictured). The flexible valve 1828 further comprises two tension-inducing elements 1832 that are expandable volumes 1834.

Figure 19:
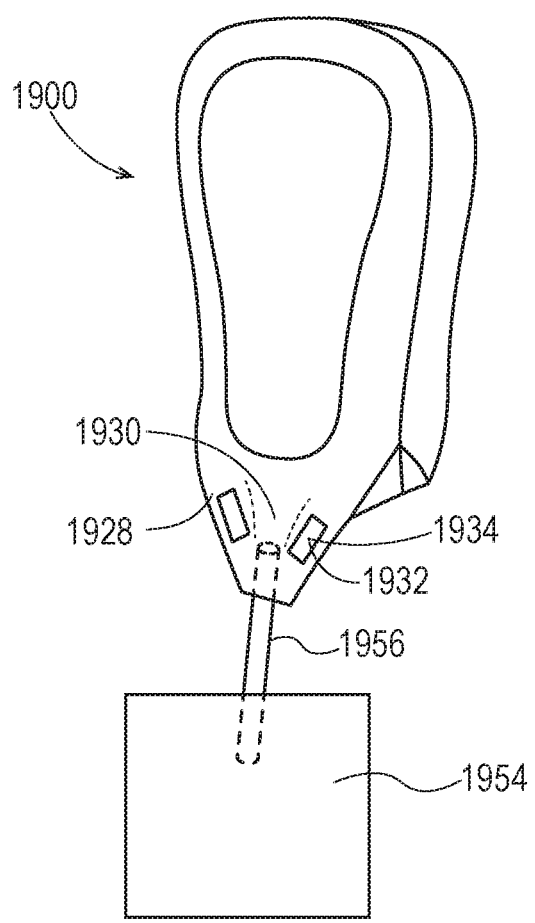
FIG. 19 illustrates an isometric view of a non-durable container connected to a secondary delivery device via a connection device.

FIG. 19 illustrates an isometric view of a non-durable container 1900 connected to a secondary delivery device 1954 via a connection device 1956. The non-durable container 1900 comprises a structural support frame 1904, a product volume 1902, and a dispenser 1926. The dispenser comprises a valve 1926 like that depicted in FIG. 16 comprising two tension-inducing elements 1932 that are expandable volumes 1934. The expandable volumes 1934 are opposed from one another and define a flow path 1930 therebetween where a fluent product can be dispensed. The product volume 1902 of the non-durable container 1900 is in fluid communication with a secondary delivery device 1954. The secondary delivery device 1954 may be put into fluid communication with the product volume 1902 of the non-durable container 1900 directly via the dispenser 1926 of the flexible container or, as pictured in FIG. 19, via a connection device 1956. The flow of fluent product through the secondary delivery device 1954 may be regulated by the valve 1926 of the non-durable container 1900 or by a flow regulation device of the secondary delivery device 1954 or by both.

The connection device 1956 may be inserted into the container 1900. For example, the connection device 1956 may be straw-like and may be inserted into the valve 1926 of the non-durable durable container 1900 between the two expandable volumes 1934 such that the end of the connection device 1956 is directly in the flow path 1930 of the fluent product. The valve 1926 may be manipulated by applying force to the product volume 1902 or any region of the non-durable container 1900 such that the layers of flexible material forming the flow path 1930 of the valve 1926 to pull apart from one another and the outlet of the valve 1926 is opened beyond its normal capacity. Such manipulation allows the insertion of the connection device 1956. Alternately, fluent product contained in the product volume 1902 of the non-durable container 1900 may be rapidly dispensed by such manipulation, an advantage for a user wishing to empty the non-durable container 1900 or to dispense a large quantity of fluent product from the product volume 1902. In other embodiments, the connection device may be externally connected to the dispenser 1926 of the non-durable container 1900.

Figure 20A:
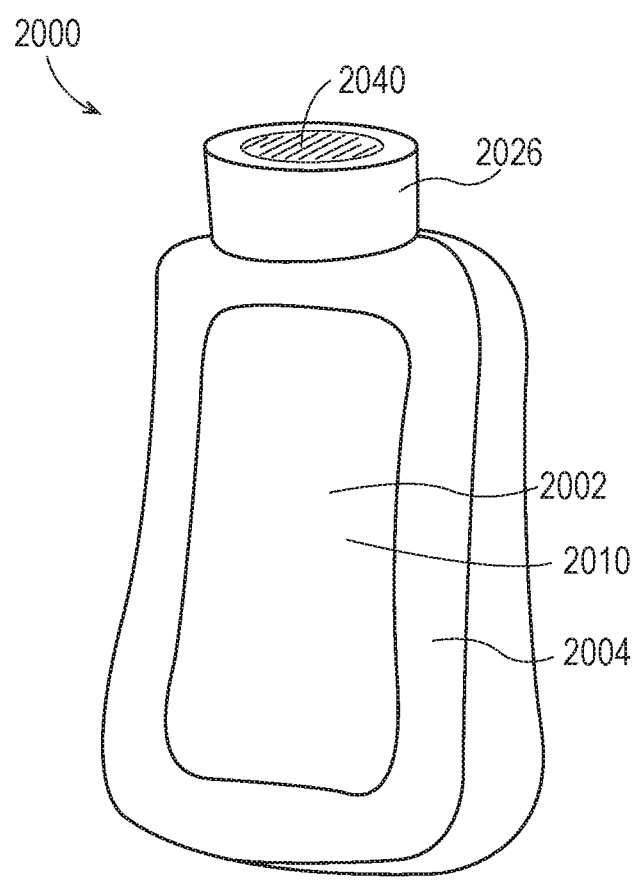
FIG. 20A illustrates an isometric view of a non-durable container adapted for use with a secondary delivery device.

FIG. 20A illustrates an isometric view of a non-durable container 2000 adapted for use with a secondary delivery device. The non-durable container 2000 comprises a product volume 2002, a structural support frame 2004, a nonstructural panel 2010, and a dispenser 2026. The dispenser 1926 comprises an initial hermetic seal 2040.

Figure 20B:
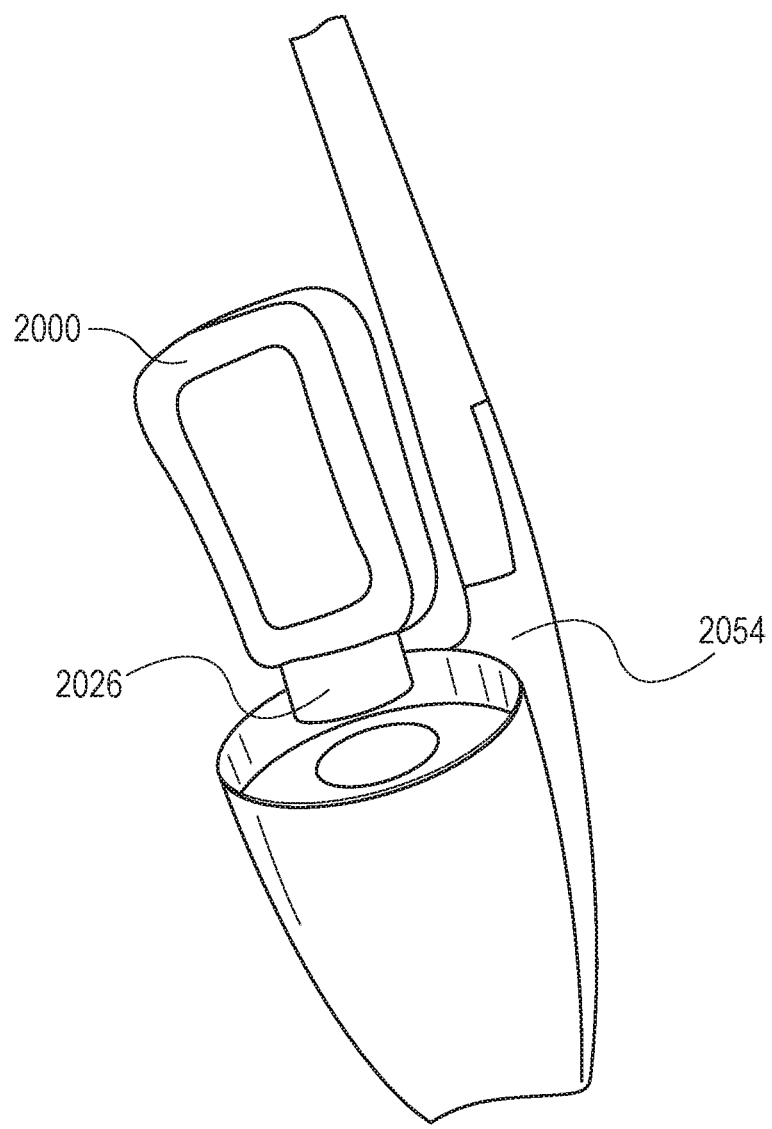
FIG. 20B illustrates an isometric view of the non-durable container depicted in FIG. 20A as it is being inserted into a secondary delivery device.

FIG. 20B illustrates an isometric view of the non-durable container 2000 depicted in FIG. 20A as it is being inserted into a secondary delivery device 2054 that is a non-traditional mop. The non-durable container 2000 is inverted and positioned over the secondary delivery device 2054. The dispenser 2026 of the non-durable container 2000 is inserted into the secondary delivery device 2054, and the non-durable container 2000 is secured to the secondary delivery device 2054. The secondary delivery device 2054 beaches the initial hermetic seal 2040 (not pictured) of the non-durable container 1900. The flow of fluent product through the non-traditional mop 2054 is then regulated by the secondary delivery device 2054. This is just one example considered within the scope of the present disclosure of the non-durable container 2000 being employed as a consumable, replaceable cartridge of a system including at least one secondary delivery device 2054. A non-durable container 2000 could also, for example, be a reload for a pump or a press tap dispenser, or may be docked into a measuring cup or ball.

Part, parts, or all of any of the embodiments disclosed herein can be combined with part, parts, or all of other embodiments known in the art of flexible containers, including those described below.

Embodiments of the present disclosure can use any and all embodiments of materials, structures, and/or features for flexible containers, as well as any and all methods of making and/or using such flexible containers, as disclosed in the following patent applications: (1) U.S. non-provisional application Ser. No. 13/888,679 filed May 7, 2013, entitled "Flexible Containers" and published as US20130292353; (2) U.S. non-provisional application Ser. No. 13/888,721 filed May 7, 2013, entitled "Flexible Containers" and published as US20130292395; (3) U.S. non-provisional application Ser. No. 13/888,963 filed May 7, 2013, entitled "Flexible Containers" published as US20130292415; (4) U.S. non-provisional application Ser. No. 13/888,756 May 7, 2013, entitled "Flexible Containers Having a Decoration Panel" published as US20130292287 (applicant's case 12559M); (5) U.S. non-provisional application Ser. No. 13/957,158 filed Aug. 1, 2013, entitled "Methods of Making Flexible Containers" published as US20140033654; and (6) U.S. non-provisional application Ser. No. 13/957,187 filed Aug. 1, 2013, entitled "Methods of Making Flexible Containers" published as US20140033655; (7) U.S. non-provisional application Ser. No. 13/889,000 filed May 7, 2013, entitled "Flexible Containers with Multiple Product Volumes" published as US20130292413; (8) U.S. non-provisional application Ser. No. 13/889,061 filed May 7, 2013, entitled "Flexible Materials for Flexible Containers" published as US20130337244; (9) U.S. non-provisional application Ser. No. 13/889,090 filed May 7, 2013, entitled "Flexible Materials for Flexible Containers" published as US20130294711; (10) U.S. provisional application 61/861,100 filed Aug. 1, 2013, entitled "Disposable Flexible Containers having Surface Elements"; (11) U.S. provisional application 61/861,106 filed Aug. 1, 2013, entitled "Flexible Containers having Improved Seam and Methods of Making the Same"; (12) U.S. provisional application 61/861,118 filed Aug. 1, 2013, entitled "Methods of Forming a Flexible Container"; (13) U.S. provisional application 61/861,129 filed Aug. 1, 2013, entitled "Enhancements to Tactile Interaction with Film Walled Packaging Having Air Filled Structural Support Volumes"; (14) Chinese patent application CN2013/085045 filed October 11, 2013, entitled "Flexible Containers Having a Squeeze Panel"; (15) Chinese patent application CN2013/085065 filed Oct. 11, 2013, entitled "Stable Flexible Containers"; (16) U.S. provisional application 61/900,450 filed Nov. 6, 2013, entitled "Flexible Containers and Methods of Forming the Same"; (17) U.S. provisional application 61/900,488 filed Nov. 6, 2013, entitled "Easy to Empty Flexible Containers"; (18) U.S. provisional application 61/900,501 filed Nov. 6, 2013, entitled "Containers Having a Product Volume and a Stand-Off Structure Coupled Thereto"; (19) U.S. provisional application 61/900,508 filed Nov. 6, 2013, entitled "Flexible Containers Having Flexible Valves"; (20) U.S. provisional application 61/900,514 filed Nov. 6, 2013, entitled "Flexible Containers with Vent Systems"; (21) U.S. provisional application 61/900,765 filed Nov. 6, 2013, entitled "Flexible Containers for use with Short Shelf-Life Products and Methods for Accelerating Distribution of Flexible Containers"; (22) U.S. provisional application 61/900,794 filed Nov. 6, 2013, entitled "Flexible Containers and Methods of Forming the Same"; (23) U.S. provisional application 61/900,805 filed Nov. 6, 2013, entitled "Flexible Containers and Methods of Making the Same"; (24) U.S. provisional application 61/900,810 filed Nov. 6, 2013, entitled "Flexible Containers and Methods of Making the Same"; each of which is hereby incorporated by reference.

Embodiments of the present disclosure can use any and all embodiments of materials, structures, and/or features for flexible containers, as well as any and all methods of making and/or using such flexible containers, as disclosed in the following patent documents: U.S. Pat. No. 5,137,154, filed Oct. 29, 1991, entitled "Food bag structure having pressurized compartments" in the name of Cohen, granted Aug. 11, 1992; PCT international patent application WO 96/01775 filed Jul. 5, 1995, published Jan. 26, 1995, entitled "Packaging Pouch with Stiffening Air Channels" in the name of Prats (applicant Danapak Holding A/S); PCT international patent application WO 98/01354 filed Jul. 8, 1997, published Jan. 15, 1998, entitled "A Packaging Container and a Method of its Manufacture" in the name of Naslund; U.S. Pat. No. 5,960,975 filed Mar. 19, 1997, entitled "Packaging material web for a self-supporting packaging container wall, and packaging containers made from the web" in the name of Lennartsson (applicant Tetra Laval), granted Oct. 5, 1999; U.S. Pat. No. 6,244,466 filed Jul. 8, 1997, entitled "Packaging Container and a Method of its Manufacture" in the name of Naslund, granted Jun. 12, 2001; PCT international patent application WO 02/085729 filed Apr. 19, 2002, published October 31, 2002, entitled "Container" in the name of Rosen (applicant Eco Lean Research and Development A/S); Japanese patent JP4736364 filed Jul. 20, 2004, published Jul. 27, 2011, entitled "Independent Sack" in the name of Masaki (applicant Toppan Printing); PCT international patent application WO2005/063589 filed Nov. 3, 2004, published 14 Jul. 2005, entitled "Container of Flexible Material" in the name of Figols Gamiz (applicant Volpak, S.A.); German patent application DE202005016704 U1 filed Jan. 17, 2005, entitled "Closed bag for receiving liquids, bulk material or objects comprises a bag wall with taut filled cushions or bulges which reinforce the wall to stabilize it" in the name of Heukamp (applicant Menshen), laid open as publication DE102005002301; Japanese patent application 2008JP-0024845 filed Feb. 5, 2008, entitled "Self-standing Bag" in the name of Shinya (applicant Toppan Printing), laid open as publication JP2009184690; U.S. patent application Ser. No. 10/312,176 filed Apr. 19, 2002, entitled "Container" in the name of Rosen, published as US20040035865; U.S. Pat. No. 7,585,528 filed Dec. 16, 2002, entitled "Package having an inflated frame" in the name of Ferri, et al., granted on Sep. 8, 2009; U.S. patent application Ser. No. 12/794286 filed Jun. 4, 2010, entitled "Flexible to Rigid Packaging Article and Method of Use and Manufacture" in the name of Helou (applicant, published as US20100308062; U.S. Pat. No. 8,540,094 filed Jun. 21, 2010, entitled "Collapsible Bottle, Method Of Manufacturing a Blank For Such Bottle and Beverage-Filled Bottle Dispensing System" in the name of Reidl, granted on Sep. 24, 2013; and PCT international patent application WO 2013/124201 filed Feb. 14, 2013, published Aug. 29, 2013, entitled "Pouch and Method of Manufacturing the Same" in the name of Rizzi (applicant Cryovac, Inc.); each of which is hereby incorporated by reference.

Part, parts, or all of any of the embodiments disclosed herein also can be combined with part, parts, or all of other embodiments known in the art of containers for fluent products, so long as those embodiments can be applied to flexible containers, as disclosed herein. For example, in various embodiments, a flexible container can include a vertically oriented transparent strip, disposed on a portion of the container that overlays the product volume, and configured to show the level of the fluent product in the product volume.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A non-durable flexible stand-up container comprising:
   at least one product volume made from one or more layers of a flexible material and containing a fluent product;
   a nonstructural panel, made from one or more layers of a flexible material, defined by a plurality of expanded structural support volumes, and overlaying the product volume;
   at least one flexible valve having a flow path for dispensing the fluent product from the product volume, wherein:
   the flow path is formed between a first, relatively flat flexible material overlapping a second, relatively flat flexible material;
   the flexible valve is closed when a pressure inside of the product volume is below a critical pressure; and
   the flexible valve automatically opens when a squeeze force applied to the nonstructural panel causes the pressure inside of the product volume to exceed the critical pressure.

2. The non-durable container of claim 1, wherein the critical pressure is between about 0 Pa and about 90,000 Pa gauge pressure.

3. The non-durable container of claim 1, wherein the flexible valve further comprises tension-inducing elements.

4. The non-durable container of claim 3, wherein at least one of the tension-inducing elements is an expandable volume.

5. The non-durable container of claim 4, wherein the tension-inducing elements comprise a first expandable volume and a second expandable volume opposed from one another and defining the flow path therebetween.

6. The non-durable container of claim 5, wherein at least one of the expandable volumes is located adjacent to at least one of the expanded structural support volumes.

7. A non-durable flexible stand-up container comprising:
at least one product volume made from one or more layers of a flexible material and containing a fluent product;
a nonstructural panel, made from one or more layers of a flexible material, defined by a plurality of expanded structural support volumes, and overlaying the product volume;
at least one flexible valve having a flow path for dispensing the fluent product from the product volume, wherein:
the flow path is formed between a first, relatively flat flexible material overlapping a second, relatively flat flexible material;
the flexible valve is closed when a pressure inside of the product volume is below a critical pressure;
the flexible valve automatically opens when a squeeze force applied to the nonstructural panel causes the pressure inside of the product volume to exceed the critical pressure;
wherein the flexible valve further comprises tension-inducing elements;
wherein at least one of the tension-inducing elements is an expandable volume;
wherein the tension-inducing elements comprise a first expandable volume and a second expandable volume opposed from one another and defining the flow path therebetween;
wherein at least one of the expandable volumes is located adjacent to at least one of the expanded structural support volumes; and
wherein at least one of the tension-inducing elements is in fluid communication with one or more of the expanded structural support volumes.

8. A non-durable flexible stand-up container comprising:
at least one product volume made from one or more layers of a flexible material and containing a fluent product;
a nonstructural panel, made from one or more layers of a flexible material, defined by a plurality of expanded structural support volumes, and overlaying the product volume;
at least one flexible valve having a flow path for dispensing the fluent product from the product volume, wherein:
the flow path is formed between a first, relatively flat flexible material overlapping a second, relatively flat flexible material;
the flexible valve is closed when a pressure inside of the product volume is below a critical pressure;
the flexible valve automatically opens when a squeeze force applied to the nonstructural panel causes the pressure inside of the product volume to exceed the critical pressure;
the valve further comprises an initial hermetic seal; and
the container further comprises a product sensory-experience selected from the group including: a scratch-and-smell sticker, adhesive perfume delivery vehicle, printed PMCs, and scratch and sniff inks, and any combination of these.

9. The non-durable flexible valve of claim 1, further comprising a flow path, wherein the flow path further comprises an indicator wherein at least a portion of the flow path comprises a transparent indicator, the flexible valve has a suck-back effect, the indicator indicates that the flexible valve is closed when the fluent product is not visible in the indicator, and the indicator indicates that the flexible valve is open when the fluent product is visible in the indicator.

\* \* \* \* \*